INVENTOR.
FRANK A. LOPEZ
BY
ATTORNEY

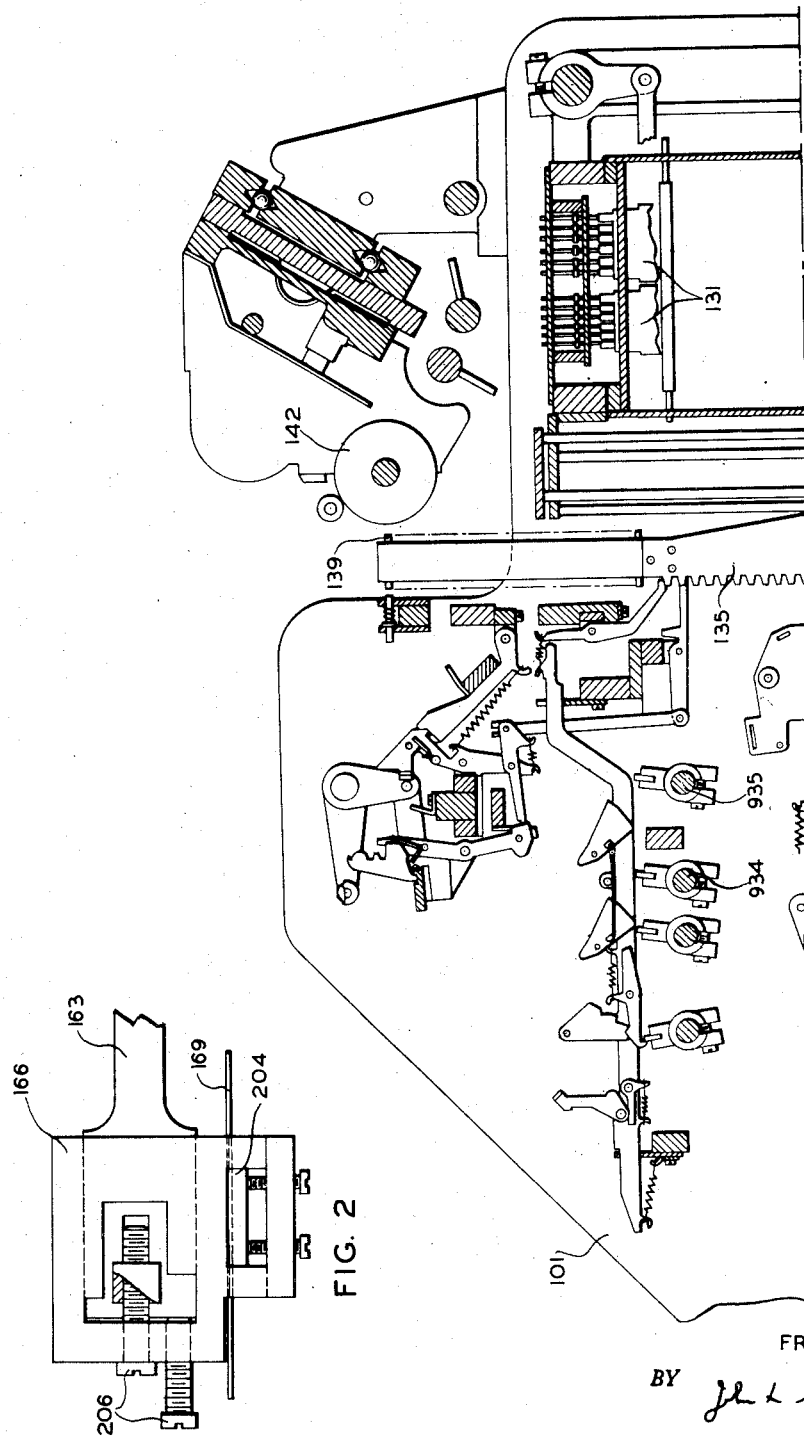

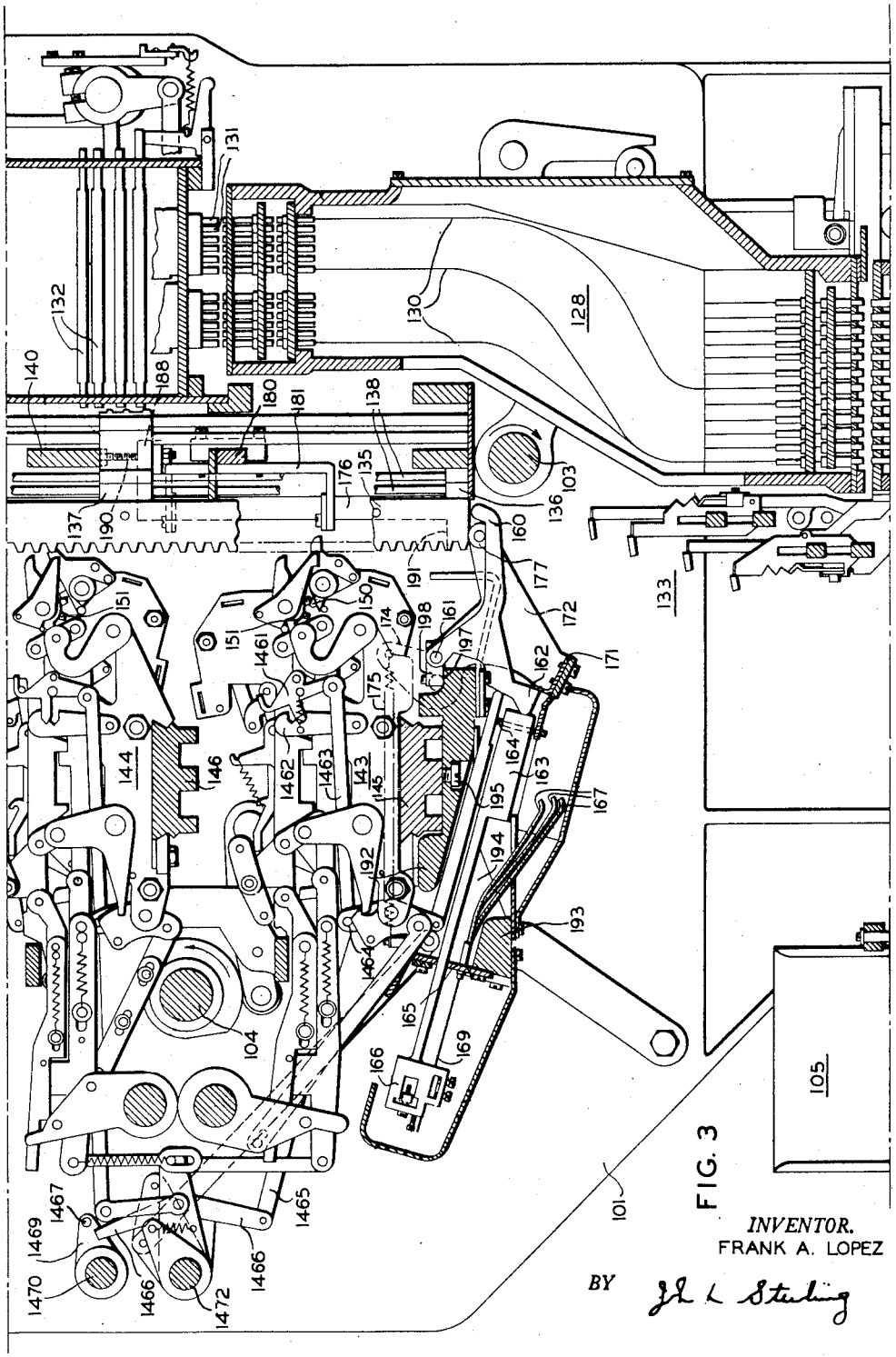

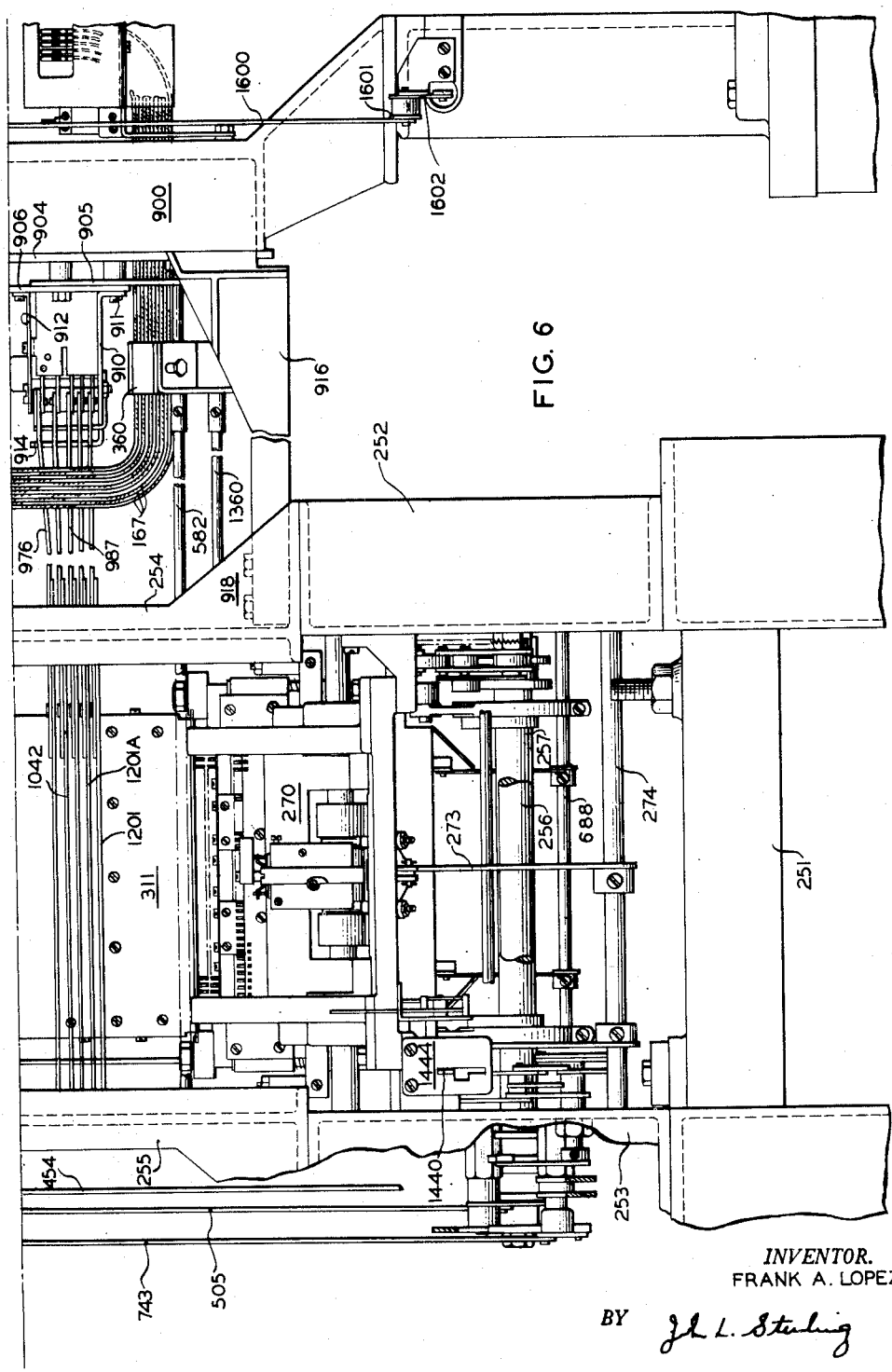

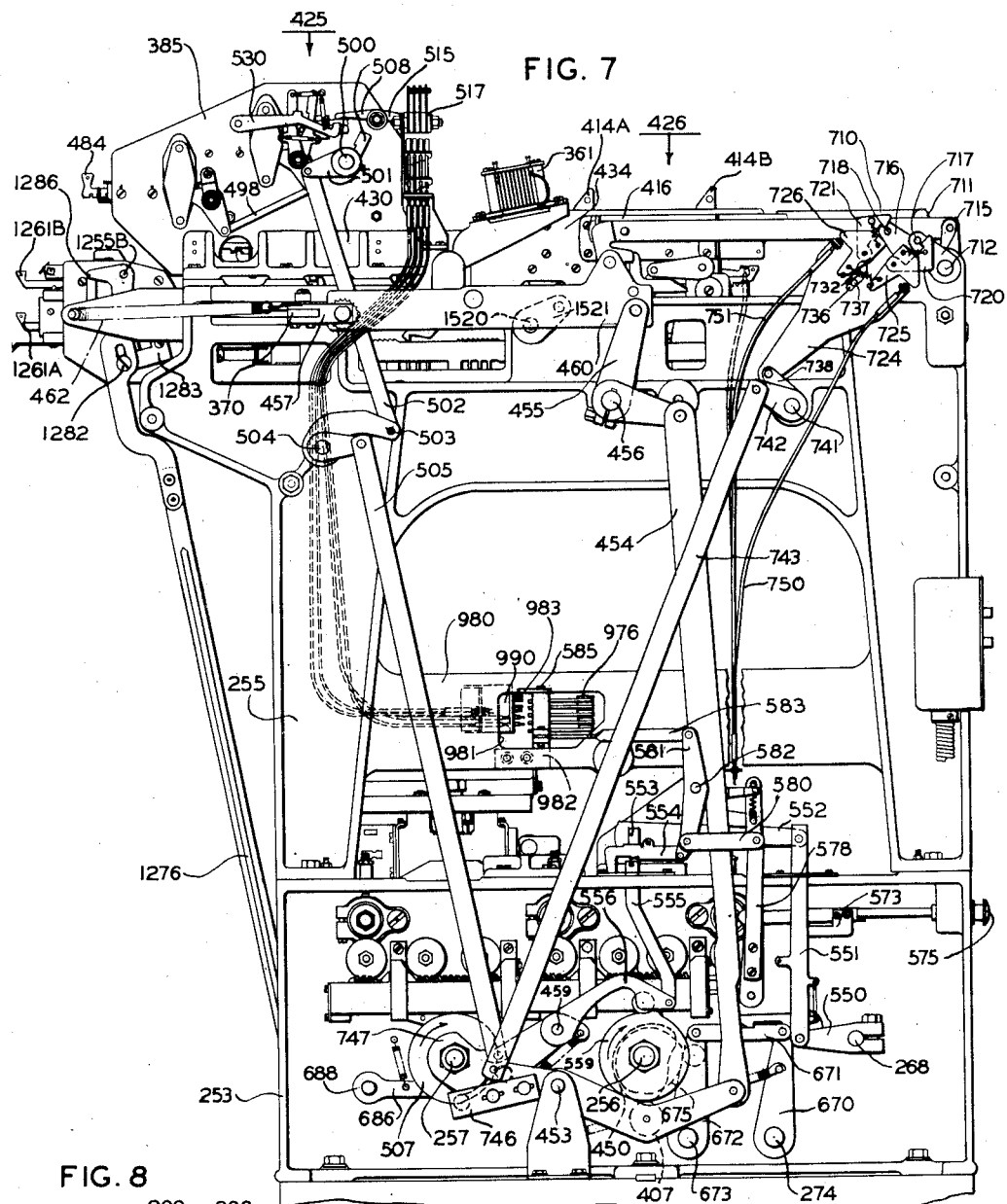
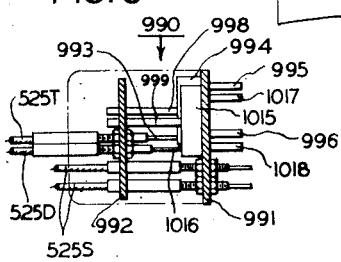

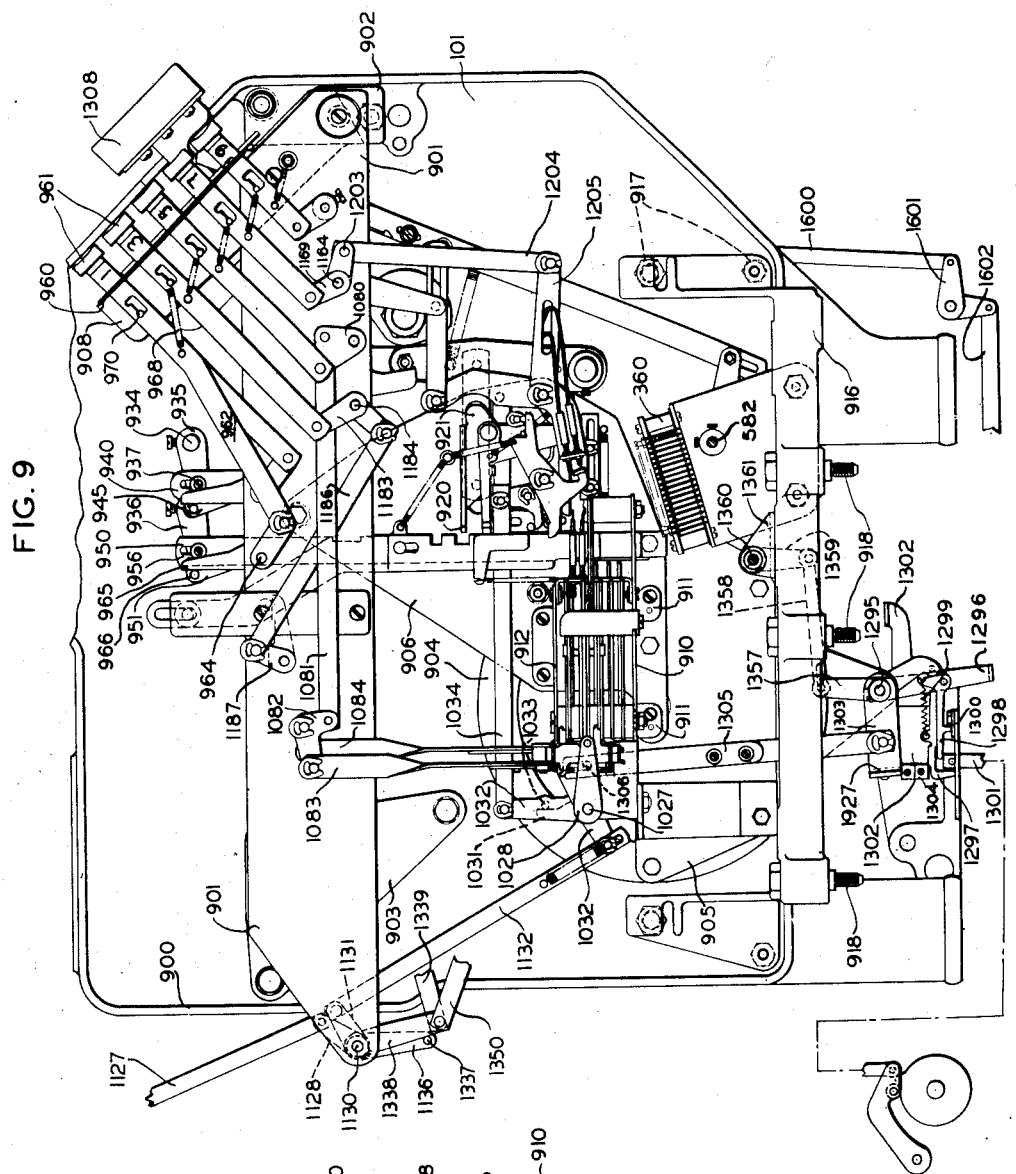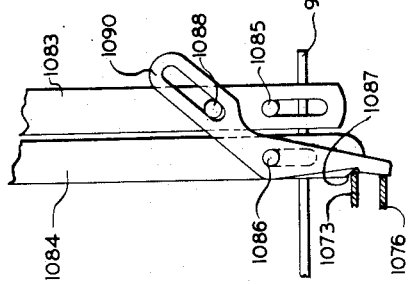

June 27, 1950     F. A. LOPEZ     2,512,865
COMBINED TABULATOR AND SUMMARY PUNCH, AND
ESPECIALLY THE CONTROLS THEREFOR
Filed Sept. 1, 1948     24 Sheets-Sheet 8
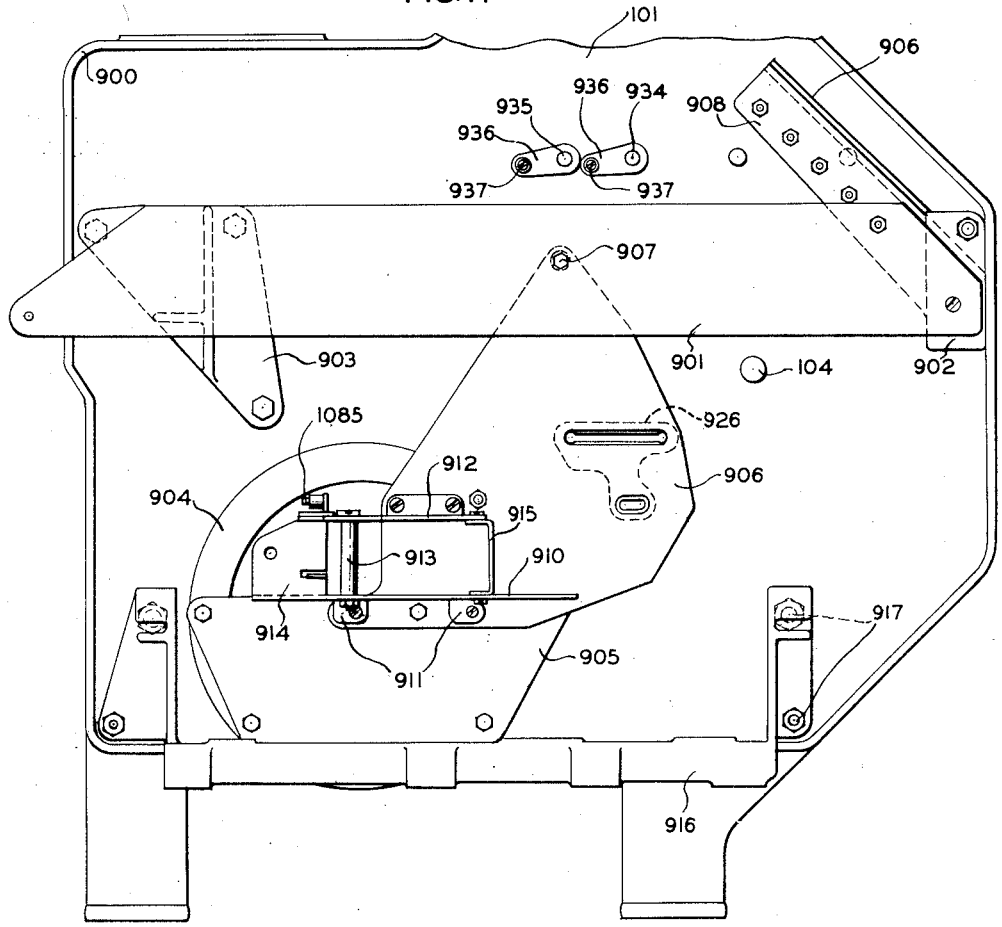
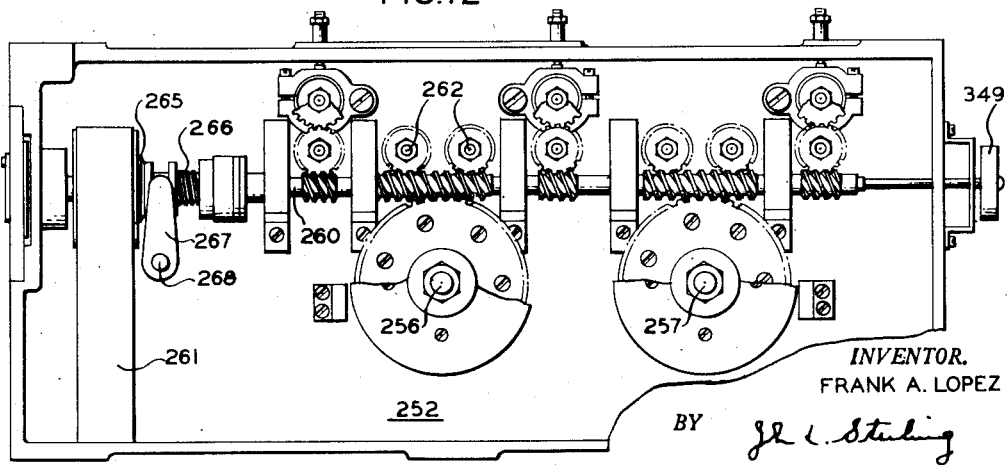
INVENTOR.
FRANK A. LOPEZ
BY
ATTORNEY

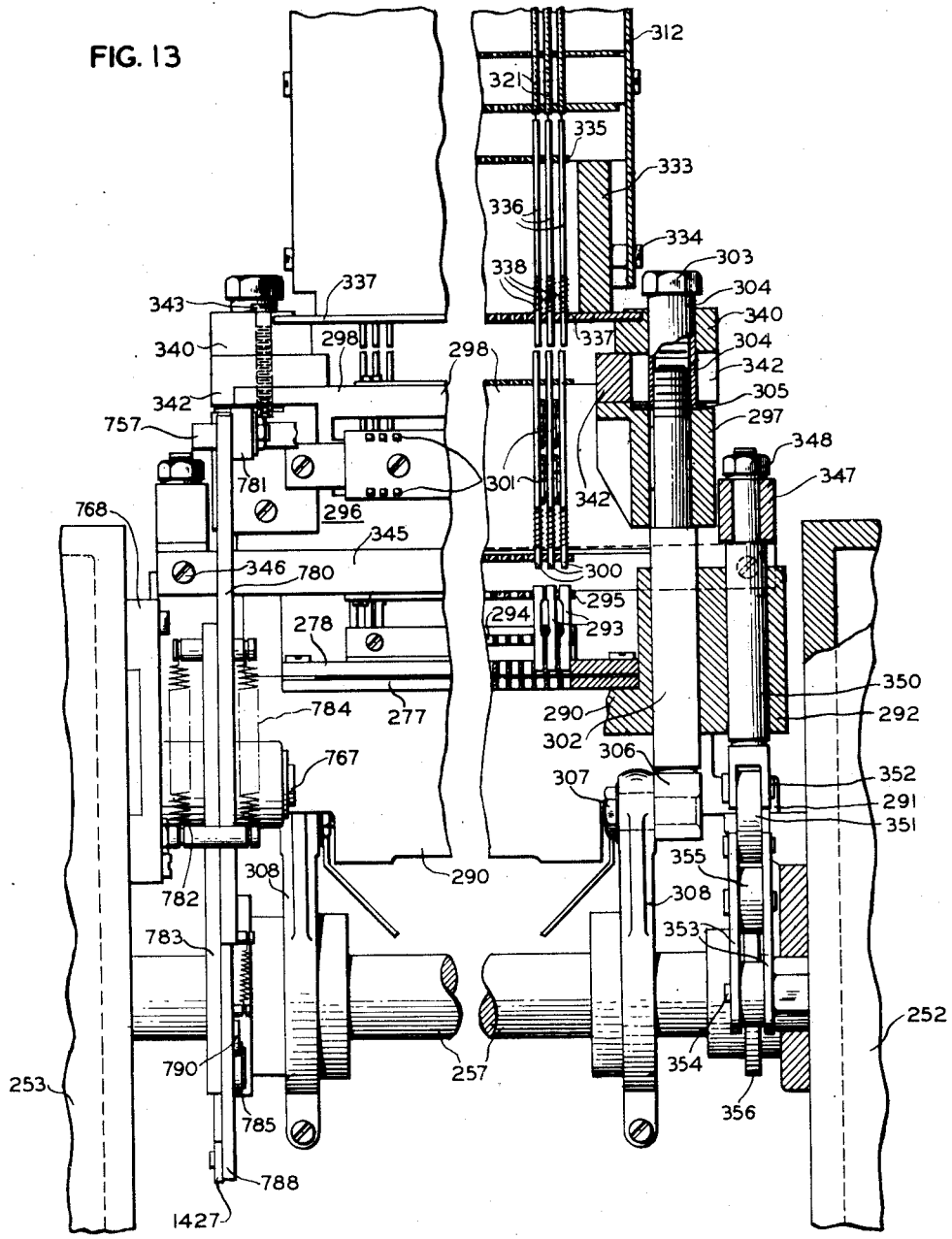

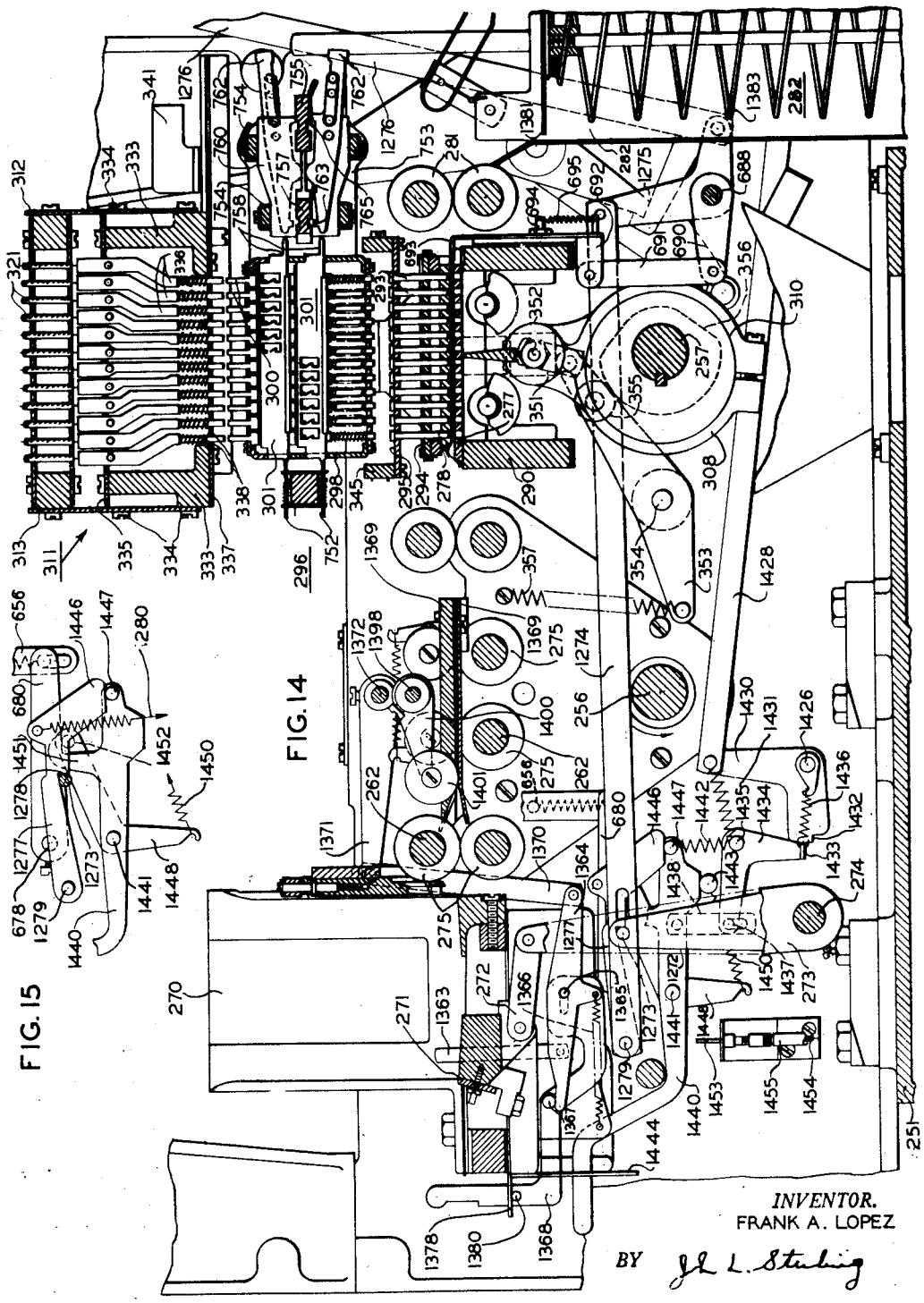

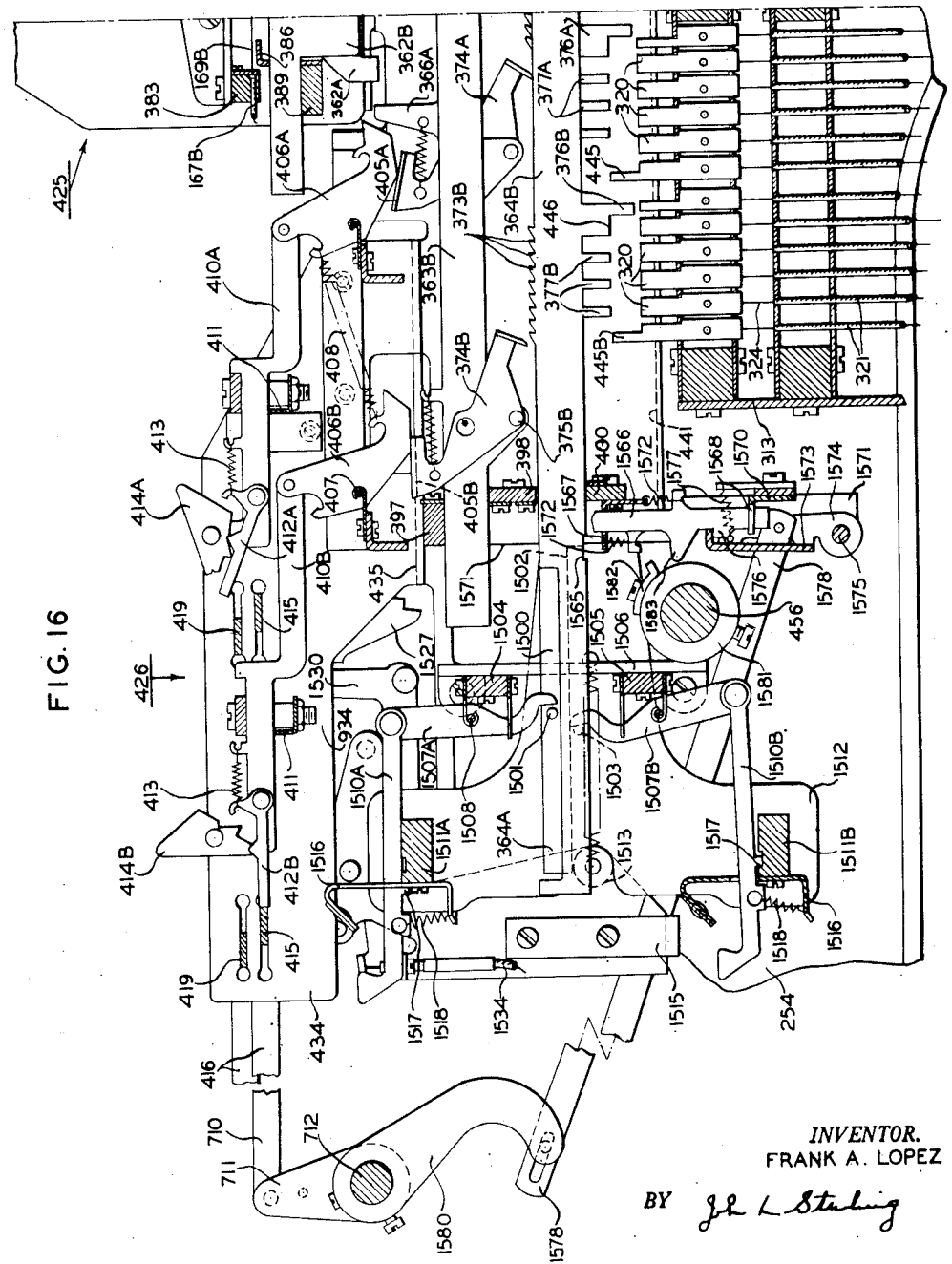

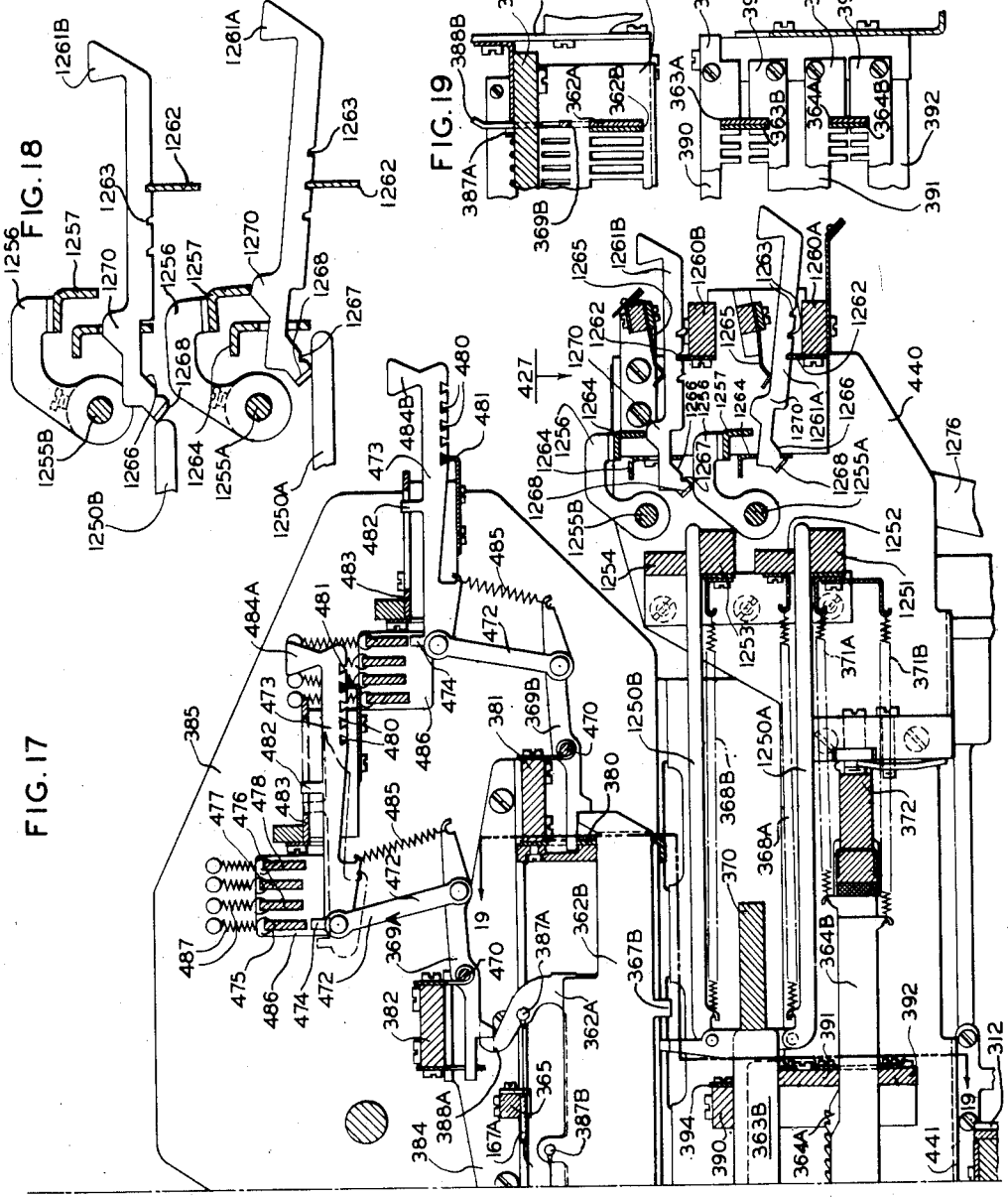

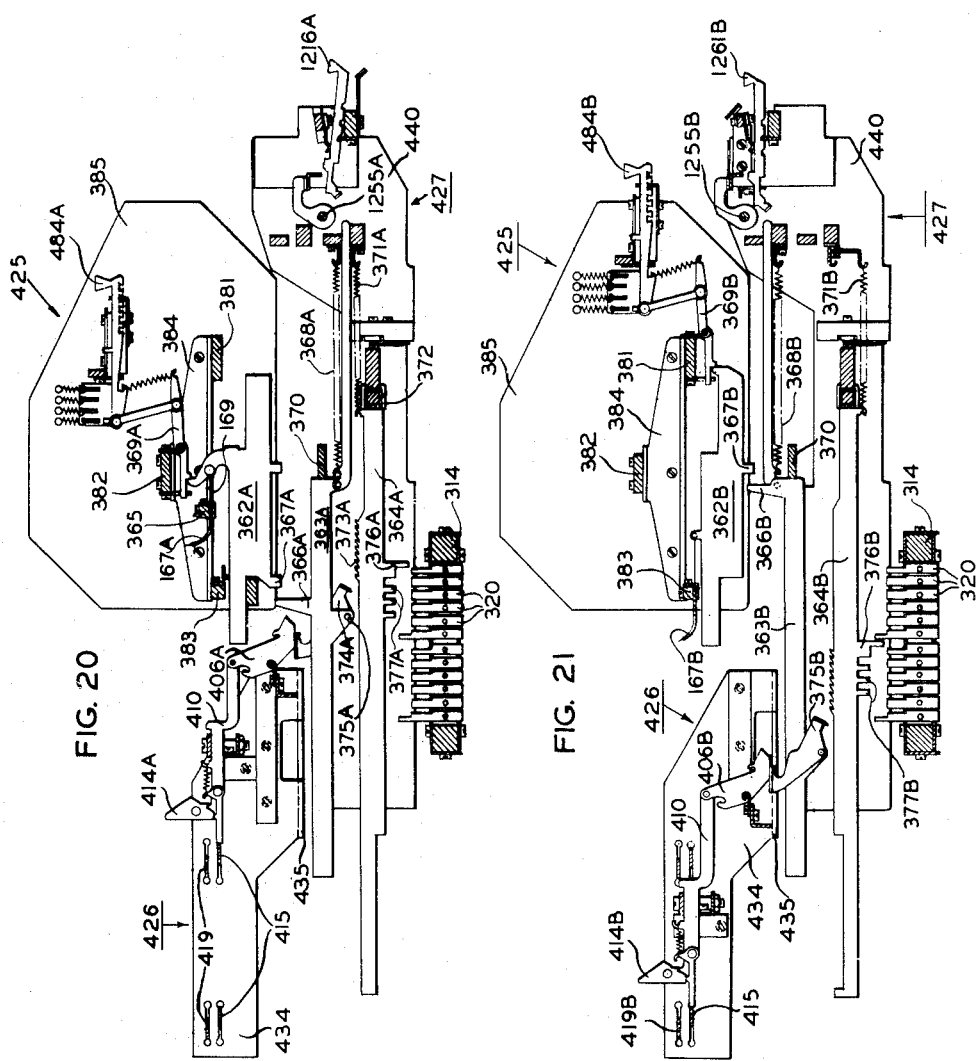

June 27, 1950     F. A. LOPEZ     2,512,865
COMBINED TABULATOR AND SUMMARY PUNCH, AND
ESPECIALLY THE CONTROLS THEREFOR
Filed Sept. 1, 1948     24 Sheets-Sheet 14
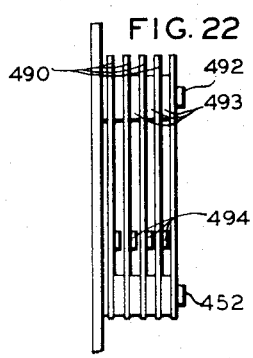
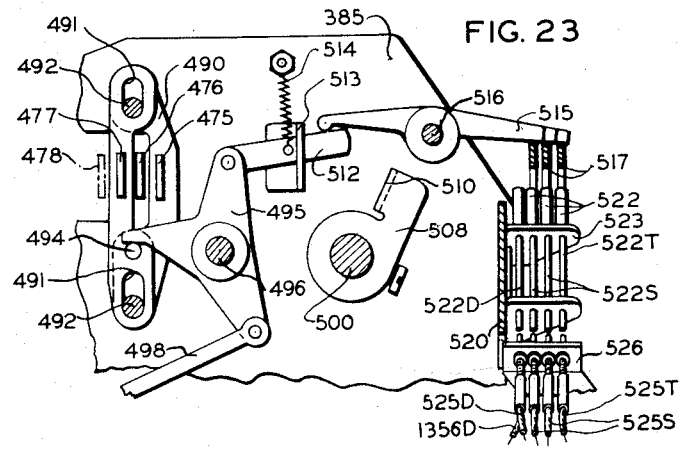
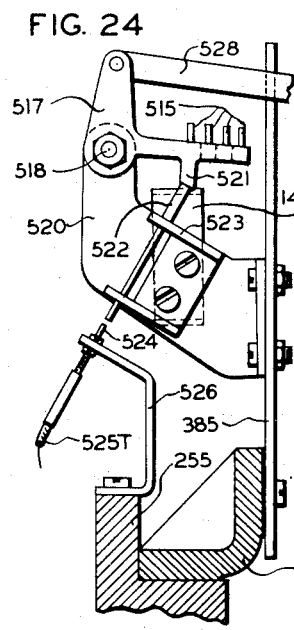
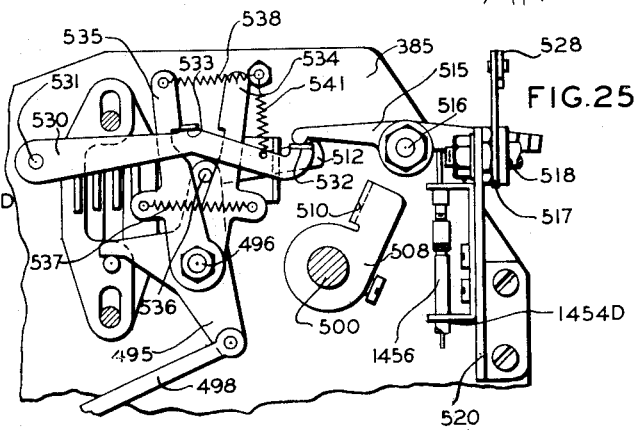
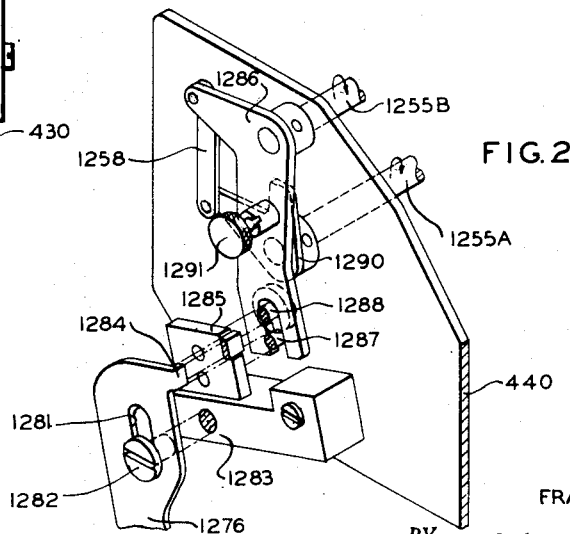
*INVENTOR.*
FRANK A. LOPEZ
BY *John L. Sterling*
ATTORNEY

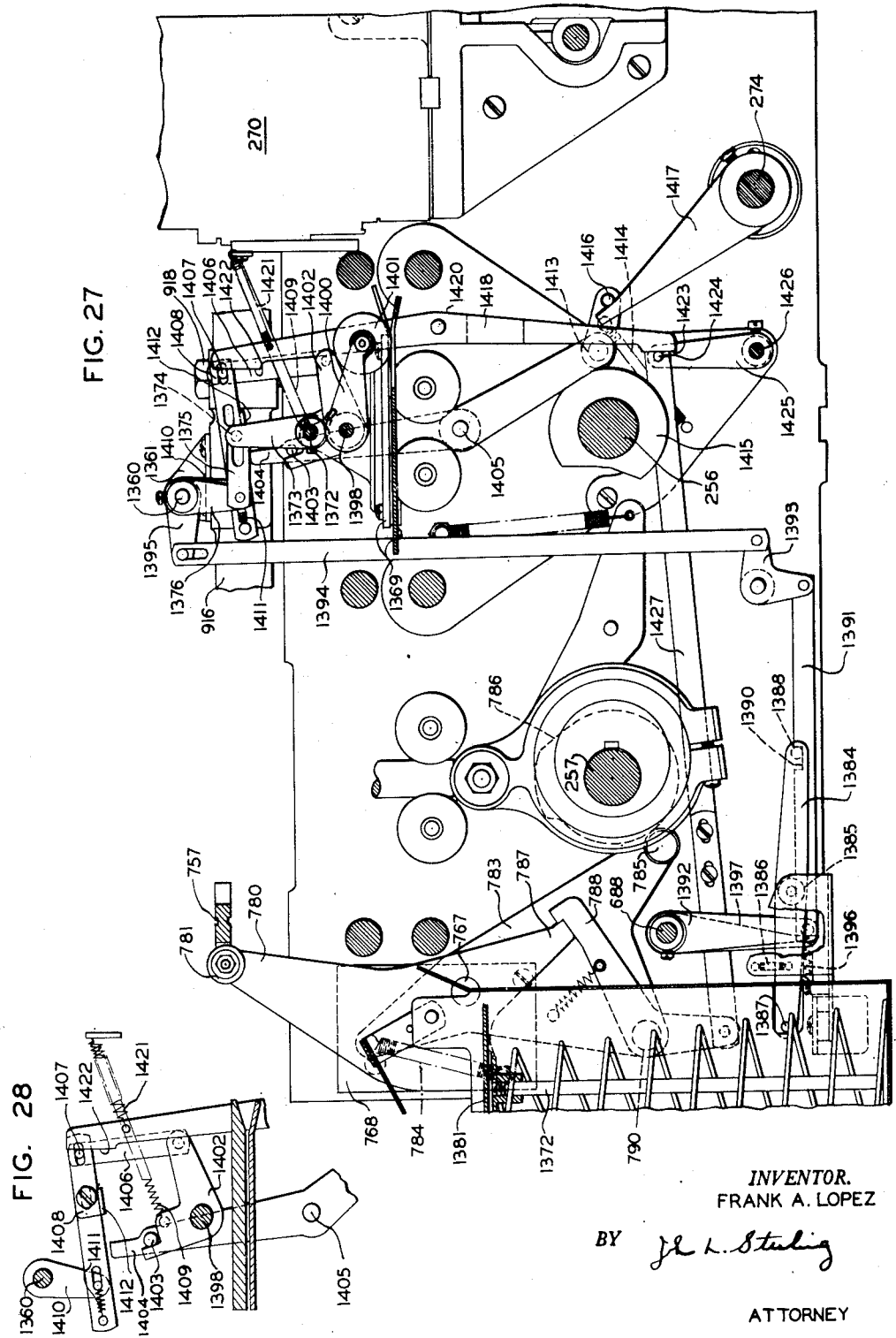

June 27, 1950
F. A. LOPEZ
2,512,865
COMBINED TABULATOR AND SUMMARY PUNCH, AND
ESPECIALLY THE CONTROLS THEREFOR
Filed Sept. 1, 1948
24 Sheets-Sheet 16
FIG. 29
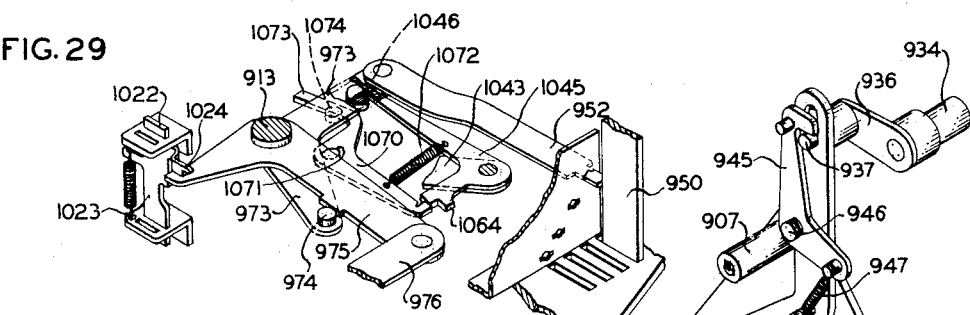
FIG. 30
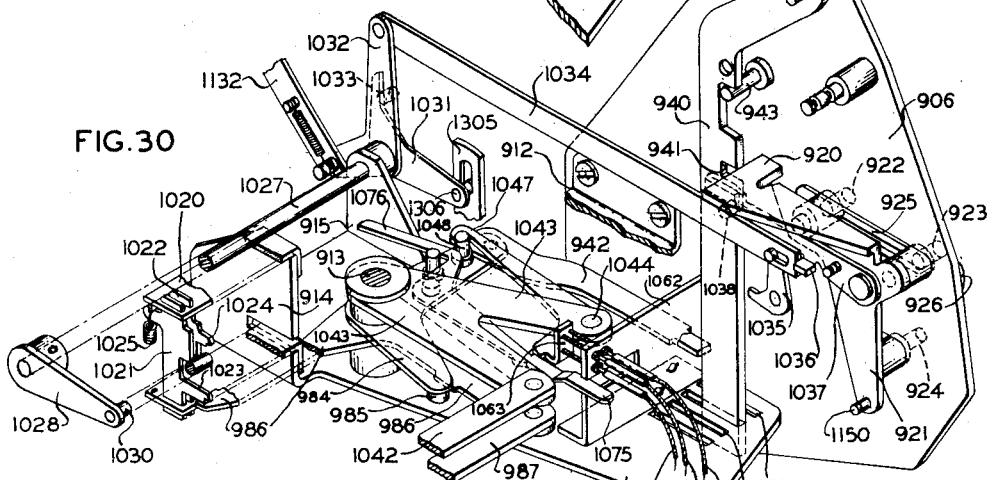
FIG. 31
FIG. 32
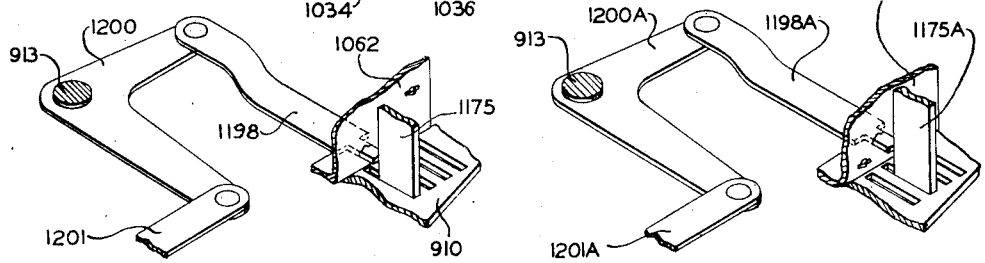
FIG. 33
FIG. 34
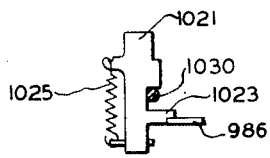
*INVENTOR.*
FRANK A. LOPEZ
BY  *John L. Sterling*
ATTORNEY

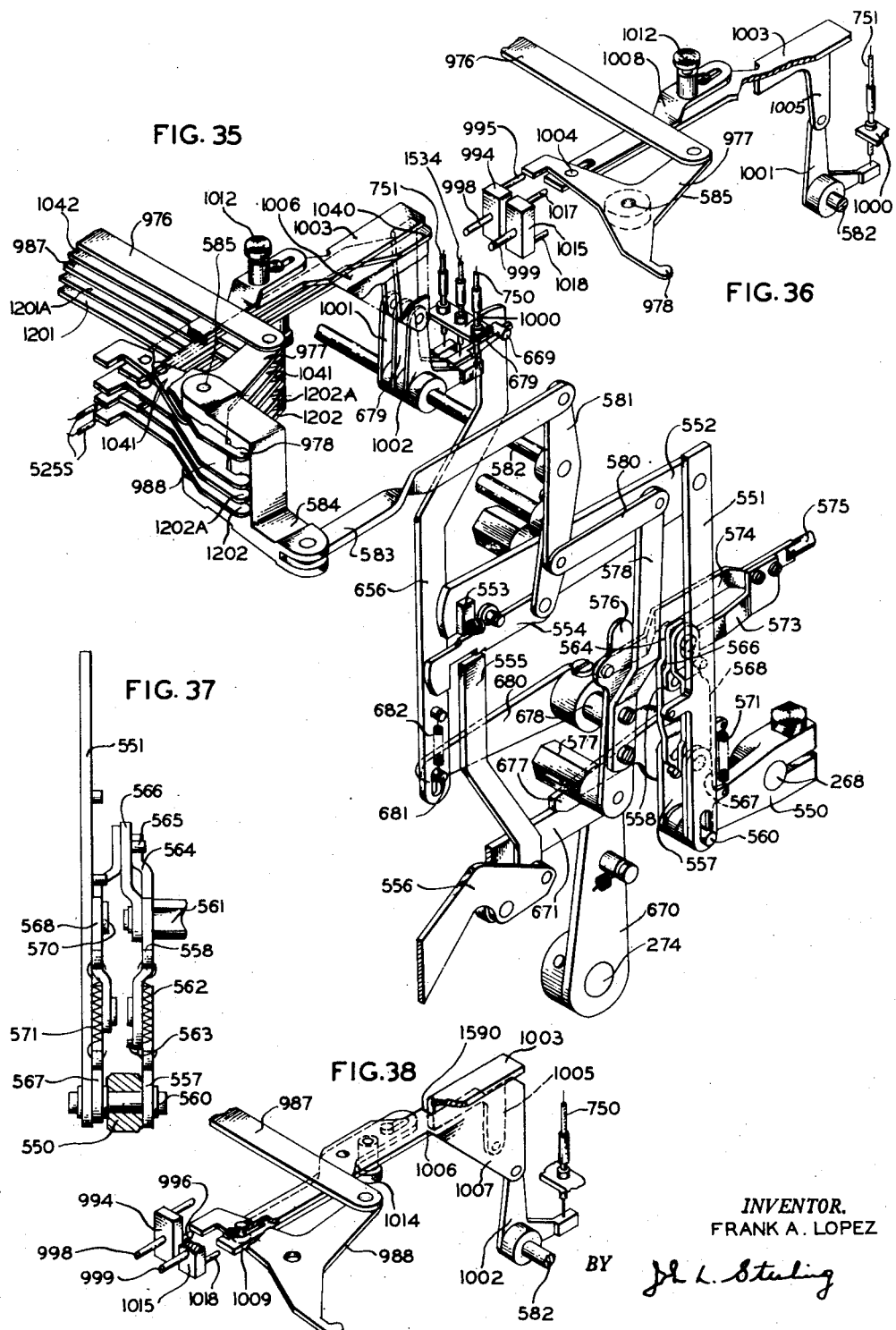

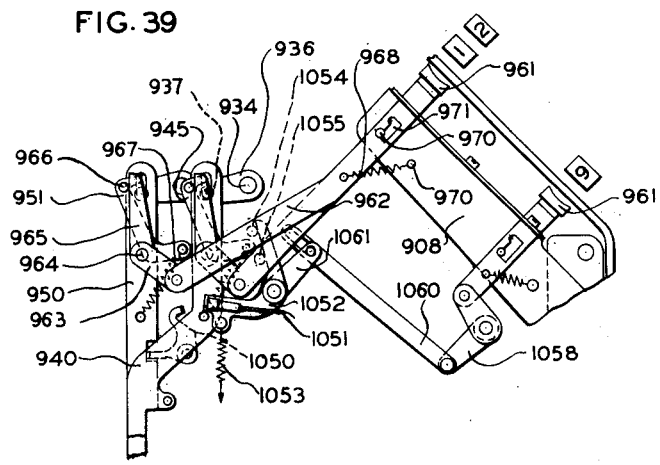
FIG. 39
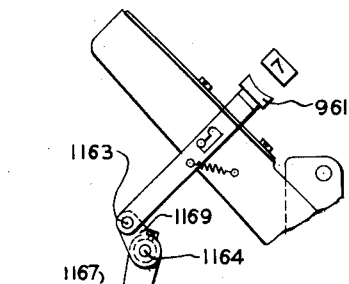
FIG. 40
FIG. 41
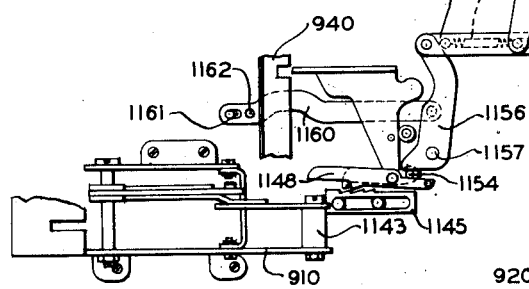
FIG. 42
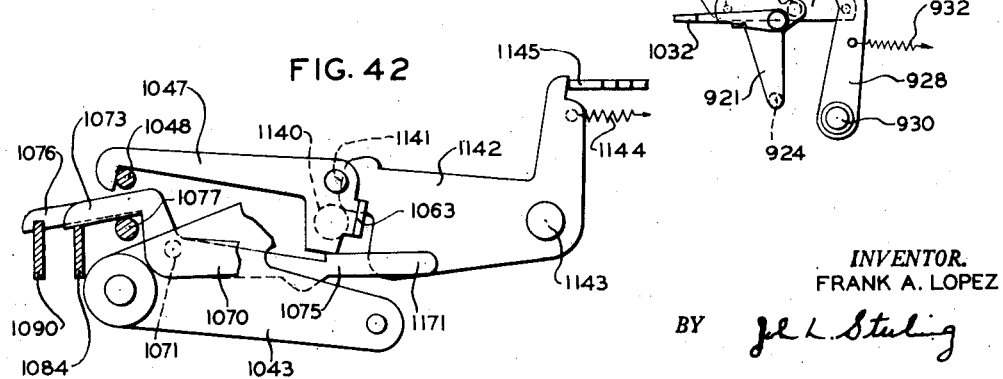
INVENTOR.
FRANK A. LOPEZ
BY *[signature]*
ATTORNEY

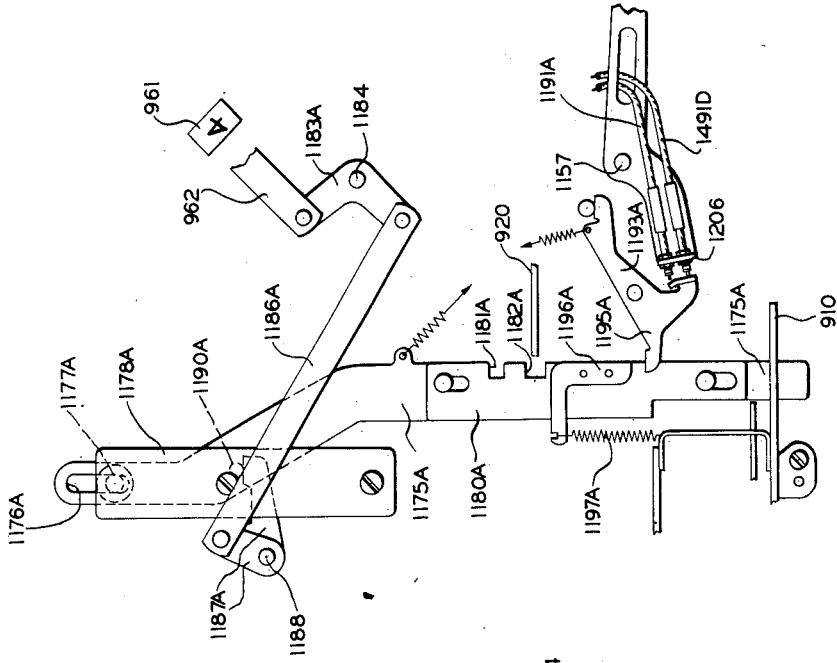
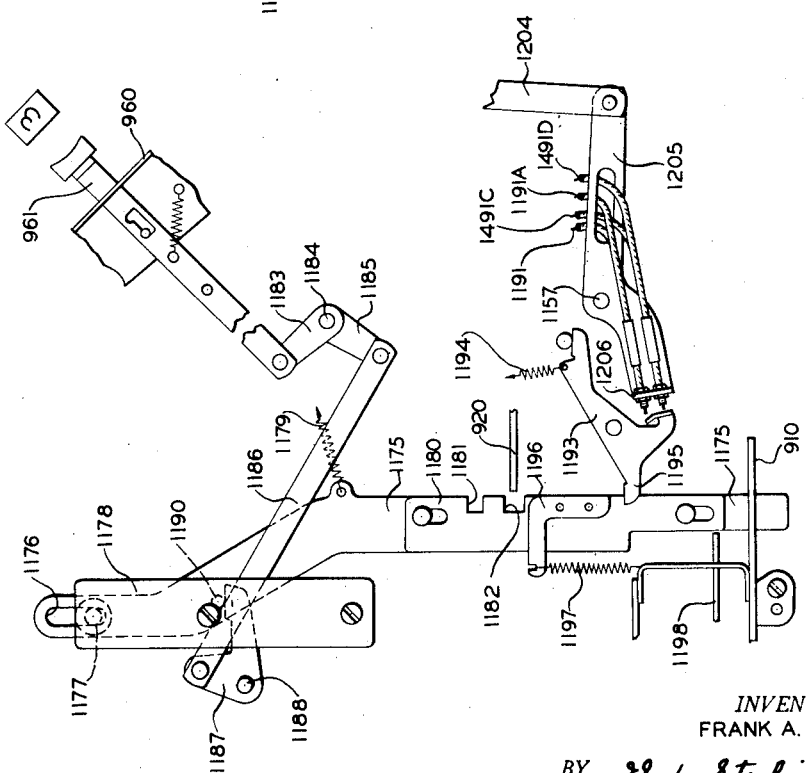

June 27, 1950  F. A. LOPEZ  2,512,865
COMBINED TABULATOR AND SUMMARY PUNCH, AND
ESPECIALLY THE CONTROLS THEREFOR
Filed Sept. 1, 1948  24 Sheets-Sheet 20

INVENTOR.
FRANK A. LOPEZ
BY *JL L Stulig*
ATTORNEY

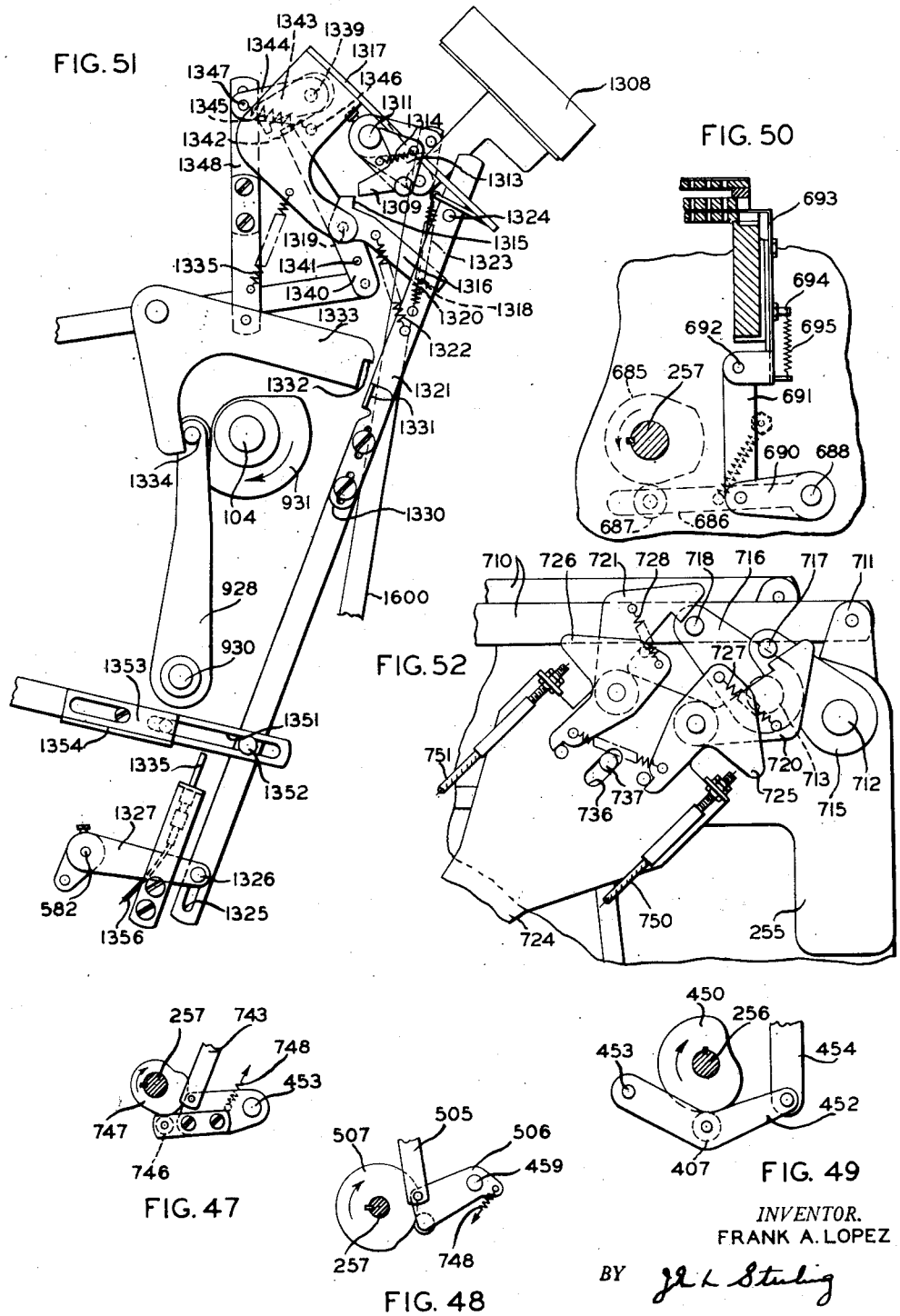

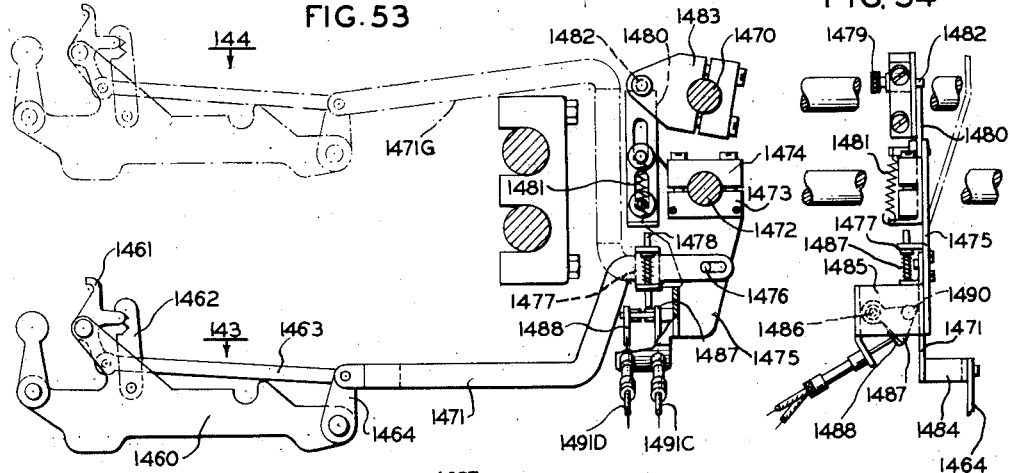
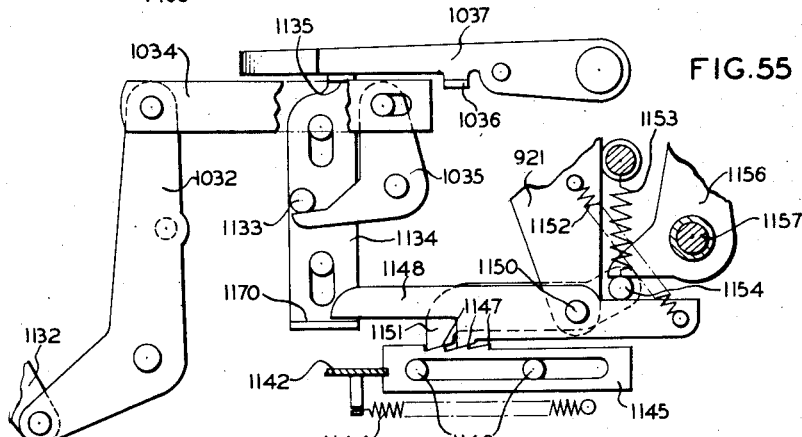
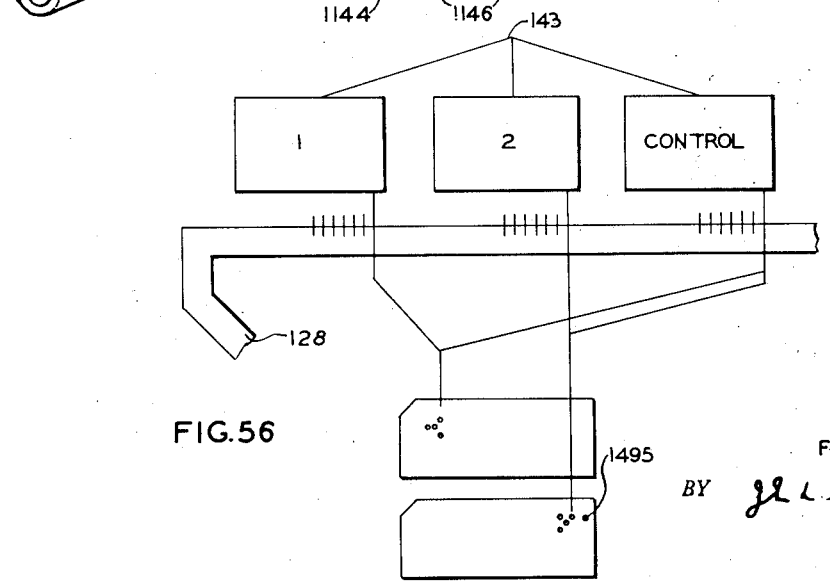

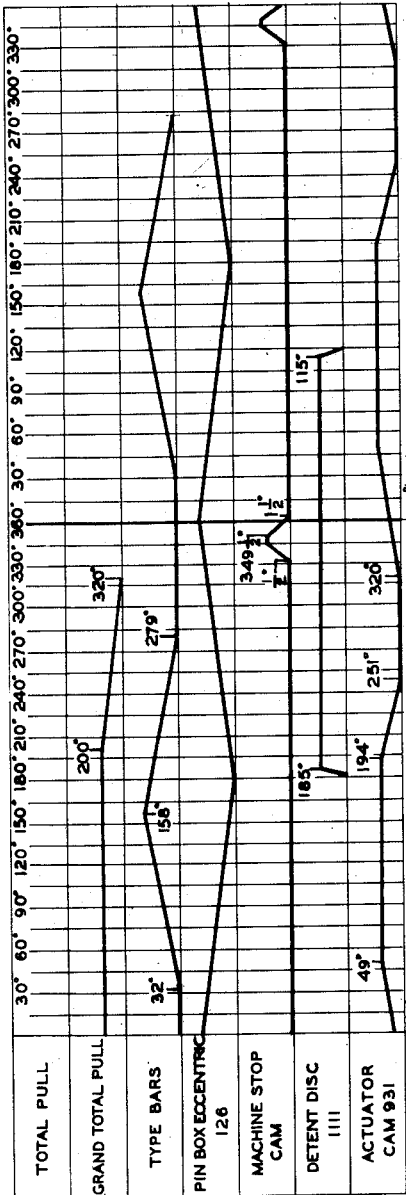
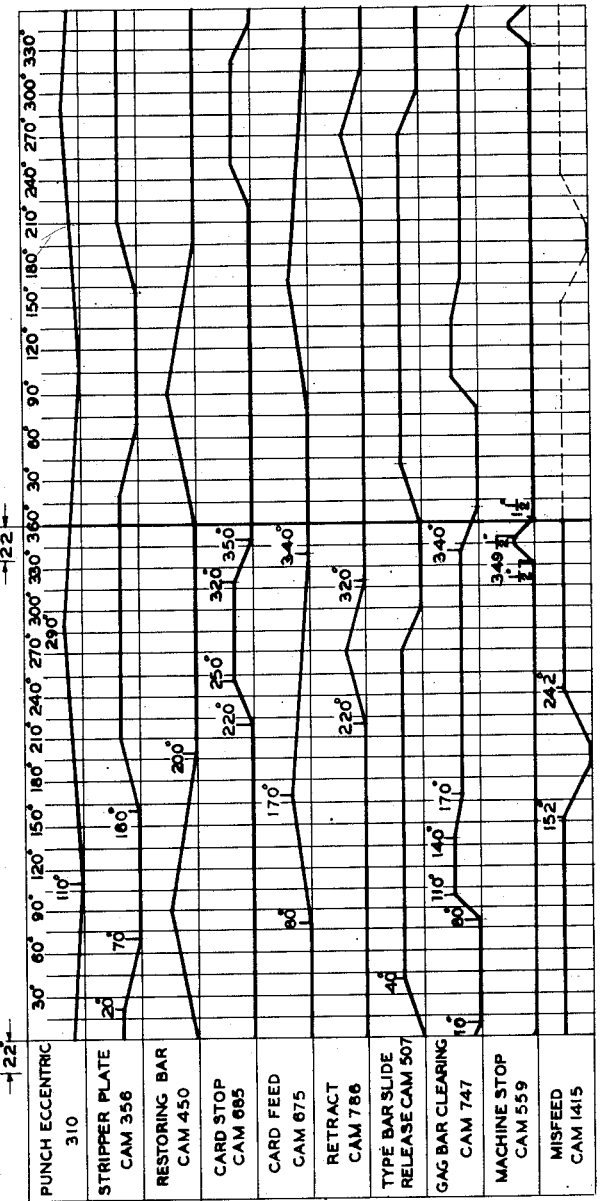
FIG. 58

Patented June 27, 1950

2,512,865

UNITED STATES PATENT OFFICE 2,512,865

COMBINED TABULATOR AND SUMMARY PUNCH, AND ESPECIALLY THE CONTROLS THEREFOR

Frank A. Lopez, Williston Park, N. Y., assignor to Remington Rand Inc., New York, N. Y., a corporation of Delaware Application September 1, 1948, Serial No. 47,208

81 Claims. (Cl. 235—61.1)

This invention relates to a combined summary punch and tabulator, though some of its features are applicable or adaptable to other machines.

Machines of this class are known and in such known machines it is common to include means whereby the punching mechanism is controlled in its operation by the tabulating mechanism; and such means have been made pre-settable by hand so as to cause the two machines to cooperate in different ways to secure different results appropriate to different classes of work.

It is the principal object of the present invention to provide new and improved controls whereby the operation of the punch may be controlled from the tabulator both better than heretofore and also in new respects, and whereby the punch also controls the operation of the tabulator in certain respects.

The invention has ancillary objects which will appear in the course of the description.

The invention consists in certain features of construction and combinations and arrangements of parts, all of which will be fully described hereinafter and particularly pointed out in the claims.

These include new and improved means for setting the punching mechanism into operation preparatory to the taking of a total or grand total or both by the tabulator and for controlling the number of cycles through which the punch operates, this number varying from one to three or more according to the results desired. It also includes means to cause the punch to operate, and to set up for punching amounts taken from item cards independently of a total taking operation. Means are also provided to prevent the punching of a summary card under certain conditions. Means are also provided for stopping both mechanisms in case of some misoperation of one of them. A keyboard is provided for the more convenient and less confusing setting of the mechanism for various functions and combinations of functions. Novel means are provided whereby the operation of the punch may be varied in dependence on the state of an accumulator of the tabulating mechanism at the time.

The invention also includes other devices and combinations which will appear in the course of the description.

One specific instance of the invention is illustrated in the accompanying drawing, in which Figs. 1, 3, and 4 together constitute a general sectional view of the tabulating machine, Fig. 1 showing the upper part, Fig. 3 the middle part, and Fig. 4 the lower part of the machine;

Fig. 2 is a detail;

Figs. 5 and 6 together constitute a front view of the punch and the left hand portion of the tabulator and the connections between the two, some parts being omitted;

Fig. 7 is a general left hand side elevation of the punch;

Fig. 8 is a detail;

Fig. 9 is a general side elevation showing a certain control unit attached to the left hand side of the tabulator;

Fig. 10 is a detail;

Fig. 11 is a view the same as Fig. 9 but stripped of movable parts to show the framework of the control unit;

Fig. 12 is a view of the drive gear mechanism of the punch;

Fig. 13 is a rear elevation of the punch with parts broken away, the left hand side showing the rear of the punch and the right hand side being a vertical section through the mechanism. Many parts are omitted from this view;

Fig. 14 is a front to rear sectional view through the lower portion of the punch with parts omitted;

Fig. 15 is a fragmentary view of a portion of one of the control means;

Figure 4:
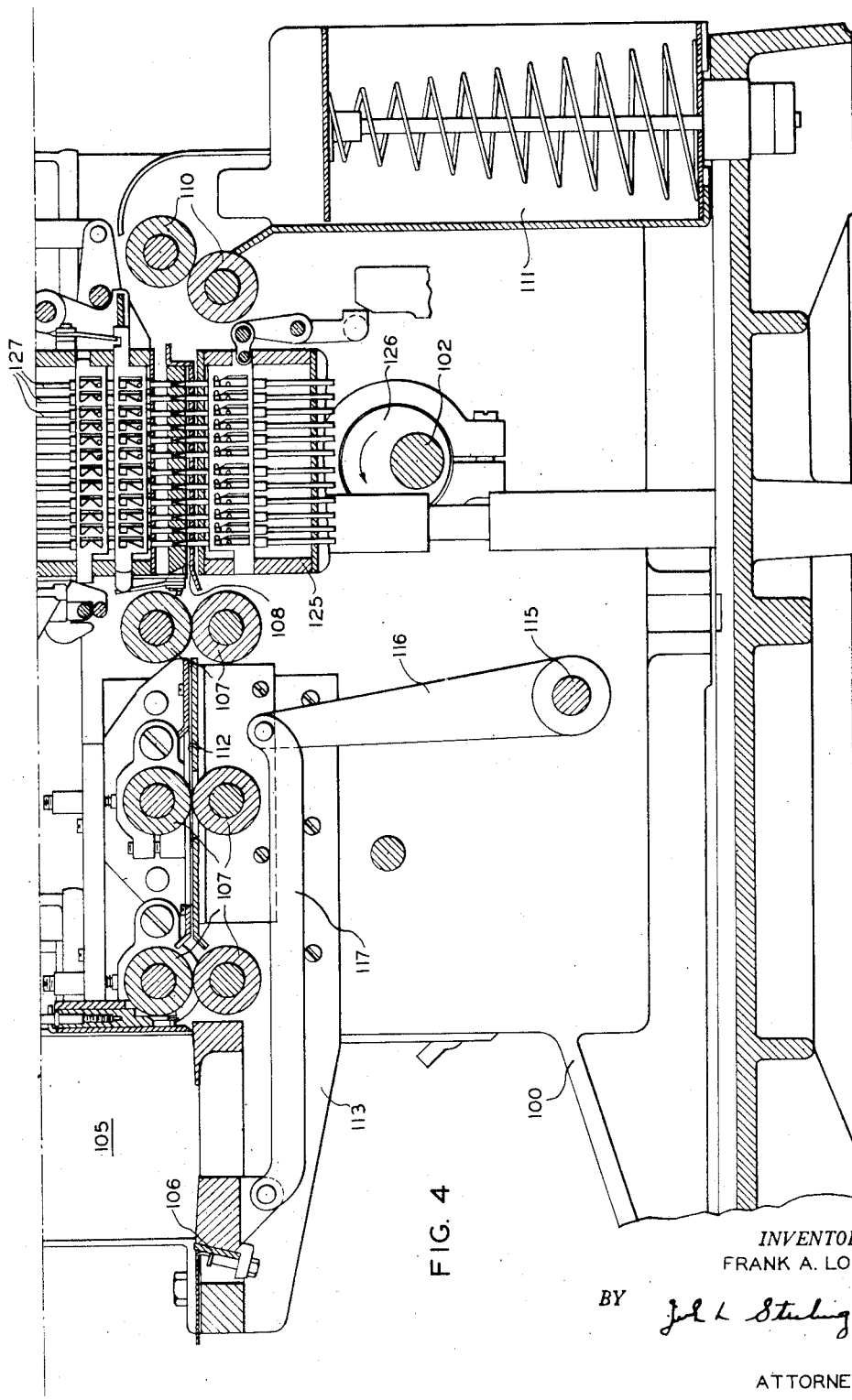
Figure 45:
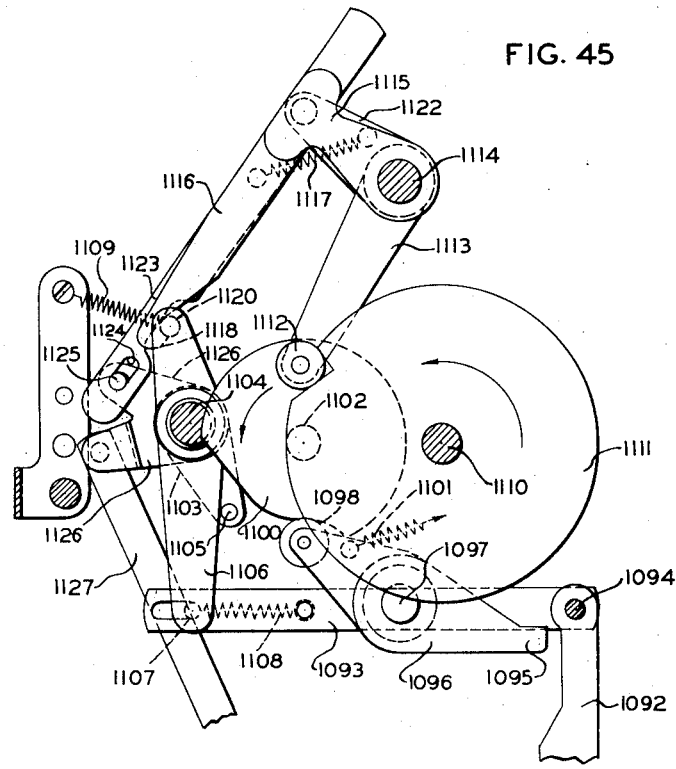
Figure 46:
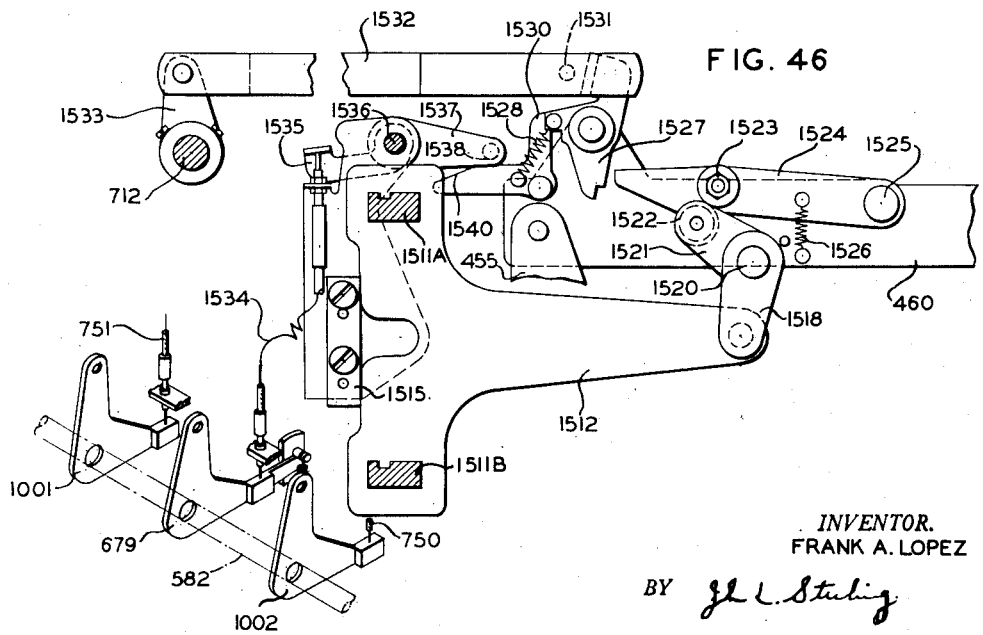
Figure 57:
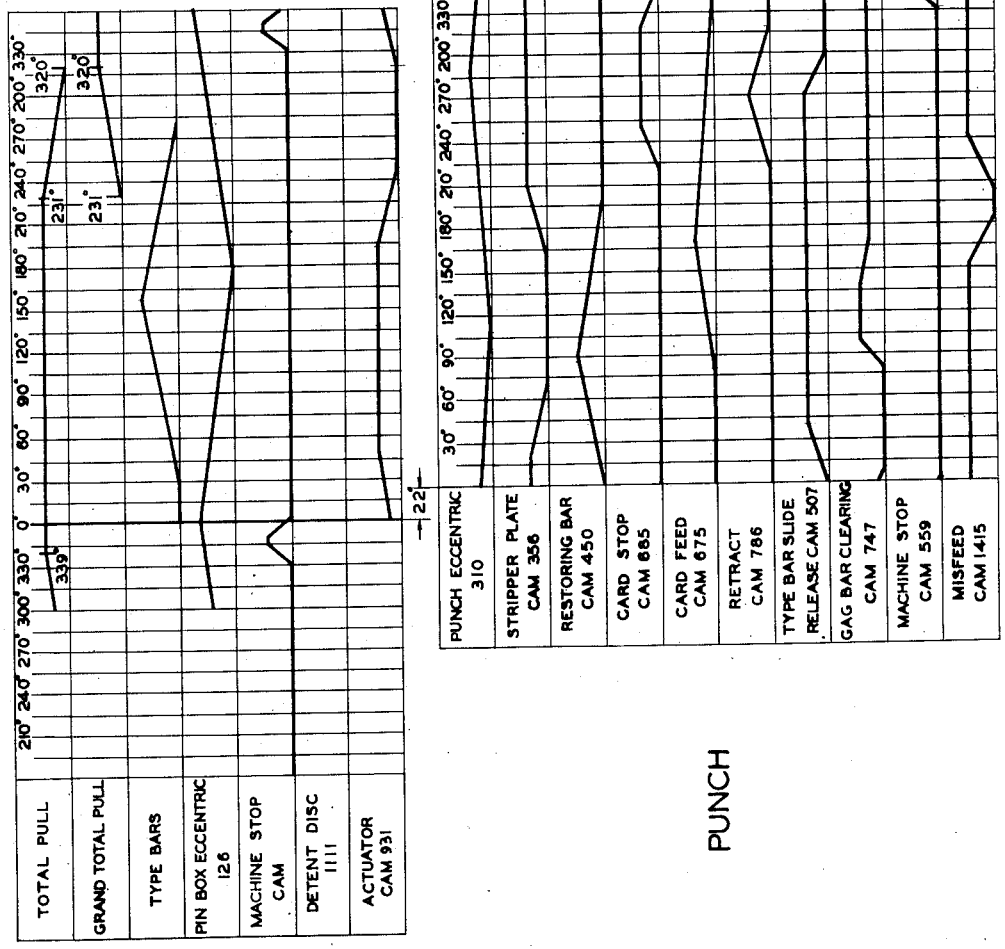

Figs. 16 and 17 together constitute a front to rear vertical sectional view through the punch with various parts omitted;

Fig. 18 is a fragmentary detached view on a somewhat larger scale of certain devices shown also in Fig. 17;

Fig. 19 is a fragmentary sectional view about on the line 19—19 of Fig. 17, and looking in the direction of the arrows on said line;

Figs. 20 and 21 are sectional views through the head of the punch illustrating the set-up slides therein, these slides being in two forms, one shown in Fig. 20 and the other in Fig. 21;

Figs. 22–25, inc., are illustrations of the devices for selectively releasing the type bar slides of the punch;

Fig. 22 is a fragmentary rear elevation;

Fig. 23 is a left hand view with certain parts removed or sectioned away so as to disclose those behind them;

Fig. 24 is a fragmentary front elevation;

Fig. 25 is a left hand side elevation showing some of the parts shown in Fig. 23, but including those that were sectioned away in Fig. 23;

Fig. 26 is an isometric view of portions of a certain card feed lock, and the means for operating it;

Fig. 27 is a partial front to rear section of the punch but with many parts omitted;

Fig. 28 is a fragmentary view of some of the parts shown in Fig. 27, but partially hidden in said Fig. 27;

Fig. 29 is a fragmentary isometric view of a portion of the mechanism controlling grand total punching;

Fig. 30 is an isometric view of some of the parts of the control unit mounted on the tabulator, those shown being most of the parts having to do with the punching of a group total;

Fig. 31 is a fragmentary plan view partly in section of a certain actuator and associated parts;

Figs. 32 and 33 are fragmentary isometric views showing portions of the control unit not directly associated with total taking;

Fig. 34 is a detail;

Fig. 35 is an isometric view of the control devices in the punch which are immediately operated from the control unit in the tabulator, and including also certain starting and stopping devices and card feed devices controlled thereby;

Fig. 36 is a fragmentary isometric view showing detached one of the linkages included in Fig. 35;

Fig. 37 is a fragmentary front view of the toggle mechanism which controls the clutch of the punch;

Fig. 38 is an isometric view showing detached one of the linkages included in Fig. 35;

Fig. 39 is a fragmentary view showing a portion of the control keyboard and certain devices controlled therefrom;

Fig. 40 is a fragmentary left hand elevation showing the control actuator and a certain train of devices controlled by one of the keys of the keyboard;

Fig. 41 is a fragmentary side elevation on a small scale of the control actuator and the cam whereby it is operated;

Fig. 42 is a plan view of a portion of Fig. 40;

Fig. 43 is a detached side view of one of the interponents included in the control unit together with the associated keyboard key and certain other controls therefor;

Fig. 44 is a similar view of another and similar interponent and its associated parts;

Fig. 45 is a fragmentary left hand view of certain parts in the paper feed mechanism of the tabulator;

Fig. 46 is a fragmentary side view of certain parts on the left hand side of the punch as viewed from the right, all other parts being omitted;

Figs. 47, 48, 49, and 50 are diagrammatic views of some of the cams in the punch, together with their followers;

Fig. 51 is a fragmentary view from the left, illustrating the hand operated starting mechanism of the punch;

Fig. 52 is a fragmentary left hand side elevation of a portion of the mechanism for clearing the gag bars;

Fig. 53 is a fragmentary view of the interior of the tabulator and illustrating the means for controlling the punch from an accumulator;

Fig. 54 is a front view of Fig. 53;

Fig. 55 is a fragmentary view in right hand side elevation of certain of the control devices;

Fig. 56 is a diagrammatic illustration of the wiring in the tabulator associated with one of the controls; and Figs. 57 and 58 together constitute a timing diagram of the combined machine.

TABULATOR

In the illustrated instance of the invention the tabulator is constructed substantially as described in the patent to Mueller 2,381,361, dated August 7, 1945, except for some slight changes which will be described herein. With similar exceptions, the punch is substantially as described in the prior pending application of John Mueller for patent for Combined Tabulator and Summary Punch, filed June 10, 1948, Serial No. 32,156, and nothing disclosed in the said Mueller application is claimed per se herein. In the drawing, Figs. 1, 3, and 4 together constitute a general front to rear vertical section of the middle part of the tabulating machine. Said machine comprises a base section and a head section whose left hand side frame pieces are shown respectively at 100 and 101. The mechanism includes a main base drive shaft 102, a rear head drive shaft 103, and a front head drive shaft 104, said shafts rotating in the directions indicated by arrows. Cards stacked in a hopper 105 are fed by a picker 106 and feed rolls 107 into a sensing chamber 108 and from thence through rolls 110 to a receptacle 111. For reasons to appear hereinafter, the hopper 105 has been moved frontward to a more convenient position, the two forward pairs of feed rolls shown in Fig. 4 being added to feed the card through a channel 112. The hopper and these two extra pairs of feed rolls are mounted on a frame casting 113 suitably secured to the main frame 100 of the base. The rear pair of rolls 107 are the same as in the patent and the shaft of the lower roll drives the shafts of the forward two rolls through idler gears (not shown). The picker 106 is operated by the usual rock shaft 115, arm 116 and link 117, the last having been made longer than before.

The sensing pin box 125 is reciprocated up and down by eccentrics 126 shown in Fig. 4 in stopped position, that is to say, approximately at its upper dead center with the sensing pins at the top of their stroke; and it is from this position that degrees of cycle are measured on the time chart. The set pins 127, the translator or wiring unit 128, the Bowden wires 130 therein, the permutation bars 131 and type bar stops 132, are all as described in the patent. The change of designation mechanism 133 initiates operation of the regular total taking control unit as described in the patent.

The type bars 135 have lower brackets 136 and upper brackets 137 which are guided on guide rods 138 and pressed upward by springs not shown. They are restored to, and restrained in, their depressed position by a universal restoring bar 140 which is reciprocated up and down at the times indicated on the time chart. The upper part of each type bar carries a set of types 139 including the ten numerals and the twenty-six letters of the alphabet for printing on the platen 142.

The type bars 135 have on their forward edges rack teeth to actuate one or more lower accumulators 143 and one or more upper accumulators 144, said accumulators being mounted respectively on a lower transverse frame bar 145 and an upper bar 146. In this machine, as now manufactured, there is across the machine provision for a continuous series of one hundred type bars 135, and in assembling the machine for a particular customer, group total accumulators 143 and grand total accumulators 144 are mounted on the bars 145 and 146 in whatever letter space positions the customer's work requires or makes desirable. An accumulator can be mounted on either of these bars at any desired position lengthwise of the bars. In most instances, wherever the customer wishes to locate an adding column, two accumulators are mounted, one directly above the other so that numbers printed in that column will be added on or subtracted from both accumulators. The total taking control mechanism is so designed that when running off a succession of groups of cards, at the end of each group the machine will automatically take a group total from the lower accumulator 143, leaving the amount still registered on the upper accumulator. At the end of the tabulation of the last group of the set, the mechanism first takes the group total of said last group from the lower accumulator and then immediately takes from the upper accumulator a grand total of all the groups of cards, all as explained in detail in the above cited patent.

As will appear hereinafter, the set-up of amounts to be punched is taken from the bars 135; and for brevity and uniformity of nomenclature, they are herein called type bars.

The accumulators may be adapted solely for addition but those shown in the drawing are adapted for both addition and subtraction. In each order there are two intermeshing pinions, namely, a lower adding pinion 150 and an upper subtracting pinion 151. In Fig. 3 these pinions are shown so disposed that if the accumulator be moved bodily rearward the lower or adding pinions will come into contact with the racks; but the relative positions of the two pinions can be reversed, that is to say, the lower pinions can be pulled toward the front of the machine and the upper pinions pushed toward the rear of the machine so that when the accumulator is moved rearward into mesh, the racks will be engaged by the upper or subtract pinions.

The accumulators include means to yield algebraic totals, that is to say, positive results appear in their true amounts on the lower wheels 150 and negative results appear in their true amounts on the upper wheels 151; and on a total taking operation the machine automatically sets the lower or upper pinions into position for engagement depending on whether the balance is positive or negative.

The drawings show some of the mechanism of the accumulators and of the means whereby they are set for adding and subtracting and of the means whereby they are thrown into and out of mesh with the racks, but all of this is fully described in the Mueller patent and is immaterial to the present invention. This mechanism and the other mechanisms of the machine will be described only in so far as is necessary for an understanding of the present improvements and additions thereto.

In the tabulating machine to which the invention is shown applied, each type bar 135 carries thirty six types 139 whose spacing up and down the bar is half that of the spacing of the rack teeth which actuate the accumulators. The topmost type is the zero followed by a letter of the alphabet, then, "1," a letter, "2," a letter, "3," a letter, and so on. In other words, letter types and numeral types are interspersed with one another in the upper half of the set of types, so that nine spaces of the rack teeth equal eighteen type spaces, the "9" type being at about the middle of the series of types and the numerals or digits being all in the upper half of the bar; and type bars that are set at numerical values do not rise above about half their maximum stroke. All of the types below the middle are letter types.

*Type bar sensing mechanism*

Figure 5:
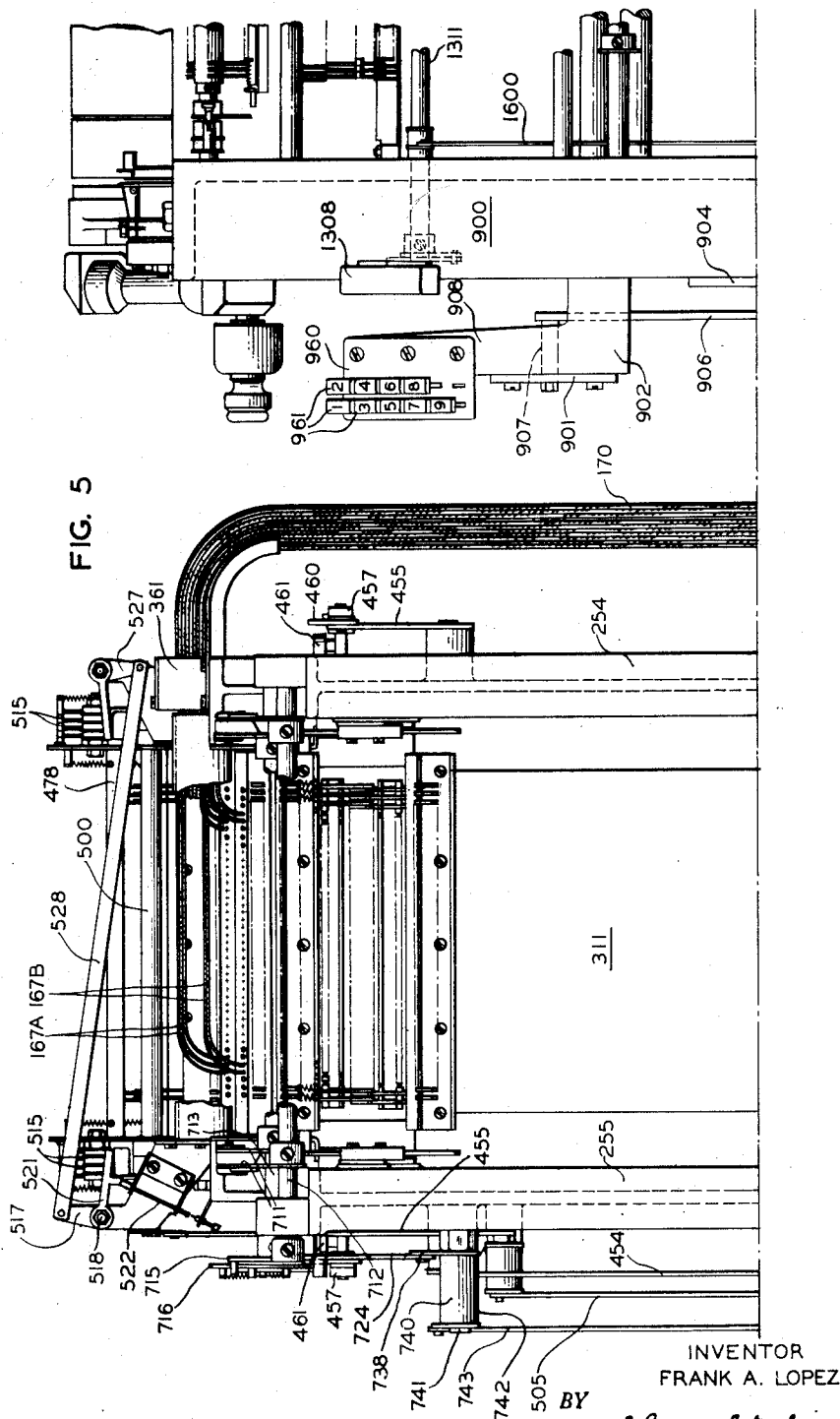

Each type bar 135 or at least each one whose setting ever has to be transmitted to the punch has cooperating therewith a sensing lever 160 (Fig. 3) pivoted at 161 and, when operated, spring operated counter-clockwise, this movement under such spring pressure being limited by contact of the rear end of said lever with the bottom edge of the type bar. The lever shown in Fig. 3 is in its initial position but if the type bar rises to the extent of 1, 2, 3, etc., to 9 units or tooth spaces, the lever can follow it until arrested by the type bar. This lever is in the form of a bell-crank whose downwardly extending arm 162 contacts with the square end of a slide 163 which is mounted and guided in comb plates 164 and 165. These slides 163 communicate their settings to the punch by Bowden wires. It will be convenient herein to distinguish between the inner wire and its outer flexible casing, and accordingly the former is herein called the wire, and the assembly of wire and casing is called a "Bowden." The front end of the slide 163 has a head 166 (Fig. 2) to which there is tightly clamped the end of the inner wire 169 of a Bowden 167. The casings of these Bowdens are secured to the plate 165. There is, of course, in the full machine a long series of these Bowdens to the number of 100. Back of the plate 165 they are suitably curved and extended into a bundle 170 leading through a hole in the side frame 101 and over to the punch machine (Figs. 5 and 6). When the latter is in operation, such of the Bowden wires as are required in that particular operation are placed under spring tension tending to pull the slides 163 toward the rear of the tabulating machine and to cause the levers 160 to move counterclockwise until each is arrested in some numeric position by its associate type bar, so that the spring tension tending to rock the sensing levers 160 comes through the Bowden wires from the punching machine. Even when the tabulator is equipped with the full set of one hundred Bowden wires, only those are pulled which are released to be moved by their springs in the punching machine, as will be explained hereinafter. Thus, if there is only one adding column of nine places and the operation consists of setting up the total in the punch, then only those nine slides 163 and sensing levers 160 will be operated on that particular cycle.

The bell-cranks 160 and slides 163 are restored to normal position by the bar 171 of a bail whose arms 172 are pivoted a little forward of the pivot 161 of the sensing levers 160. A spring 175 acting on upward extensions 174 of the arms 172 tends to swing the bail counter-clockwise. This restoring bar is operated by the restoring bar 140 for the type bars themselves. A rearward branch of each arm 172 pushes upward, by the spring 175, on a plunger 176 engaged by a roller 177 on said arm. The plunger 176 is guided in a suitable bracket 181. The upper end of the plunger has a rearward extension 188 with an adjusting screw 190 adapted to engage the restoring bar 160. When the latter rises the plunger follows it for about the first half of its up stroke and until arrested by shoulder 191 on the plunger engaging the bracket 181. The plunger is depressed to operate the restoring bar and restore the sensing levers 160 during the latter half of the down stroke of the restoring bar 140.

As shown, the sensing levers 160 and their associated parts are constructed as a unit assembly, the stationary frame work of which consists essentially of a long casting comprising two bars 192 and 193 connected together by end brackets 194, all cast integrally. The rear bar 192 lies directly beneath the lower accumulator supporting bar 145 to which it is secured by screws at 195. The slides 163 lie beneath the bar 192 and above the bar 193, extending forward at an upward inclination, the guide comb 164 being secured to the bar 192 and the forward guide plate 165 to the bar 193 and the front ends of the brackets 194.

The bar 192 has along its rear edge a shoulder or flange 197 to which a series of pivot blocks 198 for the levers 160 are secured.

The wires 169 are secured to the slides 163 in the manner shown in Fig. 2. Slidably mounted on slide 163 is a head piece 166 to which the wire is secured by a clamp 204. The effective length of said wire is adjusted by two adjusting screws 206 connecting the head piece 166 with the slide 163.

THE PUNCHING MACHINE

Base

The framework comprises a foot piece 251 consisting of a casting with a flat top and four legs (Fig. 6) and a base frame comprising a right hand side plate 252 and a left hand side plate 253, each consisting of an ordinary vertical web surrounded by flanges (Fig. 7). These two uprights are bolted to the foot piece 251 at their bottoms and are connected by certain frame members in their upper parts. Surmounting said side pieces is a frame comprising a right hand upright member 254 and a left hand upright side member 255 (see also Fig. 6), each comprising flanged edges of the usual construction. In the base section are a front cam shaft 256 and a rear cam shaft 257 (Figs. 7 and 14). These shafts are driven in the same manner as in former machines, namely, in the right hand box-like frame 252 (Fig. 12) is a worm shaft 260 driven from an electric motor by belt 261 and having thereon the usual worms for driving the two shafts 256 and 257, and also worms for driving feed roll shafts 262. This whole drive mechanism is so familiar in these machines that it seems unnecessary to describe it further. The worm shaft 260 is controlled by a clutch 265 which is engaged by a spring 266 and is disengaged by a yoke 267 fast on a rock shaft 268, all as is usual in these machines. The controls for this rock shaft 268 will be described hereinafter. The clutch is, of course, opened by rocking said shaft clockwise in Fig. 12.

Summary cards to be punched are fed as usual in these machines from a hopper 270 (Fig. 14) by a picker 271 reciprocated through a link 272 and arm 273 fast on a rock shaft 274, to feed rolls 275 on shafts 262, which rolls convey it to a card chamber consisting of the space between the perforated die plate 277 and a perforated plate 278 for the punches 293. From this chamber the cards are fed by feed rolls 281 to a receptacle 282 in the usual manner.

The die plate 277 and the guide plate 278 are mounted on an irregular shaped casting 290. Said casting, as viewed from above, is of a general rectangular shape and, as seen from the end, it has the outline shown in Fig. 14. At its ends it has four projecting lugs 291 (Fig. 13) resting on and bolted to brackets of the side frames 252 and 253. The punches 293 (Figs. 13 and 14) are guided in the perforated plate 278 and in another plate 294, secured to the plate 278. At their upper ends, the punches are headed and pass through a stripper plate 295 which, however, is a movable part not fast on the casting 290.

Set pin unit

Above the casting 290 and the punches 293 is mounted a vertically reciprocating set pin box 296. This box has end castings 297 (Fig. 13) to which are screwed transverse sheet metal plates 298 (Fig. 14) which in turn support the horizontal guide plates of the set pins 300. The set pins work in the usual manner and when one of them is depressed it is locked down by the usual locking slide 301, there being two of these slides for each row of pins, one for the six upper zone pins and the other for the six lower zone pins; and the two are mounted one above the other so as to be separately operable for retracting purposes, all of which will be described hereinafter. This set pin box moves upward in order for its pins to be selectively set and locked down, and then downward when the pins so set force their punches through the card.

The set pin box 296 is reciprocated up and down as follows: The stationary casting 290 has at each end a bulge, bored vertically, to serve as a guide for a reciprocating rod 302 (Fig. 13). A little above the casting 290 this rod is reduced to form an annular shoulder, the rod then passing through a vertical hole in the end casting 297 of the set pin box and having on its end a nut 303. This nut bears down on a collar 304 which in turn bears on a washer 305 on top of the casting 297. The construction is such that when the nut 303 is tightened, the pressure, acting through the sleeve 304, and washer 305, forces the casting 297 firmly against the shoulder in the rod 302 thus rigidly mounting the set pin basket on the rod. The rod 302 terminates at its bottom in a squared end 306 from which projects a bearing stud 307 for the upper end of a pitman 308 actuated by an eccentric 310 fast on the rear cam shaft 257 (Fig. 14). There are, of course, two of these eccentrics and pitmans, one for each rod 302, and when the machine is in operation the pin box 296 reciprocates up and down continuously. As will be apparent from the timing diagram, its stop position at the end of a cycle is about midway of its down stroke; and it is in that position that the parts are shown in the drawing. When the machine is started the set pin box completes its down stroke, during which any set pin 300 that has been depressed and locked down will operate its associate punch 293. In the latter half of its upward motion the set pins will receive a new setting in a manner to be presently explained.

The wiring unit, designated generally as 311, is in the form of a rectangular box enclosed by right and left hand plates of sheet metal (Figs. 5 and 6). Its internal construction can be understood from Figs. 13 and 14, the former showing a fragmentary rear view partly in section of the lower part of the unit and the latter a cross section on a front to rear plane. The rear frame plate 312 and the front frame plate 313 have mounted between them at their upper ends (Fig. 16) a series of rows of plungers 320 adapted to be depressed by the gag bars as will presently be explained. Beneath said plungers are horizontal plates to support the upper ends of the casings of Bowdens 321 whose wires 324 are respectively depressed by the plungers 320.

In the specific machine illustrated, there are one hundred gag bars corresponding to the one hundred type bars in the tabulator; and there are, therefore, fifty front to rear rows of plungers 320, each row controlled by two gag bars, six plungers for each gag bar, as will be explained hereinafter.

The Bowden casings are secured in the same manner at their lower ends (Fig. 14) to two transverse perforated plates. These plates, however, comprise only forty five columns of front to rear rows of holes corresponding to the columns of the card to be punched.

The lowermost section of the wiring unit comprises a rectangular casting 333 to which the plates 312 and 313 are secured. On top of this rectangular frame is secured a guide plate 335 for the upper ends of a series of plungers 336 whose lower ends are guided in a bottom plate 337 secured to the casting 333. There is one of the plungers 336 directly beneath each Bowden wire, by which it may be depressed. Said plungers are pressed upward by springs 338 whose pressure is communicated through the Bowden wires to the plungers 320 which are thus normally held in their upper position.

The plungers 336 project beneath the bottom plate 337 of the wiring unit and each of them stands immediately above one of the set pins 300 hereinbefore described. The construction is such that if one of the plungers 320 be depressed by the gag bar, it will set the corresponding set pin 300 which will be held in its depressed or set position as hereinbefore described.

The bottom plate 337 of the wiring unit is extended beyond the casting 333 in right and left hand directions as shown in Fig. 13. The said projecting portions, constituting flanges which secure the unit in place in the machine, can be slid from the back of the machine into slots in rail bars 340 in the manner and to the effect familiar with wiring units in these machines. Fig. 14 shows one of the finger pieces 341 common in these machines to control a lock, which accurately positions and firmly secures the unit in the said rails 340. Said rails are rigidly mounted on top of the castings 297 of the set pin box so that the wiring unit reciprocates up and down with the latter. As shown in Fig. 13, said rails are mounted on blocks 342 which rest on the top of the castings 297, and screws 343 pass through the rails and blocks and are threaded into the castings.

In the stop position, the plungers 320 (Fig. 16) at the top of the wiring unit are out of contact with the gag bars and the set pins are not low enough to depress the punches. When the set pin box and the wiring unit move upward to the upper limit of their motion some of the plungers will be arrested by the gag bars with the result that the corresponding set pins will be set and locked by their locking slides 301; and when, thereafter, said parts are moved to their lowermost position, those set pins will push their corresponding punches through the card.

*Stripper plate*

In this machine, the stripper plate is mounted independently of the set pin box and is independently reciprocated (see Figs. 13 and 14). The stripper plate 295 is screwed to two transverse bars 345 which are secured at each end by screws 346 to a yoke 347, the whole constituting a rectangular frame. Each of the yoke pieces 347 is secured by a nut 348 to the upper reduced end of a reciprocating rod 350 which passes through and is guided by the bulge part 292 of the fixed casting 290 that supports the guide plate. At its lower end the rod 350 is forked, within which fork a short link 351 is pivoted on a pivot pin 352. The link 351 is pivoted to the free end of a pair of follower levers 353 pivoted at 354 and having a follower roller 355 riding on a cam 356 on the rear cam shaft 257, the follower being pressed against the cam by a spring 357.

As shown by the time chart (Figs. 57 and 58), the set pin box is at its lowest position at about 110° of cycle, reaches its top position at about 290° at which time the set pins are fully set, and reaches the mid-point of its down stroke at about 360°, and reaches its lowest position at about 110° of the next cycle, so that the set pins receive their setting between 200° and 290° of the first cycle, and the punches are pushed through the card between 20° and 110° of the next cycle. The stripper plate, as shown on the time chart, is normally at its upper position and reaches its lowest position at about 60° or 70°, descending in unison with the descending set pin box. It rises to its upper position about mid-cycle, and stops, while the set pin box continues its motion upward.

*The primary set-up mechanism*

The Bowdens 167 after emerging from the left hand side of the tabulator (Figs. 5, 6 and 7) are passed through a sort of clamp 360 and formed into a cable 170 which extends upward and is bent over into the upper part of the punching machine, passing through another clamp 361.

The means for setting the gag bars to their respective numerical positions can be understood by reference to Fig. 20. In each denominational position there are three slides, one above another, viz., a type bar slide 362, a sensing slide 363, and a sliding gag bar 364, the last having gags consisting of projections from its lower edge for cooperation with the plungers 320 of the wiring unit hereinbefore described. These three cooperating slides will be called herein a set of slides, there being one such set for each denomination.

These three slides are mounted on suitable guides and each one has a limited sliding movement front and back (left and right in Fig. 20). The Bowden 167 has its casing anchored to a cross bar 365 from which the inner wire 169 extends rightward and is secured to a projection of the type bar slide 362. The construction is such that if this slide be moved toward the right it will draw after it the wire 169 which in the tabulator (Fig. 3) draws one of the slides 163 toward the rear of the machine, swinging the bell-crank 160 counter-clockwise until arrested by the bottom of the type bar in some numeric position. The rightward motion of the slide 362 will, therefore, be limited to some one of ten positions appropriate to the numerals 0 to 9.

The type bar slide 362 is moved rightward by the sensing bar 363, a projection 366 on which contacts with a projection 367 on the slide 362. The sensing slide is propelled by a spring 368 but is normally held in its extreme left hand position by a reciprocatory universal restoring bar 370. When at the appropriate time this restoring bar moves rightward, the sensing bar 363 follows it under the impulse of its spring, and pushes the type bar slide 362 with it until both of them are arrested in the appropriate numeric position. Normally, however, each type bar slide 362 is locked against actuation by a latch 369. At each operation of the machine these latches are released selectively by control mechanism to be described hereinafter, so that only those slides advance that are required in that operation.

The gag bar 364 is drawn rightward (rearward) by a spring 371, its motion in that direction being limited by a fixed stop bar 372 against which the gag bar normally stands. The gag bar is drawn frontward to its set position, by pawl and ratchet connection with the sensing bar. The gag bar has nine ratchet teeth 373 adapted to be engaged by a pawl 374, pivoted to the sensing slide at 375, and spring urged clockwise to engage the teeth 373 (see also Fig. 16). When the restoring bar 370 moves rightward and is followed by the sensing bar 363, the pawl 374 advances over the first, second, third, and so on, teeth 373, the motion of the sensing bar being arrested as above described, with the pawl in engagement with the appropriate one of said teeth. When the restoring bar 370 is again moved frontward bringing the sensing bar back to its normal position, the pawl 374 draws the gag bar 364 frontward to its appropriate numerical position where it will remain as long as the sensing bar 363 remains in its normal (lefthand) position and the pawl 374 engages the teeth 373. The nine teeth 373 conform to the numerals 1-9, inclusive. When the type bar stands at zero, the pawl 374 does not reach the first tooth and that gag bar remains in its normal position and nothing is punched in its column.

Means to trip the pawls 374 at suitable times, and thus to allow the gag bar to be restored to its normal right hand position free of the sensing bar, will be described hereinafter.

The punch has provision for fifty slide sets of the sort illustrated in Fig. 20 and above described, and also for fifty sets of the sort shown in Fig. 21. The latter contains the same sorts of slides as the former but they are made of different shapes and are slightly differently disposed. The slides shown in Fig. 21, however, have identically the same functions and operate in identically the same way as those of Fig. 20. These two sorts of slides are interspersed across the machine, alternating with one another. This is for reasons of compactness as will be understood from the following description. In Figs. 16–21, inc., the corresponding parts are designated by the same reference numerals followed in each instance by the letter A applied to the parts of Fig. 20 and the letter B applied to the parts of Fig. 21.

Each of the gag bars has depending therefrom a long finger 376 and three shorter fingers 377 which cooperate with the plungers 320 in the top of the wiring unit 314 hereinbefore described. As shown in Figs. 20 and 21, the gag bars are in normal position, and it will be seen that the fingers of the gag bar 364A are located so as, when set to numeric positions, to act on the right hand or rear six of the plungers 320 and that in the case of the gag bars 364B, these fingers are adapted to cooperate with the left hand or forward six of the plungers. This is one of the differences between the A set of slides and the B set of slides. In Figs. 16 and 17, both sets of slides are shown and it will be noted that in those figures the B slide shown is the one nearest to the observer and is in position to punch zero, and the A slide which is in normal position is partially hidden behind it.

The disposition and manner of mounting of these two sorts of sets of slides can be understood from Figs. 16, 17 and 19. The rear ends of the type bar slides 362 are guided in a comb plate 380 secured to a cross bar 381. Three of these cross bars, viz., 381, 382 and 383 (Figs. 16 and 17) are secured to flanges of two sheet metal brackets 384, one secured by screws to a left hand frame plate 385 and the other to a right hand frame plate 385. In Fig. 19, it will be noted that the lower part of the guide plate 380 has comparatively wide slots, each of which accommodates two slides, viz., one of the slides 362A and one of the slides 362B. Near their forward ends these slides 362 are supported by a cross frame bar 389 (Fig. 16) and are guided by a slotted guide plate 386. Each of said slides has its forward end consisting of a finger-like part, as shown in Fig. 16, and here again a pair of slides occupies each slot. The Bowdens 167B have their casings secured in series to the cross bar 383 and the inner wires 169B are attached each to a stud 387B on an ear projecting upward from the slide 362B. The Bowdens 167A come in a little above the wires 167B in a tier, their casings being secured to the cross bar 365 and their inner wires 169A being secured each to a stud 387A on an upstanding branch 388A of a bar 362A.

The sensing slides 363 and also the gag bars 364 are disposed in pairs in the same general manner as the type bar slides 362, each guide slot being occupied by an A bar and a B bar. The rear ends of the slides 363 and 364 are supported by three cross frame bars 390, 391 and 392 (Figs. 17 and 19). The sensing bars 363 rest on the frame bar 391 which has attached thereto a comb plate 393 with teeth extending upward and the bar 390 carries a comb plate 394, the teeth extending downward. The gag bars 364 are guided by upper and lower guide combs 395 and 396.

The forward ends of the sensing bars and gag bars are mounted in almost identically the same way (Fig. 16) on three bars 397, 398 and 400 with guide combs secured thereto.

Clearing the gag bars

The release of the gag bars 364 from the control of the sensing bars 363, so that the former may be returned to normal position by their springs 371, is effected by tripping the pawls 374; and this is done at a point in the cycle when the sensing bars are held in their forward position by the restoring bar 370. The tripping or clearing means are shown in Figs. 7, 16 and 52. Each pawl 374 has an upwardly and forwardly extending arm whose upper edge is formed of into a flange 405. This flange is engaged by the under edge of a release lever 406 pivoted at 407 and normally held in its non-contacting position by a spring 408. These release levers are disposed in two rows across the machine, the forward row being for the "B" sets of slides and the rear row for the "A" sets of slides. Said levers are normally inactive but are swung to active position to clear the gag bars, each by a link 410, said links being guided in comb plate 411. Each link at its forward end has pivoted thereto an interponent 412 which is rocked clockwise by a spring 413 under control of a hand settable device 414 which is pivoted to the link 410. Said settable device has three notches at different distances from its pivot engageable by a nose on the interponent 412. There are provided two universal cross bars 415 which, as will be described in detail hereinafter, may be moved momentarily toward the rear of the machine to the effect that any link 410 whose interponent 412 stands behind one of these bars will be pushed rearward and will cause the clearing of that particular gag bar. One of these bars 415 stands behind the other, the forward one being for the B devices and the rear one for the A devices; and the two bars 415 are connected at their ends by horizontal links 416 so that the front and rear bars 415 always move together.

For some sorts of work, this one pair of bars suffices, but in some instances more than one are needed, an additional such pair 419 being shown in the present instance above the pair 415. For example, the pair of bars 415 may be actuated at the end of a total cycle of the tabulator and the pair 419 at the end of a grand total cycle.

When an interponent is set as shown in Fig. 16 at 412B, that particular release pawl 406B is under control of the lower bar 415, and its gag bar will be cleared at the end of the total cycle, and when the setting device is in its middle position that denomination is under control of the upper bar 419 and its gag bar will be cleared at the end of a grand total cycle; and when a setting device is in the extreme position shown at 414A the interponent 412 is out of the path of both bars, and in that setting the bag bar will not be cleared at all, but its setting will be preserved indefinitely.

In order to move the bars 415 and 419 rearward to clear any gag bars connected therewith, the links 416 which connect the front and rear bars of each pair are attached to forwardly extending links 710 (Figs. 7 and 52), which in turn are pivoted to arms 711 fast on two transverse rock shafts 712 and 713 for the lower and upper clearing bars, respectively. Both shafts are journalled in the side frames 254 and 255 (Fig. 5) and project a short distance outward from the left hand side frame 255 where shaft 712 is provided with an arm 715 and shaft 713 an arm 716. At their free ends, arms 715 and 716 are provided, respectively, with studs 717 and 718, which are acted upon by hooks 720 or 721 pivoted to a slide 724, having a slot 736 guided by a fixed stud 737 for reciprocation at an inclination herein, for brevity, called up and down. Two bell-cranks 725 and 726 are pivoted, respectively, on the same studs as the hooks 720 and 721, to which they are connected by a spring 727 or 728. The depending arms of the bell-cranks 725 and 726 are connected by a tension spring 732 which through limit studs on the bell-cranks normally holds the hooks 720 and 721 free of their related studs 717 and 718.

The hooks 720 and 721 are rocked selectively into engagement with the studs 717 and 718 at appropriate times on signal from the tabulator. To this end, the bell-cranks 725 and 726 are provided, respectively, with arms adapted to be acted upon by a Bowden wide 750 or 751, the casings of which are affixed to flanges of the slide 724.

The construction is such that if, with the parts as shown in Fig. 52, the bell-crank 725, for example, be rocked by its Bowden wire, the hook 720 will move into contact with the stud 717, further motion of the wire stretching the spring 727. Later on, the slide 724 moves upward, and the hook snaps over the stud, and the shaft will be rocked by the downward movement of the slide 724.

At its lower end the slide 724 is pivoted to an arm 738 (Fig. 7) on a sleeve 740 (Fig. 5) loosely mounted on a stud 741. Also fast on sleeve 740 and offset from arm 738 is another arm 742 connected to a long downwardly extending link 743, which at its lower end (see also Fig. 47) is connected to a follower lever 744 pivoted at 453 and carrying a roller 746 which is pressed by a spring 748 against a cam 747 on the rear drive shaft 257. The timing of these parts will be described hereinafter.

*Framing of the head section*

It may be advantageous at this point to describe briefly the framing by which the mechanism in the head of the punching machine is supported. The various slides 362, 363, and 364 and their cooperating parts are mounted in three separately detachable sections 425, 426, and 427. The section 425 (Figs. 16 and 17) carries the type bar slides 362 and their locking devices and also the ends of the Bowdens 167 that come over from the tabulating machine. The section 426 supports the gag bar releasing or clearing devices 406—415 and their associated parts, and the section 427 supports the sensing bars 363 and the gag bars 364 and the devices associated with them. In Fig. 7 it will be seen that the left hand side plate 385 of the section 425 has fastened thereto a casting 430 in the form of an angle bar, and the right hand side plate is similarly made. Each of these flanges 430 is secured on a flat surface on the top of the right hand casting 254 or the left hand casting 255. The section 426 (Fig. 16) has side plates 434 each of which has a flange 435 formed off from its lower edge and secured on a ledge of the casting 254 or on a similar ledge of casting 255. Section 427 has side plates 440 from which, at intervals, as shown in Figs. 16 and 17, are formed off flanges 441 which rest on bars suitably secured to the frame castings 254 and 255.

*The gag bars and the cooperating plungers*

In Fig. 16, the gag bars 364 and their depending fingers 376, 377 and also the plungers 320 acted on by said fingers are shown in normal position except that the gag bar 364B has been advanced to zero position by means to be described hereinafter.

The "one," "three," "five," and "seven" plungers 320 each has its upper end wide enough so that it may be depressed either when the finger 376 is over the right hand half of it to punch an odd number, or over the left hand half of it to punch an even number, and the "nine" plunger has its right hand half of the same height as the other plungers but its left hand half is prolonged upward into a finger 445 long enough to be depressed by any one of the fingers 377. When the bar is set at "one," the left hand finger 377 stands over the right hand half of the "nine" plunger and does not operate the latter; but when the bar is set one step further leftward then this finger 377 will depress the "nine" plunger while the finger 376 depresses the "one" plunger. If the bar 364 be set still another space leftward the finger 376 will stand over the "three" plunger 320 and the finger 445 will be between the first and second fingers 377 and free of them, and so on. Extending leftward from the finger 376 is a shoulder 446 in line with the fingers 377, and the left hand portion of this shoulder constitutes in effect a fourth finger 377, which depressed the "nine" plunger when the gag bar is set at "eight." When the gag bar is set at "nine" the finger 376 stands over the right hand half of the "nine" plunger 320 and almost in contact with the finger 445. It will be noted that when the bar 364A is set at "nine" its fingers 377 pass in behind the fingers of the bar 364B as viewed by the observer in Fig. 16, but none of them ever reaches far enough to the left to operate finger 445 in the "B" section.

There are two sets of plungers 320 arranged along in a continuous row, and each of these plungers is made thick enough so that they are all properly operated, the A fingers acting on the half of the plungers 320 farthest from the observer in Fig. 16, and the B fingers on the plungers near their forward edges. The "zero" plunger 320 has only its left hand half projecting above the top of the wiring unit so that the portion of that acted on by the finger 376 is a comparatively slender finger. When a gag bar is set at "zero" (bar 364B, Fig. 16) this finger stands under the right hand half of finger 376 as viewed in the drawing. It will be noted in Fig. 16 that when the gag bar 364 is in its normal position (bar A) no zero will be punched, but the bar must be drawn leftward to the position just above described in order to punch a zero.

The construction lends itself to the punching of zeroes or not, as desired, means to which end will be described hereinafter. There is no ratchet tooth 373 for the zero position because, if there were, zeroes would always be punched, which is not desired, and the teeth are only those for the digits one to nine, inclusive.

Restoring the sensing slides

The restoring bar 370 for the sensing slides 363 is reciprocated by a cam 450 (Figs. 7 and 49) on the front power shaft 256. A follower roller 451 is mounted between the two parallel arms of a follower lever 452 pivoted on stud 453 projecting from the base frame 253. Said follower lever is connected by a long link 454 with an arm fast on a shaft 456 journalled in the side frames 254 and 255. The restoring bar 370 extends clear through both the right and left frame castings and at each end it has secured thereto a block 457, to which is pivoted a link 460 which is also pivoted to an upright arm 455 fast on the shaft 456. The projecting portion of the bar 370 has a guide roller 461 (see also Fig. 5) which prevents right and left hand movement of the bar in the frame. The cam 450 moves the bar 370 frontward, and the latter is moved rearward by a spring 462. The bar 370 is guided between two guide bars, bolted to the inside face of the frame casting 254, 255.

Releasing the type bar slides

The means for tripping the latches 369, which normally restrain the type bar slides 362, will now be described. Said type bar slides are normally locked by said latches but if, on any cycle of the machine, one of them be released before the restoring bar 370 advances, then on that cycle the associated gag bar 364 may be set in position to cause the punching of a digit.

The latches 369 are pivoted at 470 (Fig. 17) and guided by a comb plate supported by the frame bars 382 and 381, and each of said latches is extended rearward to constitute a lever of the first order which may be rocked by a link 472 pivoted to a hand settable interponent 473. Said interponent has at its front end a nose 474 which, in the left hand part of Fig. 17, is shown standing beneath a universal releasing bar 475. If this bar be depressed, it will rock the latch lever 369 to release the slide 362. Four of these bars are provided which are moved downward under certain controls which will be described hereinafter, said bars being numbered 475, 476, 477 and 478. The piece 473 has on its underside a series of notches 480, one of which has seated therein the edge of a sheet metal bar 481. Each of said pieces 473 has a finger 482 projecting upward into a slot in a plate 483 to serve as a guide for said piece. Each piece has a sort of handle 484 by which, if it be lifted, the piece 473 may be slid front or back so as to engage the bar 481 with any desired one of the notches 480, thus bringing the nose, or finger, 474 into register with any desired one of the releasing bars 475—478. The piece 473 has also a fifth notch, namely, the extreme end one, and if this notch be engaged with the bar 481, the finger 474 will stand out in front of all the release bars, as shown in dotted lines in Fig. 17 and will, therefore, not be depressed by any of them. All of the pieces 473 not to be used at all in any particular run of cards would be set in this position. A spring 485 connecting the rear end of the lever 369 with the piece 473 serves to hold the latter in proper engagement with the bar 481 and to rock the latch lever to locking position.

In the present instance, the bar 475 is used for releasing those slides appropriate to totals and grand totals, the bar 478 for those slides appropriate to designations taken from a first card after total, and the bars 476 and 477 for those slides appropriated to set up certain special information, all as will be described hereinafter.

It will be noted in Fig. 17 that there are two complete sets of these releasing devices, namely, an upper forward one, serving the "A" sets of slides, and a lower rear one, serving the "B" sets of slides.

Each of the bars 475—478 is a long bar extending clear across the type bar slide section of the machine and projecting through windows 486 in the side plates 385 and extending a suitable distance beyond said plates; and it is held up by two springs 487 (Fig. 17). The guiding and operating means for the ends of these bars are alike at all four windows 486 and a description of one will make the rest readily understood. The set shown in Figs. 23 and 25 is the forward and higher one of the two shown in Fig. 7. As the one of these nearest the observer in Fig. 7 has some special devices associated with it, this one has been removed in Fig. 25, which shows the other three. Four slides 490 are of different shapes and each has one of the releasing bars passing through it. Each of the slides has at top and bottom an elongated hole 491, by which it is mounted on a stud 492 for sliding motion up and down, the slides being spaced apart by spacers 493 (Fig. 22). Each of these slides is so shaped that its up and down middle part encloses one of the bars 475—478 but does not interfere with the other bars, as will be understood from Fig. 23. These slides 490 are normally held in their upper positions (Fig. 23) by the springs 487 acting on the releasing bars. Each of the slides 490 has a stud 494 which is acted on by a three armed lever 495 pivoted on a stud 496 projecting from the side plate 385. There are, of course, four of these levers suitably spaced apart on said stud. As will be seen from Fig. 7, this whole arrangement is duplicated on the lower rear set, whose levers 495 also have depending arms connected with like arms of the forward set by links 498. The construction is such that if the forward lever 495 be rocked counter-clockwise, it will pull down its slide 490 and associated releasing bar and, through link 498, also depress the corresponding releasing bar of the rear set. Thus the releasing bar 475 of the front set and the releasing bar 475 of the rear set are operated in unison, and the same applies to all the other three bars. It will be perceived that the two sets of these devices operate in unison so as to control the "A" sets of slides and the "B" sets of slides in precisely the same way. The whole arrangement above described is repeated on the right hand side of the machine in order to depress both ends of a releasing bar simultaneously.

It is desired that the several releasing bars be operated selectively and to that end the following means are provided: A rock shaft 500 (Figs. 5, 7, 23, and 25) passes through both the frame plates 385 and at its left hand end has an arm 501 connected by a link 502, with the inner arm of a two armed lever 503, pivoted on a stud 504. The outer one of said arms is connected by a link 505 with a follower lever 506 pivoted on a stud 459 (Fig. 48) in the base of the machine, said lever having a follower roller pressed by a spring against a cam 507 on the rear cam shaft 257. This cam is so shaped as to rock the shaft 500 counter-clockwise in Fig. 7, just before the restoring bar 370 begins its advance movement. The timing of these parts appears on the time chart (Figs. 57 and 58). Said shaft 500 has two arms 508 projecting upward therefrom, one at each side of the machine (Fig. 23), and each has formed off therefrom a flange or ear 510. Each of the levers 495 of the upper front set has an upstanding arm to which is pivoted an interponent 512 which, forward of its pivot, is guided in a comb plate 513, and which is normally held in its upper position by a spring 514. In such upper position the front end of said interponent is out of the path of movement of the flange 510, but this interponent may be swung or set downward to active position were it stands in the path of such movement and will be forced rearward, rocking the lever 495, and through the link 498, the corresponding lever of the rear set. The rock shaft 500 and the flanges 510 are herein called the actuator for the interponents and the releasing bars. There are four of these interponents, and means are provided, under automatic control, to set them selectively into the path of the ear 510.

All of this selective operating mechanism, that is to say, the interponents 512 and operating lever 508, 510, are duplicated on the right hand side of the machine.

The four interponents 512 are depressed selectively by four setting levers 515 (Figs. 23 and 24) pivoted and suitably spaced on a stud 516. The forward arms of these levers are of graduated lengths to be operated by four bell-cranks 517 pivoted on a stud 518 mounted on a bracket 520 secured to the side plate 385. These bell-cranks are in transverse planes perpendicular to those of the levers 515, and their horizontal arms are of graduated lengths corresponding to those of the levers 515, and each bell-crank 517, therefore, has its end lying beneath the end of only one of the levers 515. Each bell-crank 517 has a branch 521 adapted to be operated by one of four push rods or plungers 522 mounted in a bracket 523 secured to the bracket 520. Each rod 522 registers with the plunger 524 of one of four Bowdens 525 whose casings are secured to a bracket 526, mounted on the main frame casting 255. These Bowdens lead to appropriate control devices and if one of them be operated, its associate push rod 522 will rock its bell-crank 517 counter-clockwise (Fig. 24), rocking lever 515 and setting the selected interponent 512 to be operated by ear 510.

The levers 515 are repeated on the right hand side of the machine and they are controlled by bell-cranks 527 (see also Fig. 5), whose horizontal arms are of graduated lengths like those of the bell-cranks 517, but whose vertical arms extend downward from their pivots, instead of upward; and said vertical arms are connected with those of the bell-cranks 517 by links 528. Whenever a bell-crank 517 is rocked by its Bowden wire, the corresponding bell-crank 527 is rocked also, so that this whole train of linkage, both right and left, is controlled and operated in unison.

The special mechanism for controlling the rearmost releasing bar 478, which mechanism is omitted in Fig. 23, is shown in Fig. 25. A lever 530, pivoted on a stud 531, has at its forward end an ear 532 lying over the top of the first interponent 512 and beneath the associate lever 515, so that an operation of the latter depresses the lever 530 and with it the interponent. A spring 541 tends to rock the lever 530 upward. Near its middle the lever 530 has another ear 533 formed off therefrom and adapted to be engaged and held down at times by shoulders on two latch levers, viz., a latch 534 frontward of the ear 533 and a latch 535 rearward thereof. Said latches are pivoted on the stud 496. A pin or stud 536 projects from the upright arm of the lever 495 between the two latch levers which are drawn toward each other by a spring 537. Another spring 538 draws the latch lever 535 toward the front of the machine. The operation is as follows:

The lever 530 is normally free of both of its latches and is held up by its spring 541 with its ear 532 pressing against the lever 515, and the stud 536 holds the latch 534 out of action, as shown in Fig. 25, but the spring 538 presses the latch 535 against the edge of the ear 533. On receipt of a signal from the control mechanism, that is to say, when the lever 515 is operated by its Bowden wire, the latter lever depresses the lever 530 and moves the interponent down into the path of the operating flange 510, and the latch 535 is snapped over the ear 533 by its spring 538. When the shaft 500 is rocked as above described, the flange 510 depresses the releasing bar 478, the same as with the other three above described. When in this operation the lever 495 is rocked, the stud 536 moves rearward and permits the latch 534 to swing to where its shoulder is over the ear 533; and then said stud 536 pushes the latch 535 out of engagement with said ear. During this time, the lever 530 is held depressed by the lever 515, but when that lever is released from the pressure of its Bowden wire, the spring 541 draws the lever 530 upward a short distance until it is arrested by the latch 534. Meanwhile, the friction due to the pressure of the flange 510 against the interponent 512 is ample to retain the latter depressed. This pressure is maintained throughout a large part of the cycle. When it is released by the return rocking of shaft 500, the lever 495 and the releasing bar 478 swing back to their initial positions. In this movement, the stud 536 first permits the latch 535 to move into engagement with the ear 533 and then moves latch 534 out of engagement. The interponent 512 and lever 530 then snap up a short distance until arrested by the latch 535, whose shoulder is a little higher than that of latch 534, but not high enough to let the interponent 512 rise out of the path of the operating flange 510. It results that the releasing bar will be depressed a second time, viz., in the next cycle of the machine. On this second operation the parts act as before, but with these exceptions. The lever 530 is not now held down by the lever 515, but only by the latch 535. When, on the rocking of the lever 495, the stud 536 moves rearward, the latch 534 follows it, but is unable to engage the ear 533. When, therefore, the stud 536 moves latch 535 out of engagement, the lever 530 is snapped by its spring up out of range of the two latches and the interponent 512 is held down only by friction on the flange 510. When the latter rocks back to normal, said interponent will be raised to inactive position by its spring, and this train of mechanism will be returned to normal position and will not be operated again until a fresh signal is received over the Bowden wire. As thus far described, the mechanism is as described in the Mueller application, S. N. 32,156.

*Starting and stopping the machine*

The shaft 268, a clockwise rocking of which opens the clutch (Fig. 12), extends through the base of the machine and (Fig. 7) projects through the web of the left hand frame 253, where it has fast thereon an arm 550, rocked counter-clockwise to open the clutch by a long link 551 which (Figs. 35 and 37) is pushed downward by a lever 552 of the first order. Said lever at the rear of its pivot has a lug 553 standing in the path of motion of an interponent 554 which, in turn, is pushed upward by a link 555 pivoted to a follower lever 556 which is vibrated up and down by a cam 559 on the drive shaft 256, all as very familiar in these machines.

The action of the link 551 on the arm 550 may be controlled in any suitable way, the particular mechanism shown in Figs. 35 and 37 and about to be described briefly being substantially identical with that which is described and claimed in the patent to Alvine 2,151,177, dated March 21, 1939.

Referring to Figs. 35 and 37, the arm 550 is normally held down by a toggle, the two members 557 and 558 of which are pivoted respectively to a pin 560 passing through the arm 550 and to a fixed post 561 projecting from the frame 253. These two toggle members are connected by a spring 562 tending to straighten the toggle, the motion of the parts in that direction being limited by a pin 563. When this toggle is straightened, it acts between the fixed pivot 561 and the pin 560, forcibly holding the latter down. In order to break the toggle on occasion, the member 558 is prolonged upward into a finger 564 lying just back of a pin 565 passing through and secured in a small lever 566 also pivoted on the stud 561, and means presently to be described are provided to rock lever 556 rearward.

The pin 560 in arm 550 passes through a vertical slot in the link 551 so that as far as said link is concerned the pin 560 merely moves upward in said slot when the fixed toggle is broken. The link 551 is, however, connected with the pin 560 by another toggle whose lower member 567 is pivoted to the pin 560 and whose upper member 568 is pivoted to the link 551 at 570. These two members are also connected by a spring 571 tending to straighten the toggle, such action being limited by a pin 572 on the link 551. The pin 565 of the lever 566 passes through an up and down slot in an upward prolongation of the toggle member 568 so that if said lever 566 be rocked it will also break the movable toggle mounted on the link 551. Thus, if this lever be pushed rearward both toggles will be broken, the arm 550 will move upward and the clutch will be closed. However, the breaking of the toggle 567, 568 tensions the spring 571 which, when pressure on the breaking lever 566 is relieved, straightens the latter toggle. As the spring acting on the shaft 268 is a very strong one and the spring 562 is a much weaker one, the arm 550 will break the toggle 557, 558 further, raising the link 551 and rocking lever 552 to a position where the lug 553 is approximately in contact with the interponent 554. The toggle 567, 568, being now straightened, the link 551 acting through said toggle is in rigid connection with the pin 560 so that if the plunger 555 be forced upward by its cam, the lever 552 will forcibly depress the link 551, opening the clutch which will be locked open by the straightening of the toggle 557, 558.

The mechanism thus far described is substantially as usual in these machines for breaking the toggles, but has been modified as will presently be described, mainly because it is desired to control the clutch principally from the tabulating machine. In the specific instance illustrated, the releasing lever 566 is operated by one branch 573 of a forked link having also another branch 574. This forked link or pusher terminates at its front end in a finger button or key 575 (Fig. 7) by pushing which the machine may be started, if desired. In practice this button is used only occasionally, the clutch being controlled in its ordinary operation by the fork 574 being pulled rearward automatically. Said fork 574 is connected to a lever 576 pivoted to a fixed post 577. Said lever has a branch 578 operated by a link 580 pivoted to a lever 581 fixed on a rock shaft 582. Said lever 581 is connected by a link 583 with a universal bar 584 pivoted on a pivot 585, fixed to the framework of the machine. This universal bar is rocked by several different control means leading over to the tabulator, as will be described in detail hereinafter.

The construction is such that if the lever 581 be rocked counter-clockwise in Fig. 35 either by an action of the link 583 or by the rocking of the shaft 582, it will pull the lever 578, 576, which, through the forked link 574, 573, will break the toggles and close the clutch.

*Card feed*

The card feeding mechanism of the punch is, in the form shown, of a sort familiar in these machines. The rock shaft 274 which (Fig. 7) operates the card picker has thereon outside the framework an arm 670 connected by a link 671 to a lever 672 pivoted on a stud 673 and having a follower roller acted on by the card feed cam 675 against which the follower is pressed by a strong spring. All of this is substantially as in former machines except that the cam 675 is differently timed. The link 671 (see also Fig. 35) has in it a notch for engagement by a latch or lock 677 fast on a rock shaft 678, said rock shaft having thereon inside the machine another arm 680, a stud 681 on which engages in a slot in the lower end of a link 656 which, according to the present invention, extends upward and has near its upper end a pin 669 acted upon by the horizontal arm of a bell-crank 679 pivoted on the shaft 582. The bell-crank 679 is controlled in its movement from the tabulator in the manner to be described hereinafter. However, the construction is such that if the bell-crank 679 be rocked counter-clockwise in Fig. 35, it will lift the link 656 and free the card picker from the restraint of latch 677. In most prior machines, a lock similar to the lock 677 has been provided and normally spring held out of engagement. In the present machine, however, the card feed is held by this lock normally inoperative, that is to say, the lock ordinarily holds the link 671 and, therefore, the picker in its extreme forward position against the tension of its spring. This lock is lifted out of locking position only when the link 656 is pulled up. The stud 681 is held in the upper end of the slot by a spring 682 so that in case the link 671 is under strong spring tension at the time the link 656 is raised, this spring can stretch and will snap the lock out of engagement at the proper time. It may be remarked that the timing of the card feed is such that when in the first half of the total cycle the punches are down, the card chamber is empty, and a card enters it in the latter half of the cycle when the punches are up, said card then being punched in the first half of the next cycle. The card is started by the picker at around 90°, reaches the card chamber at around 260°, and is arrested by the card stop at about 10° of the following cycle. Said stop is opened at about 250° and is closed by 350°.

*Card stop*

Just outside the left hand base frame 253 the rear cam shaft 257 has thereon a cam 685 (Fig. 50) which controls the card stops through a follower arm 686 having a roller 687 and fast on a transverse rock shaft 688 (Fig. 14). The shaft 688 extends through the machine to the right hand frame plate 252 and it has fast on it two arms 690, each having pivoted thereto a link 691 pivoted to an ear 692 formed off from the sliding card stop 693. Said card stop consists of a bar of sheet metal mounted on the outside of the frame 290 of the die section of the machine and slidable up and down on headed screws 694. One of these screws has a stud to anchor a spring 695, normally pulling the stop upward. This whole construction is of an ordinary and familiar kind and is, therefore, only partially illustrated. It differs from those previously used in this class of machines only in the outline of the cam 685 which determines the timing of the stops.

*Retract mechanism*

This is the same as in the Mueller application except for some changes in its controls, which will be described.

The locking slides 301 (Fig. 14) for the set pins 300 are essentially of the construction usual in these machines, that is to say, each of said set pins has a stud adapted when the pin is depressed to be caught and held down by a latching shoulder on the slide 301, said locking shoulder being snapped over the stud by the usual spring pressed pin 752. The operation of retracting the set pins consists of momentarily pushing the slides leftward in Fig. 14. The means for thus retracting or releasing the set pins may, for most of the purposes of the present machine, be of ordinary construction. Preferably, however, means are provided for controlling the retracting of each individual column independently of the other columns, a "column" referring to six pins. In Fig. 14, the upper slide 301 controls the six set pins for the upper zone of the card and the lower slide the six pins for the lower zone.

The set-up mechanism for retracting the locking slides selectively is mounted in a frame comprising right and left side plates 753 connected together by four transverse bars 754 and by a fifth bar 755. Each of the end plates 753 has therein a horizontal slot in which a cross bar 757 is adapted to slide left and right in Fig. 14, that is to say, toward the front and back of the machine. Each of the slides 301 has projecting from its rear end a finger 758 adapted to be pushed leftward in Fig. 14 by a small slide 760, there being two tiers of these slides, the upper tier for the upper slides 301 and the lower tier for the lower slides 301, and each of said slides 760 is adapted to act on one of the fingers 758 to release the proper slide 301. The pusher slides 760 are guided in comb plates secured to the cross bars 754. Each of the pusher slides 760 has pivoted thereto a settable control member 762 having near its forward end a tooth 763 adapted to a longitudinal slot in the operating bar 757, there being such slots in the upper and lower faces of said bar. If said settable member 762 be rocked to the position where its tooth 763 engages said slot then that particular pusher slide will be locked to the operating bar and that column of pins will be retracted at every cycle of the machine. The fixed transverse bar 755 also has upper and lower slots adapted to be engaged by teeth 765 on the rear part of the settable member 762 but normally standing rearward of the slot in the bar 755. If any settable member 762 be pushed by hand toward the front of the machine to the point where it moves the locking slide 301 to unlocking position, it may then be rocked to engage the tooth 765 in the slot and thus to hold that particular locking slide in releasing position so that even if one of the set pins in the column be momentarily depressed, it will not be locked down and will not operate the punch. In columns so set, no punching will occur even though set pins be depressed by the gag bars in the head of the machine. The said settable members 762 may also be rocked to the intermediate position shown in Fig. 14 where neither the tooth 763 nor the tooth 765 engages in a slot. In columns so set a number may be set up by the set pins once for all and said pins will not be retracted but the number so set up will be punched in all cards.

The operating bar 757 may be reciprocated by any suitable means, such bars being very common in machines of this class, and having been operated in a variety of ways. The means for reciprocating this bar are modified and novel means are provided to adapt said means to be disabled automatically, under certain conditions, as will be explained hereinafter.

A bracket 768, bolted to the inner surface of the base casting 253, supports a pivot stud 767 (Figs. 13 and 27) upon which is pivoted an upright lever 780, the upper arm of which carries a roller 781, adapted to engage the rear edge of the bar 757. A spring 782, shown in Fig. 13 and hidden behind another spring 784 in Fig. 27, normally urges said lever counter-clockwise. Also pivoted on the stud 767 is a follower lever 783, urged counterclockwise by the spring 784, and carrying a roller 785, in contact with a cam 786, on the rear drive shaft 257. The downwardly extending arm of lever 780 is prolonged into a finger 787, which is tensioned by the spring 782, against a hook 788, pivoted at 790, to the lever 783, providing, in effect, a rigid lever between roller 785 and roller 781. However, means to be described hereinafter are provided to release finger 787 from the restraint of hook 788, and thus disable the retract mechanism. This whole construction is duplicated on the left hand side of the machine, a roller 781 acting on each end of the bar 757.

The construction is such that, at the proper time in the cycle, the hump on cam 786 rocks the lever 783 clockwise, rocking the roller 781 against the bar 757 which at that time is horizontally in line with said roller, and retracting the set pins in those columns whose settable pieces 762 are hooked to the bar 757.

Control unit framing

Most of the functions of the punch are controlled from the tabulator and, according to the present invention, most of the control mechanism on the tabulator is included in what is herein called the Control Unit, which is mounted on the left hand side of the tabulator. As is fully described in Patent 2,381,361, the left hand frame piece of the tabulator (Figs. 9, 11 and 30) has a flange 900 around its periphery within which flange are certain parts of the mechanism of the machine, and the main frame members of the control unit are, therefore, set out beyond said flange (Figs. 5 and 6). One of these is a horizontal bar 901 mounted on two cast brackets 902 and 903 (Fig. 11), bolted to the web of the frame piece 101. The tabulator includes a certain fixed guide ring 904, secured to which is a fixed plate 905. The control framing includes a plate 906 which is bolted to this existing frame plate 905. This plate 906 is closer into the tabulator frame than the bar 901 and it is connected to the latter by a post 907. The bar 901 and the plate 906 are the principal supporting members of the control unit framework. The cast bracket 902 includes an inclined extending arm or finger 908 which supports a certain keyboard.

A horizontal frame plate 910 extends out leftward from the plate 906, to which it is bolted at 911, and a second horizontal frame plate 912 stands above the plate 910, and is similarly secured to the plate 906. These two plates are rigidly connected by a post 913. At its rear part the plate 910 has two ears or brackets 914, 915 (Fig. 30) formed up vertically therefrom.

The vertical parts of this framing can be traced in Fig. 11. The plate 910 and its ears or brackets 914, 915 can be understood from Fig. 30. It is believed that a description and understanding of the mechanism will be facilitated by this preliminary outline of the frame.

The frames of the tabulator and of the punch are rigidly connected together by a heavy casting 916 (Figs. 6, 9 and 11), this casting being bolted to the frame 101 of the tabulator at 917 and being detachably secured to the framework of the punch by means including bolts 918.

Actuator

The power for sending the signals over to the punch is furnished by what amounts ostensibly to a sort of universal bar 920 (Fig. 30) which, at predetermined points in a cycle, is moved a short distance toward the rear of the machine, and later returned to its normal position shown in the drawings.

Several interponents are provided which at suitable times are moved into the path of this bar and thereby actuated, and said interponents operate the connecting or signalling device. Such a bar may, of course, be made in various forms. As here shown (Figs. 30 and 31), it is a portion of the piece consisting of a vertical plate 921, having an outline shown in the drawings and having its upper part formed off horizontally, the bar 920 consisting of the rear edge of this horizontal shelf. Said piece 921 is conveniently mounted for sliding motion on the frame plate 906. The means to this end consists of three studs 922, 923 and 924, projecting rightward from the vertical part of the piece 921, the first two into a slot 925 and the last into a shorter slot in said frame plate 906, said slots guiding the horizontal movement of the actuator. As shown, an additional plate 926 is riveted to the plate 906, and it has in its narrower slots registering with those in the plates 906, and the studs 922, 923, 924 have reduced ends passing through those narrower slots, said ends having notches to receive spring clips to prevent endwise motion of the studs. The two upper studs 922 and 923 are in horizontal alignment but the lower one is in a downwardly extending arm or prolongation of the piece 921 so that the whole actuator is on a three pin support and is properly supported and guided. The stud 922 is made a little longer than the others and it has pivoted thereto a link 927 (Fig. 41) pivoted to a follower lever 928 which is pivoted on a fixed stud 930 and at its upper end carries a follower roller pressing against a cam 931 fast on the end of the front main drive shaft 104 on the tabulator.

Interponents

In the form shown the interponents consist of a plurality of upright bars, each appropriately controlled at its upper end, and each at its lower end guided in one of several slots 933 in the horizontal frame plate 910 (Fig. 30).

The one shown in Fig. 30 is adapted to transmit a signal to the punch for a total cycle of the tabulator. Said tabulator (Fig. 11) has four control shafts of which two are shown, viz., a total shaft 934 and a grand total shaft 935. These shafts are, respectively, parts of the total and grand total linkages of the tabulator and, in the present instance of the invention, are utilized to control total and grand total punching operations in preference to other members of said linkages because of their availability. Each of these shafts projects a suitable distance beyond the web of the frame piece 101 and has fast on its end an arm 936 having a stud 937. Fig. 30 shows the total interponent bar 940 which is the second of the illustrated interponents counting from the frame plate 906. The front edge of this bar 940 lies just back of the actuator bar 920, its upper end being offset toward the front of the machine to bring it into line with the stud 937 of the total shaft 934, which stud passes through the bar, so that the latter is lifted a short distance when, shortly before a total cycle, the shaft 934 is rocked. This bar is made with a notch 941, so located that it registers with the actuator 920, which, when it is actuated, merely enters the notch and does not operate the bar. When, however, the total shaft is rocked and the bar is lifted, a part of the total bar 940 stands behind the actuator bar so that it is operated by the latter, that is to say, it is swung rearward about the stud 937 as its pivot. When so swung it operates a link 942, the connection of which will be described hereinafter. It may be mentioned that bar 940 has a cut-out into which a pin 943 projects from the plate 906 to limit the up and down motion of the bar.

A hook 945, pivoted to the bar 940 at 946 and influenced by a spring 947, is caught over the stud 937 and completes the vertical connection with said stud. As shown in Fig. 30, the bar 940 would be operated, but if the hook 945 were swung to releasing position, as shown in Fig. 39, then the bar 940 would not be operated and would transmit no signal.

This hook is controlled from a keyboard, as will be hereinafter described, so that in setting up the machine for a particular piece of work this total interponent 940 may be set active or inactive, as desired.

The grand total bar 950 is in all respects like the total bar 940 except that it goes straight up to its stud 937. It is also controlled by a hook 951 like the hook 945, and, as will hereinafter appear, this hook is suitably settable from a keyboard to render the grand total bar active or inactive. The lower end of the bar 950, as shown in Fig. 29, is adapted to operate a link 952.

Other interponents may be provided to accomplish other functions, two such interponents being illustrated in the present instance.

*Keyboard*

It is one of the objects of the present improvements to provide control keys in a keyboard, each key, when depressed, setting the mechanism for some function. In the drawing the inclined branch 908 of the cast bracket 902 has screwed to its upper surface a keyboard plate 960 perforated to guide the stems of control keys 961. In the illustrated instance, provision is made for ten such keys arranged in two rows, as shown in Fig. 5. Of these, keys numbered 1 and 2 are called, respectively, the grand total and total keys, as they control the grand total interponent 950 and total interponent 940, with respect to active and inactive. When these keys are up, said interponents are inactive, as shown in Figs. 9 and 39. When the 1 key is depressed, its stem 962 rocks an arm 963, fast on a stub shaft 964 passing through the heavy frame bar 901, and having on its inner end an upright arm 965, normally bearing against a stud 966 on the hook 951, and holding said hook out of engagement, and, therefore, the interponent 950 inactive, but when the key is depressed, the arm 965 frees the hook 951 which is moved into engagement by its spring 947, thus making said interponent active.

In like manner, depressing the 2 key rocks a lever like the lever 955 and makes the total interponent 940 active, that is to say, the hook 945 is moved into position to cause said interponent to be raised when the total shaft 934 is rocked.

Each key stem 962 is influenced by a spring 968 anchored to one of several studs 970 (Fig. 9), projecting from the frame casting 908. One of these studs passes through a slot 971 in each of the key stems 962, said slot having offsets at its upper and lower ends, and the tension of said spring tends to hold the key stem with the stud 970 seated in one of said offsets. In Fig. 39, the 1 key 961 is shown in its upper position and to move it to its lower position the key is first pushed backward to free its stem from the stud 970 and then depressed until said stud engages the upper offset in the slot 971.

The studs 970 are long enough so that the uppermost one, for example, serves to control both the 1 key and the 2 key, and the next one serves as an anchor for the springs 968 associated with the 1 and 2 keys. The balance of the keys are controlled in the same way as that just described.

Assuming that the 1 key is depressed, then when the grand total shaft 935 is rocked preparatory to the grand total cycle of the tabulator, the grand total interponent 950 is raised to effective position, and, when at the beginning of the grand total cycle, the actuator 920 (Fig. 41) is pushed toward the rear of the machine, it pushes rearward the link 952 (Fig. 29) which rocks a horizontal bell-crank 973. Said bell-crank, through a stud 974, rocks another bell-crank 975, pulling rightward on a long link 976 which is one of several links extending from the control unit of the tabulator over to and substantially through the punch (Fig. 6). There may be several of these links, five being shown in the present instance, one above the other, and of which five the link 976 is the uppermost one.

The bell-cranks 975 and 973 are, respectively, the uppermost and the second one of several bell-cranks which are pivoted one above another on the frame post 913, hereinbefore described (see also Fig. 9).

The left hand ends of these links are shown in Fig. 35, which is an isometric view looking downward from behind and at the left of the punch. At its end, the link 976 is connected to a three armed lever 977 (see also Fig. 36) pivoted on the same pivot 585 as the universal bar 584. Said lever has an arm 978 which, when the link 976 is pulled by the tabulator, rocks the universal bar 584, which trips the clutch of the punch as hereinbefore described.

Referring to Fig. 35, the universal bar 584 consists of a small bail and projecting arm, the two branches of the bail being pivoted on the post 585. Referring to Fig. 7, the left hand frame piece 255 includes a cross bar 980 having in its web an opening 981 which serves to accommodate some of the mechanism shown in Fig. 35. In this small scale figure no effort has been made to show the movable parts except that the link 976 is shown in end view as the top one of five such links coming in from the tabulator. The pivot pin 585 stands just outside the frame bar 980 being mounted at its lower end on a bracket 982 and at its upper end on a bracket 983.

*Total signal*

The parts of this included in the control unit on the tabulator are shown in Fig. 30, the interponent 940 occupying the second from the right of the four slots 933 in the plate 910. When this interponent has been raised by the operation of the total shaft 934 and is operated by the actuator 920, it pushes on link 942 which rocks a bell-crank 984, this being the third one from the top of the levers pivoted on the post 913. Bell-crank 984 has a stud 985 which rocks a lever 986 just beneath said bell-crank, and this lever 986 operates a long link 987 which goes over to the punch, being the third link from the top in Fig. 35. This link operates a bell-crank 988 in all respects like the bell-crank 977 hereinbefore described, with the effect among other things that it rocks the universal bar 584 and trips the clutch to start the punch.

The levers pivoted on the post 585 and operated from the tabulator also actuate a number of Bowden wires to control certain functions of the machine. Several of these wires terminate at a sheet metal frame 990 (Figs. 7 and 8) secured to the inside face of the cross frame bar 980. This frame comprises a front sheet metal wall 991 and a parallel wall 992. Referring back to Figs. 23 and 25, there are four Bowdens 525 which actuate the controls for the four type bar slide releasing bars 475—478, these Bowdens acting through pins 522. It is these four Bowdens 525 that come into the casing 990 to be actuated. The Bowden 525T, which controls the total releasing bar 475, has its casing anchored in the wall 992 and is actuated by a pin 993 projecting from a block 994 having two pins 995 and 996 projecting through and slidable in the wall 991, said pins being operated respectively by rearwardly extending arms of the levers 977 and 988 (see also Figs. 36 and 38). Either of these levers when operated will push the block 994 and operate the Bowden 525T.

In order for the grand total lever 977 and total lever 988, respectively, to actuate Bowdens 751 and 750 to clear the grand total and total, respectively, the following mechanism is provided (Fig. 35):

The ends of these two Bowdens are anchored to a sheet metal bracket 1000 in position to be actuated by the horizontal arms of bell-cranks 1001 and 1002. These bell-cranks are conveniently pivoted on the shaft 582 hereinbefore described. The bell-crank 1001 is operated by a link 1003 (Fig. 36) pivoted at 1004 to a rear arm of the lever 977. The link 1003 is shown extending horizontally and then having an ear or finger 1005 bent downward therefrom and articulated with the bell-crank 1001. The bell-crank 1002 (Fig. 38) is operated by an ear 1007 bent down from a similar link 1006. These ears 1005 and 1007 are bent down from their respective horizontal links in different planes in order to reach their respective bell-cranks.

From all of the above it follows that when the total link 987 from the tabulator is operated, its three-armed lever 988 closes the clutch to start the punch at about 22° of tabulator cycle, releases the type bar slides appropriate to the total, and sets the gag bar clearing mechanism to operate the lower pair of clearing bars 415.

The Bowden 525D is associated with the first card designation releasing bar 478 and when actuated sets the machine to set up the designation from the first card after total or after grand total, as the case may be, but this mode of operation is not always desired, the designation in some pieces of work being taken from some other card than the first one. Means are, therefore, provided whereby this Bowden 525D may be operated by both of the levers 977 and 988, by either of them, or not at all, as desired. This may be done in a variety of ways, that shown in the drawing being a preferred one. A settable piece 1008 (Fig. 36) is mounted by pin and slot on top of the link 1003. This piece 1008 is slidable leftward to an active position and rightward to an inactive position. As shown, a disabling button 1012 of familiar construction has its casing secured to the piece 1008 and a plunger that can be set into either one of two holes in the link 1003.

The total link 1006 (Fig. 38) has the same parts except that here the settable piece is underneath the link and the disabling button 1014 projects downward.

In the bracket 990 (Fig. 8) is a second block 1015 having fixed thereto a pin 1016 which operates the Bowden 525D, and this block has two pins 1017 and 1018 projecting therefrom through the wall 991 in position to be operated respectively by the settable pieces 1008 and 1009 when said pieces are set active. When these pieces are set inactive the pins 1017 and 1018 are beyond their range of movement.

The hooks 720 and 721 (Fig. 52) which are set by the Bowdens 750 and 751 do not snap into operative position over their studs 717 and 718 until the low part of the cam 747 (Fig. 47) is reached at around 100° or 110° of cycle (Figs. 57 and 58), and this cam is formed with a rise so that by 170° of cycle it has pulled the hooks down into frictional engagement with their studs. Accordingly, the cam 931 which operates the actuator 920 (Fig. 41) holds said actuator in advanced position until a little later than that, the fall of said cam, as shown on the time chart, acting from 194° to 251° of cycle so that the actuator itself holds these pawls in position until after they have been brought into frictional engagement with their studs.

As thus far described, when the actuator 920 returns to its initial position the levers 977 and 988 return to normal position and relieve their pressure on the various Bowdens, and also the link 573 (Fig. 35) which returns to normal position and allows the toggles of the clutch mechanism to straighten so that the machine would be stopped at the end of the total cycle. In some instances this would be permissible. The result would be that a card had been fed into the chamber, the designation and the total would have been set up in the punch, and the next time the punch was set into operation the card would be punched in the first half of the cycle, and whatever else had to be set up at the time would be set up on the gag bars. If the machine operated in this way, the designation would not be picked up from the first card after total, but would have to be picked up by a special operation under control hole, as will be hereinafter described. It would be in this pick-up cycle that the card would be punched and ejected from the machine.

However, when the designation is to be taken from the first card after total, an additional cycle following the total or grand total cycle is required, and aside from this consideration, such an additional cycle is desirable. To this end, latches are provided for the levers 975 (Fig. 29) and 986 (Fig. 30) to hold said levers operated or partially operated until the additional cycle has begun.

In the specific instance illustrated (Figs. 29, 30 and 34), two brackets 1020 are fastened to the ear 914 of the frame plate 910 and carry a total latch 1021 and a grand total latch 1022, the former being provided with a nose 1023 to cooperate with an arm of the total lever 986, here shown as a bell-crank, and the latter with a nose 1024 to cooperate with the grand total bell-crank 975. Said latches extend through slots in the brackets 1020. The nose of each latch is undercut at its end to provide a shoulder adapted to hold its respective bell-crank in operated position.

In the normal position of the parts (Figs. 29 and 30), the bell-cranks underlie the noses 1023 and 1024 which are tensioned downward against the bell-cranks by springs 1025. But if, for example, the total bell-crank 986 be rocked by the stud 985, that portion thereof that cooperates with the latch 1021 will move out beyond its shoulder and the latch will snap down, putting said shoulder and bell-crank in the same horizontal plane. When the pressure on bell-crank 986 by the stud 985 is relieved, the bell-crank will move back against the shoulder.

It results from this construction that when the total or grand total linkage is pulled, operating the universal bar 584 (Fig. 35), the link 573 breaks the clutch toggles, thus closing the clutch and starting the machine, and when the actuator 920 returns to its normal position the linkages move back a short distance toward normal position but are still held sufficiently operated so that the link 573 maintains the toggles sufficiently broken so that they are unable to stop the machine at the end of the first cycle.

Suitable means may be provided to trip these latches 1021 and 1022, one such means being shown in Figs. 9, 30 and 31. A rock shaft 1027 is journalled in the ears 914 and 915 of the bracket 910, said shaft having an arm 1028 from which a stud 1030 projects under shoulders of the two latches so that if said shaft be rocked, the latches will be lifted and the total and grand total levers released from them. On its right hand end, said shaft has fixed a two armed lever 1031 by the side of which is pivoted a loose lever 1032 having a stud 1033 lying in front of an arm of the lever 1031 so that if lever 1032 be rocked counter-clockwise in Fig. 30, it will release the latches, but the shaft can be rocked by other means independently of the arm 1032, and said arm 1032 can be rocked in the opposite direction independently of the shaft. To the upstanding arm of lever 1032 is pivoted a push link 1034 which at its forward end is mounted by pin and slot on a certain bell-crank 1035 hereinafter more particularly described. In the normal position of the parts shown in Fig. 30, the front end of the link 1034 stands a short distance rearward of an ear 1036 bent off from a link 1037 pivoted to the side of the actuator carriage 921. This link 1031 extends backward and it has its rear end thickened and lying between the total interponent 940 and the grand total interponent 950, each of which has a stud 1038 lying beneath the link 1037 (Fig. 31) and supporting said link. The construction is such that with the parts in their normal position, if the actuator 920 were to move back, the ear 1036 after a certain amount of lost motion, would push the link 1034 and release the latches. However, when preparatory to a total or grand total cycle one of the interponents 940 or 950 is raised to its elevated position, its stud 1038 will have raised the link 1037, bringing the ear 1036 above the link 1034 so that the latches are not released at the beginning of a total or grand total cycle. The total and grand total shafts of the tabulator return to their normal positions in the latter part of their respective cycles, allowing the interponents 940 or 950 to descend so that at the end of those cycles the ear 1036 is in operative position.

As the two machines approach the end of the total cycle, the operation is as follows:

At that time the toggles in the clutch mechanism of the punch are held sufficiently broken so that when at around 350° of punch cycle the hump on the cam 559 (Fig. 7) operates the plunger 555 and the link 551 (Fig. 35), the machine will not be stopped. Meanwhile at perhaps 330° of tabulator cycle, the interponent 940 has dropped back to normal position (Fig. 30) bringing the ear 1036 into line with the link 1034, and at around 320° the actuator 920 begins to advance, this time without operating the interponent 940. The lost motion between the ear 1036 and the link 1034 is such that the latches 1021 and 1022 are not released until some time about 40° of tabulator cycle, which is some 18° of punch cycle, and after the clutch opening mechanism has already operated idly. The punch, therefore, continues to run for the additional cycle but the lever 986 in the tabulator and the universal bar 584 (Fig. 35) in the punch return to normal position as soon as the latch is released, resulting in the straightening of the toggles so that at the end of the additional cycle the punch will stop.

If the operation is punching grand totals only, the mode of operation will be the same except that everything takes place one tabulator cycle later. In case of grand total following a total, the grand total interponent 950 is raised before the total interponent 940 is restored so that the link 1037 is held up until the latter part of the grand total cycle which will, therefore, be followed by the additional cycle.

Other means to rock the shaft 1027 to release the latches for other functions will be described hereinafter.

It will be recalled that in the punch the card feed mechanism is held normally disabled by the latch 677 (Fig. 35), which, through shaft 678, arm 680 and link 656, is connected with the bell-crank 679, a rocking of which will trip said latch. Said bell-crank is pivoted on the shaft 582 between the total and grand total bell-cranks 1001 and 1002, and like them has pivoted to its upstanding arm the bent off ear of a link 1040, extending rearward where it is connected to the rearmost arm of a bell-crank 1041 pivoted coaxially with the universal bar 584 at 585. The other arm of said bell-crank 1041 has pivoted thereto a long link 1042 extending over to the tabulating machine between the total and grand total links 987 and 976. At its other end (Fig. 30), link 1042 is connected to one arm of a bell-crank 1043 pivoted on the stud 913 between the bell-cranks 973 and 984 (see also Fig. 29), and is arranged to be rocked by either of them.

The means whereby the bell-crank 1043 is rocked by the bell-crank 973 or 984, and through the linkage just described the punch card feed is freed from its latch, may be of any suitable sort, that shown in the drawing being the preferred one and being adapted to be disabled on occasion as will be described hereinafter.

Pivoted to the free arm of bell-crank 1043 at 1044 (Figs. 29 and 30) is an upper hook 1045 normally engaging a stud 1046 in the underside of the bell-crank 973 for the grand total, and a lower hook 1047 (Fig. 30) normally engaging a stud 1048 projecting upward from the bell-crank 984 for the total. The hooks 1045 and 1047 are, in the present instance, made in the form of bell-cranks, the one arm of which constitutes a hook and the other arm of which is adapted to cooperate with other parts in disabling said hook as will be described hereinafter.

It will be noted that the hooks cooperate with the bell-cranks 973 and 984 which, after being rocked by the actuator 920, are not latched in operated position, but return to normal position with said actuator.

The construction of the mechanism thus far described is such that if the total or grand total bell-crank 984 or 973 is rocked to initiate a total or grand total operation of the punch, the card feed bell-crank will also be rocked and, during the total or grand total cycle, a card will be fed into the punch. However, as the actuator 920, and with it the bell-crank 984 or 973, returns to normal during that same cycle, the punch card feed will again be locked, and a card will not be fed during the second cycle. In the case of a total followed by a grand total, the card feed bell-crank will be rocked twice, once for the total cycle by the bell-crank 984, and again for the grand total cycle by the bell-crank 973, and, as a result, a card will be fed into the punch during each of said cycles.

*Totals and grand totals printed; summary cards for totals only*

Some types of work involve the listing of items with the total printed after each group of items and grand totals printed after each group or groups of items, grand totals being thus interspersed among a succession of totals, and it is sometimes desired to punch summary cards only for the individual totals and not for the grand totals. In the punch this sort of work involves at each grand total operation three successive cycles of punch, one for the total, a second for the grand total, and a third to punch the grand total card and pick up the next designation. This operation cannot be performed by merely depressing the No. 2 control key 961 for totals and not the No. 1 key for grand totals because then the punch would not get the third cycle to pick up the designation. In other words, it is necessary to depress both the No. 1 and No. 2 control keys. To take care of this mode of operation, the following mechanism is provided (Fig. 39):

In the control unit a bell-crank 1050 pivoted to the frame plate 906 has a horizontal arm resting in a notch in the grand total interponent bar 950 by which said bell-crank is rocked clockwise when said bar is elevated. The upstanding arm of said bell-crank is adapted to operate a Bowden 1051 mounted in a lever 1052 also pivoted to the plate 906 and urged counter-clockwise by a spring 1053, said lever being normally held against the tension of said spring with the Bowden out of the path of the bell-crank 1050 by means of two studs 1054 and 1055 on the stems, respectively, of the grand total and total control keys. The construction is such that if either one of said keys be depressed the stud on the other one will still hold the Bowden out of range of the bell-crank 1050, but if both keys be depressed said lever 1052 will rock and bring its Bowden into position to be operated by said bell-crank 1050. The Bowden may be held out of the path of the bell-crank, also under control of the No. 9 control key 961, the stem of which is pivoted to a bell-crank 1058 having a link 1060 having pin and slot connection with a branch 1061 of the lever 1052. The construction is such that when the No. 9 key is in its upper position the pin can move freely in the slot and the Bowden will be made operative under the conditions above described, but if the No. 9 key be depressed, pulling the link 1060 forward, then it will prevent operation of the Bowden.

The Bowden 1051 has its casing anchored to a frame plate 1062 (Fig. 30) and the wire acts on an ear 1063 formed up from an arm of the total hook 1047 which hook connects the card feed lever 1043 to be operated by the total lever 984. The hook 1045 for the grand total mechanism also has an arm with a lug 1064 (Fig. 29) which lug lies just back of the ear 1063. When the Bowden is operated it rocks the total link 1047 out of engagement with its stud 1048, and with it the grand total hook 1045 out of engagement with its stud 1046. It results, therefore, that when the grand total lever 973 is operated its motion will not be communicated to the card feed lever 1043 and no card will be fed. This operation of the Bowden does not occur until the grand total interponent 950 is moved upward late in the total cycle and after the total card has already been fed. When a little later the carriage 920 advances, therefore, it will cause the third cycle of the punch to occur as above explained, but no card will be fed and, therefore, none punched.

It will be noted that with this Bowden mechanism in operation the mode of operation under discussion, that is to say, printing both totals and grand totals but punching only total cards, becomes the normal operation of the machine. If it is not desired, but on the contrary is desired to punch both total and grand total cards, this function can be obtained by depressing the No. 9 control key and thus disabling the Bowden mechanism.

*Elimination of a total or grand total card under card control*

When tabulating a set of cards and punching summary total cards, it is sometimes desired to punch summary cards only for certain of the groups of cards which are being tabulated, there being some groups for whose totals no summary card is wanted. Also, on some tabulating jobs summary cards are wanted for some of the grand totals and not for others. To meet such situations the invention includes means controlled by a special control hole in an item card so to set the mechanism that when the total of that group of cards is printed no card will be fed in the punch. Also means are provided whereby if in a succession of groups of cards a similar hole be punched in some item card the grand total summary card will be eliminated in the same way, that is to say, no card will be fed for the grand total operation of the punch.

It has already been described how card feed can be prevented by releasing one or the other of the hooks 1045 and 1047 (Figs. 29 and 30) which connect the grand total and total operating control levers with the lever 1043 which through its link 1042 controls the card feed in the punch. For the purposes just above mentioned and for other purposes, these hooks are provided with latches capable of holding them in disengaged positions, and said latches are associated with certain control mechanism such as will be described. Referring to Fig. 29, a latch 1070 is pivoted at 1071 to the card feed lever 1043 which in this figure is broken away to avoid hiding other parts. When the hook 1045 is swung out of engagement with its stud 1046, the latch 1070 snaps into engagement with the leftward arm of said hook and locks it in its released position, a spring 1072 connecting the hook and the latch. Said latch has a tail 1073 adapted to engage a stud 1074 on the grand total lever 973, said tail being set at such an inclination that when the said lever 973 is operated for a grand total cycle the stud releases the latch 1070 and allows hook 1045 to snap back into engagement with its stud 1046. By this time in the operation, however, said stud has passed the tooth of said hook but when the lever 973 returns to normal position the stud 1046 returns to its normal position and the hook snaps into operative engagement with it.

A latch 1075 (better shown in Fig. 42) is pivoted to the under side of the card feed lever 1043 and adapted to engage the hook 1047 and latch it in inactive position. This latch also has a tail 1076 engaged by a stud 1077 on the lever 984 and acting in the same way as above described.

that is to say, when said lever is rocked on a total taking cycle it releases the latch and allows the hook to reengage its stud 1048. A pair of Bowdens 1491C and 1491D is anchored in the same bracket as the Bowden 1051 heretofore described so that when the Bowden wire is operated it will swing to inactive position both of the hooks 1045 and 1047.

The latches 1070 and 1075 are controlled, respectively, by the 6 and the 5 keys 961 of the keyboard. The stem of the 5 key operates a bell-crank 1080 (Fig. 9) which through link 1081 rocks a bell-crank 1082 to pull up on a link 1083, the lower end of which is shown in rear elevation in Fig. 10. The 6 key similarly operates a second bell-crank which in Fig. 9 is hidden behind the bell-crank 1082 and which, when the key is depressed, moves upward a link 1084 (Fig. 10). These two links at their lower ends are slotted and are guided, respectively, on fixed studs 1085 and 1086.

The tails 1073 of the grand total latch and 1076 of the total latch are prolonged toward the rear of the machine, the latter being longer than the former, as will be understood from Fig. 42. As viewed in Fig. 10, the lower end of the grand total link 1084 is inclined at 1087 and when this link is in its normal down position it holds the tail 1073 and the latch 1070 inactive, that is to say, the latch is held away from the hook 1045 and does not operate on it. If, however, the 6 key be depressed and this link 1084 be drawn upward, the latch will be free to engage its hook.

The slide 1083 has a stud 1088 playing in a slot in an inclined arm of a lever 1090 pivoted on the stud 1086 and said lever, when in normal position, normally acting on the tail 1076 of the latch 1075 to hold the latter inactive. If, however, the 5 key be depressed, pulling the link 1083 upward, the stud 1088 will rock the lever 1090 and free the latch to perform its function on its hook. During operations heretofore described, these keys 5 and 6 are in their normal positions and the latches inactive so that if the hooks be swung to inactive position by one of the Bowden wires they will return to active position when the pressure on the wires is released. If, on the other hand, the key 5 be in its down position, the latch 1076 is free to act and will hold the total hook 1047 inactive and this hook through its ear 1063 will also hold the grand total hook inactive until the latch 1075 is released. If the key 6 be in its down position it will free the grand total latch 1070 so that when the pressure on the Bowden is released the total hook 1047 will return to normal but the grand total hook will be held inactive.

The Bowden 1078 goes to the wiring unit of the tabulator where it can be operated under control of a special or control hole punched in some item card. When it is desired to utilize this function of the machine in order, occasionally, to prevent the issuing of a summary total card for some particular one of the several groups of cards, the 5 key is depressed, freeing the total latch 1075 for action. Then, when it is desired to prevent the issuing of a total card for some particular group of cards, some one of the item cards in that group other than the first card of a group is punched with a control hole.

When it is desired that some one of the groups of cards being run through the tabulator shall have its total printed in the tabulator, but no total card punched for that particular group, then in some item card of that group other than the first card in the group this control hole will be punched and when that card is sensed, the Bowden 1078 will rock the two hooks 1045 and 1047 inactive where they will be held by the latch 1075. In the succeeding total operation, when the lever 984 is rocked by the operation of the total interponent 940, it will set the punch into operation as above described, and the stud 1076 will release the latch 1045 and let the hook 1047 return to normal position ready to perform its function at the next total taking operation.

It has been described hereinbefore how in case the tabulator is printing totals and grand totals the punching machine will not punch grand total cards because the hooks 1045 and 1047 were disabled by the Bowden 1051 operated by the grand total interponent 950. It may be pointed out that the latter function requires that both the 5 and 6 keys be in their upper positions so that the latches are inactive. When the machine is set up to punch grand total summary cards it may be desired to eliminate certain of those cards. This may be done by the same Bowden 1078 (Fig. 30) that is used to eliminate total cards, the control hole in this instance being punched in any item card in any one of the groups that enters into the grand total except that it must not be punched in the first card of any group. For this operation the 5 key is set in its upper position to render the total latch 1075 inactive and the 6 key is set down to render the grand total latch 1070 active. When, now, the card containing the control hole is tabulated, the two hooks 1047 and 1045 will be pushed to released position by the Bowden but only the grand total hook 1045 will be retained there by its latch, the total hook returning to its normal position when the pressure on the Bowden is released. If, now, a total taking operation occurs, the total card punching mechanism will work in its usual way including the card feed brought about by the hook 1047, but the hook 1045 is continually latched out during one or more total taking operations. When, however, the grand total operation occurs, the operating lever 973 (Fig. 29) will be operated but not the card feed lever. However, the operation of lever 973 will release the latch 1070 which at the end of the operation will release the hook 1045 from its latch 1070 and the former will return to its active position at the end of the operation.

In some jobs no total cards are punched but only grand total cards. In that event any grand total summary card can be eliminated as above described, the same as when totals are being punched, that is to say, the control hole will be punched in some item cards before the grand total operation.

*Paper feed*

Tabulators such as the one to which the present invention is here shown applied are sometimes equipped with an automatic paper feeding mechanism of the type disclosed in the copending application of Joseph M. McDonnell, S. N. 615,968, filed September 13, 1945, now Patent No. 2,467,449 which is adapted to feed the paper rapidly from one predetermined printing line to another.

In said application there is disclosed a certain blank cycle device which, at appropriate times, causes the tabulator to execute a blank cycle prior to a paper feeding operation. However, in use, it was found that when the paper was fed a distance at high speed it did not stop at exactly the right position, which caused a slight overfeed. This difficulty was overcome by setting the paper feeding mechanism to feed the paper one line short of the one on which it is desired to print, by modifying the blank cycle device to produce a blank cycle following every paper feeding operation, with the exception of a feed to an isolated total line, and by further modifying said device to actuate the line space mechanism to feed the paper to the correct position during said blank cycle.

This affects the present invention in that a tabulator so equipped will execute a blank cycle following every total or grand total cycle on which said paper feeding mechanism operates, the first item cycle during which the designation is set up in the punch being deferred until the second cycle after the total or grand total cycle.

Therefore, means are provided to cause the punch to execute an extra cycle following the blank cycle of the tabulator and to condition the punch to pick up the designation during said cycle.

Before describing said means, however, it is deemed desirable briefly to describe the blank cycle device of the paper feed mechanism and to point out the modifications in it over what is disclosed in the aforementioned application to McDonnell.

The blank cycle device includes (Fig. 45) an upstanding link 1092 pivoted at its upper end to a link 1093 by a stud 1094 which, when the link 1093 is moved rearward, as presently will be described, moves into the path of a finger 1095 on the forward arm of a lever 1096 pivoted at 1097 and whose other arm carries a roller 1098 pressed against a cam 1100 by a spring 1101. The cam 1100 is on a shaft 1102 which makes a complete rotation during each paper feeding operation.

The construction is such that if the link 1093 be drawn rearward and the shaft 1102 rotated, the finger 1095 would elevate the link 1092 through stud 1094, and cause the tabulator to execute a blank cycle the same as described in the McDonnell application.

As thus far described, the mechanism differs from that disclosed in said application only in that the cam 1100 is formed to hold the link 1092 in its upper position from some period of time, making unnecessary the provision of a latch to hold the link in its upper position and an unlatching device to free said link, as is the case in the mechanism of said application.

The means whereby the link 1093 is moved toward the rear of the machine include (Fig. 45) an arm 1103 fast on a shaft 1104 and having a stud 1105 standing in front of and in contact with a lever 1106 loosely mounted on the shaft 1104, said lever having at its lower end a stud 1107 which, by a spring 1108, is held in the forward end of a slot in the link 1093. A spring 1109, acting on the upper end of lever 1106, normally holds the link 1093 in its forward position.

The just described mechanism is substantially identical with that disclosed in the McDonnell application, and when the shaft 1104 is rocked clockwise, as therein described, the link 1093 will be drawn rearward through arm 1103, pin 1105, etc., moving the stud 1094 into the path of movement of finger 1095 which will lift the link 1092 and set tabulator for a blank cycle preparatory to a "capacity feed" of the paper, all as described in said application to McDonnell.

However, as described hereinbefore, it is desired to institute a blank cycle following each paper feed except a feed to an isolated total line.

Therefore, certain other parts of the McDonnell mechanism have been provided with means to draw the link 1093 rearward to secure that result.

For present purposes, an operation of the paper feed mechanism is measured by a complete rotation of its detent disc 1111 which begins to rotate at about 185° of one cycle and is so geared to the drive mechanism to complete its rotation at about 115° of the following cycle. The notch of the detent disc is engaged, in the normal position of the parts shown in Fig. 45, by a roller 1112 on an arm 1113 fast on a rock shaft 1114.

The construction is such that the shaft 1114 will be held rocked during the entire rotation of said disc 1111. Therefore, this shaft 1114 was provided with an arm 1115 having a lever 1116 pivoted to its free end and biased counter-clockwise by a spring 1117. The lever 1116 has at its rearward end a hook 1118 engaging a stud 1120 in the upper end of lever 1106. Thus, rocking the shaft 1114 will, through hook 1118, draw the link 1093 rearward to initiate a blank cycle of the machine.

In order to disable the hook 1116 during the operation of feeding the paper to an isolated total line, said hook is settably connectable to the credit balance linkage described in the McDonnell application, to be rocked out of engagement with the stud 1120 at appropriate times. However, this mechanism, and also the mechanism whereby the line space mechanism is actuated during the blank cycle, play no part in the operation of the present invention and are not shown here.

It may also be remarked that the connections of the link 1092, whereby it institutes a blank cycle, are completely shown in the McDonnell application and need not be shown here.

The means whereby the paper feed mechanism affects the present invention will now be described.

A second arm 1122 (Fig. 45) is fast on the shaft 1114 and has pivoted to its free end a link 1123 which extends downward and rearward alongside the link 1116 and has a slot 1124. Playing in said slot is a stud 1125 in the upper arm of a bell-crank 1126 loosely mounted on the shaft 1104 and whose lower arm supports a long downwardly extending link 1127, which is pulled up when the disc 1111 rotates. At its lower end the link 1127 is pivoted to an arm 1128 (Fig. 9) fast on a shaft 1130 which extends across the rear of the tabulator. The shaft 1130 is journalled in a bracket secured to the right hand frame plate of the tabulator and in a rearward extension of the frame bar 901 hereinbefore described. Near its left hand end shaft 1130 carries another arm 1131 to which is pivoted a downwardly and forwardly extending link 1132 whose lower end is connected by pin, slot, and spring, to the rearward arm of the bell-crank 1032 (Fig. 30) hereinbefore described. It will be remembered that the vertical arm of bell-crank 1032 supports the rearmost end of link 1034, which at its forward end is supported by bell-crank 1035.

Referring to Fig. 55, the horizontal arm of bell-crank 1035 underlies a stud 1133 in a slide 1134 mounted on the plate 906 by pins and slots. The upper end of said slide is bent off to form an ear 1135 which underlies the lever 1037 hereinbefore described.

The construction is such that every time the paper feed mechanism operates the links 1127 and 1132 (Figs. 9, 30 and 45) will be pulled at about 185° of cycle, rocking the bell-crank 1032 and moving the link 1034 forward. The forward motion of link 1034 rocks the bell-crank 1035 (Fig. 55), lifting the slide 1134 which through ear 1135 rocks the lever 1037 upward. The parts remain in these positions until about 115° of the following cycle when the paper feed mechanism returns to normal, resulting in that when the actuator slide 920, and with it the lever 1037, move rearward at the beginning of said following cycle, the ear 1036 of said lever is above the end of link 1034 and does not push said link rearward to trip the latches 1021 and 1022.

Thus, when the paper feed mechanism operates during a total or grand total cycle, the latches are not tripped at the beginning of the following cycle but remain in latching position for an extra cycle. Therefore, the punch runs through a blank cycle contemporaneous with that of the tabulator, and also another cycle during which the new designation is set up on the gag bars exactly as described hereinbefore.

It will be noted that the continued pressure on the Bowden 525D (Figs. 25 and 35) during the blank cycle causes the escapement mechanism 534—535 to be reset to release the designation type bar slides during the following cycle.

*No summary card for one card groups*

It sometimes happens that when running a series of groups of cards through the tabulator, some of said groups include only one card which may be the summary card of that group for the preceding accounting period, and some users of these machines desire that in such event no new summary cards be punched for those groups.

Therefore, the invention includes means presettable to prevent a summary card from being punched under such conditions, said means, in the present instance and preferably, performing its function by disabling the punch card feed so that no card is fed into the punch chamber even though the information which it is not desired to punch is set up on the gag bars. This is the preferred mode of operation due to the fact that in order to pick up the first card designation of the next following group the punch must otherwise function normally.

Said means will now be described.

It will be remembered that in the punch a card is fed when the link 1042 (Figs. 30 and 35) is pulled by the total or grand total bell-crank 984 or 973 through the hook 1047 or 1045, and that said hooks can be rocked selectively to an inactive position where the link 1042 will not be pulled even though the bell-crank 984 or 973 is actuated. Referring to Fig. 42, the total hook 1047 has pivoted to the under side thereof a roller 1140 engaged by a cam surface 1141 on one arm of a bell-crank 1142 pivoted on a post 1143 fastened to the frame plate 910 (Fig. 40).

In Fig. 42, the parts are shown in the positions they assume at the end of a total or grand total cycle with the total hook 1047 in engagement with the stud 1048, and the roller 1140 at the beginning of the rise of cam surface 1141. Means presently to be described are provided to rock the bell-crank 1142 counterclockwise one step during each of the first three cycles following a total or grand total cycle with the effect that, on the first cycle, the rise of cam surface 1141 rocks the hook 1047 to inactive position where it remains through the second cycle and until in the third cycle the rise of cam surface 1141 passes the roller 1140 and allows the hook to return to its normal active position.

The other arm of bell-crank 1142 (Figs. 42 and 55) has at its end a finger held by a spring 1144 in engagement with the rearward end of a slide 1145 guided for front and rear movement on two studs 1146 in the frame plate 906. The slide 1145 has in its upper edge ratchet teeth 1147 engaged by a pusher pawl 1148 pivoted at 1150 to the tail 921 of the actuator slide 920, and a holding pawl 1151 pivoted on a fixed stud in the frame plate 906 (see also Fig. 9) directly behind the pivot 1150. The pawls 1148 and 1151 are drawn into engagement with the teeth 1147 by springs 1152 and 1153, respectively, the latter being anchored to the forward end of pawl 1151 by a post 1154 which overlies the pawl 1148 forward of its pivot.

The construction is such that when the actuator slide 920 advances at the beginning of each cycle the pusher pawl 1148 will advance also, moving the slide 1145 rearward one step where it is held by the holding pawl 1151. However, the slide 1145 has only three teeth 1147 and when after three cycles the holding pawl 1151 is engaging the forwardmost one of said teeth, further movements of the pusher pawl 1148 are ineffective.

Thus, if there is only one card in a group the hook 1047 will be disabled during the cycle in which said card is sensed, will remain disabled during the next cycle which is the blank cycle of a total operation, and will move back to active position during the total cycle but, as the movement of actuator slide 920 not only is moving the bell-crank 1142 to free the hook but is also rocking the bell-crank 984 to operated position (Fig. 30) the stud 1048 is moved out of range of the hook and is not engaged thereby until late in the cycle when the actuator slide 920 is restored.

However, if the group contained a second card, the hook 1047 would have returned to active position during the blank cycle and a card would have been fed. Likewise, if the total cycle on which no card was fed in the punch was followed by a grand total cycle, the grand total hook 1045, which had been disabled by the hook 1047 and then enabled along with the latter during the total cycle, would pull the link 1042 and a card would be fed in the punch during the grand total cycle.

In order to restore slide 1145 and bell-crank 1142 to normal position during each total cycle, the following means are provided:

A lever 1156 (Figs. 40 and 55) pivoted at 1157 to the frame plate 906 has at its lower end a nose standing above the stud 1154 and above its pivot supports the forward end of a link 1160 which at its rear end is guided for front and rear movement on a stud 1161 in the frame plate 906. A stud 1162 on the link 1160 stands in the path of movement of the total and grand total interponents 940 and 950, and when either of said interponents is actuated as hereinbefore described, the link 1160 is drawn rearward, rocking the lever 1156 which, through stud 1154, rocks the pawls 1148 and 1151 free of the teeth 1147, allowing spring 1144 to restore slide 1145 and bell-crank 1142 to normal position. It may be remarked that the grand total interponent 950 restores this mechanism to normal in order to nullify the advance of slide 1145 during the grand total cycle. Otherwise, if the following group contained only one card the slide would move to its third position during the blank cycle and, in the punch, a card would be fed during the total cycle. It will be remembered that the interponents 940 and 950 have been moved rearward sufficiently to start the punch by 22° of tabulator cycle but continue to move further rearward until about 40° of cycle. The stud 1162 is so positioned relative to said interponents that it is this last portion of their movement that draws it rearward to restore the slide 1145 and bell-crank 1142. On a total cycle, the cam surface 1141 (Fig. 42) does not swing to normal position until after the hook 1047, if active, has been pulled to initiate a card feed. Thus, the roller 1140 is out of the path of said cam surface and is not affected by the return motion thereof. Likewise, on a grand total cycle when the cam surface 1141 rocks the hook 1047 to inactive position, the grand total hook 1045 has already been pulled and is not disabled through the ear 1063.

In order that this mechanism may be set operative or inoperative, the 7 key 961 (Fig. 40) has its stem pivoted to an arm 1163 on a short rock shaft 1164, said shaft also carrying an arm 1165 which at its lowermost end has a stud playing in a slot in a link 1166 whose other end is pivoted to the upper end of lever 1156. In the upper inactive position of the 7 key, the arm 1165 holds the link 1166 rearward and, therefore, the lever 1156 rocked and the pawls 1148 and 1151 inactive. However, if the 7 key be depressed, the lower end of arm 1165 moves forward and a spring 1167 draws the link 1166 after it, allowing the pawls 1148 and 1151 to move into engagement with teeth 1147, but permitting the pawls to be disabled on occasion by the link 1160.

As described hereinbefore, the tabulator is in many instances provided with special paper feeding mechanism which, among other things, institutes a blank cycle following every total or grand total cycle on which said mechanism operates. In order to prevent the slide 1145 (Fig. 55) from advancing on these blank cycles and allowing a card to be fed in the punch even if the following group contains only one card, the slide 1134 which, as hereinbefore described, is elevated preparatory to each of said blank cycles and held in that position for the first half cycle, is provided at its lowermost end with a flange 1170 underlying a nose on the pusher pawl 1148.

The construction is such that when the paper feed mechanism operates to initiate a blank cycle the slide 1134 is raised, rocking the pawl 1148 free of the teeth 1147, so that when the actuator slide 920 advances at the beginning of said blank cycle, the slide 1145 is not advanced on that cycle. The slide 1134 is restored at about 115° of the blank cycle and when during the following cycles the actuator 920 advances the slide 1145 will advance with it.

It will be remembered that the card feed hooks 1045 and 1047 (Figs. 29, 30 and 42) are provided with latches 1070 and 1075 settable by keys 5 and 6 active and inactive to retain said hooks in inoperative position when they have been moved to such position under card control to eliminate a summary card.

These latches 1070 and 1075 are never set active by their keys 961 when it is desired to eliminate total summary cards for one card groups as above described. The reason for this is that even if no total group within a grand total group contains only one card, the total hook 1047 and with it the grand total hook 1045 are moved to inactive position during the first machine cycle, as above described, and if the latches 1070 and 1075 are set active the hooks 1045 and 1047 will be retained inactive and when the total and the grand total occur, no summary cards will be fed. In short, the 5 and 6 keys should never be depressed on the same piece of work as the 7 key.

*Operation of punch by a control hole*

In some instances it is desired that information contained in some card or cards, other than the first of a group being run through the tabulator, be reproduced in a summary card. This information may or may not be of designatory nature and the summary card into which it is punched may or may not also have designatory matter from the first card punched in it.

To this end, the invention includes means presettable, active or inactive, to initiate an operation of the punch to set up such information on the gag bars under card control.

In the preferred form shown in the drawing, this means includes (Figs. 9 and 43) a third interponent bar 1175 having at its top a slot 1176 by which it is pivoted on a stud 1177 in a plate 1178 fastened to the frame bar 901. At its lower end the bar 1175 passes through the slot 933 in the plate 910 nearest the observer in Fig. 30, and is held in the forward end of said slot by a spring 1179. In its forward edge the bar 1175 has a cutout extending a short distance above and below the actuator slide 920 so that said actuator never engages said bar directly, but said actuator does engage a bar 1180 mounted on the interponent bar 1175 by pins and slots which permit up and down movement of the bar 1180 free of bar 1175. In its forward edge the bar 1180 has an upper slot 1181 and a lower slot 1182, the latter of which normally is in the path of the actuator 920 when the bar 1175 is in disabled position and the former of which normally is in the path of said actuator when the bar 1175 is moved to active position, as now will be described.

The 3 key 961 has its stem pivoted to an arm 1183 (Figs. 9 and 43) fast on a short rock shaft 1184 which also carries inside the bar 901 an arm 1185 connected by a link 1186 with the vertical arm of a bell-crank 1187 pivoted on a stub shaft 1188. In Fig. 9, the arm 1185, link 1186 and bell-crank 1187 are hidden behind other parts which will be described hereinafter. The horizontal arm of bell-crank 1187 has its upper edge flattened to engage a stud 1190 on the bar 1175 and, in the "up" position of the 3 key, shown in Fig. 43, retains bar 1175 in its upper disabled position where the notch 1182 is in register with the actuator 920. However, if the 3 key is depressed, the bell-crank 1187 will rock clockwise and allow the bar 1175 to drop down to active position with notch 1181 in register with the actuator 920, and it is this latter position in which the parts are placed when it is desired to punch matter taken from a card other than the first.

Those cards containing information to be punched in a summary card also contain a control hole which permits its corresponding set pin 127 (Fig. 4) to be elevated. This set pin, however, is not wired to one of the permutation bars but to a fixture on the side of the wiring unit which in a well known manner results in the actuation of a Bowden 1191 which, at its other end, is positioned to act on a flange of the depending arm of a three armed lever 1193 (Fig. 43) pivoted on a stud in the frame plate 906. The lever 1193 is normally drawn counter-clockwise by a spring 1194 and has a rearwardly extending arm 1195 underlying a block 1196 riveted to the bar 1180 and which, as here shown, is extended rearward to serve as an anchor for a spring 1197 whose function it is to tension the bars 1180 and 1175 downward.

The construction is such that the notch 1182 is in the path of actuator 920 but if the 3 key is depressed the bars 1175 and 1180 move downward, bringing the notch 1181 into the path of slide 920 and bringing block 1196 into contact with arm 1195. When then a card containing a control hole is sensed, the Bowden 1191 is actuated at about 340° rocking the lever 1193 which lifts the bar 1180 to move the slot 1181 above the actuator 920. Thus, at the beginning of the following cycle which, it will be remembered, is the cycle in which the data in the control hole card is printed in the tabulator, the slide 920 will advance and rock the bars 1175 and 1180 to start the punch as presently will be described. The bar 1180 is held up by the arm 1195 until about the end of the cycle by which time the actuator 920 has been restored, allowing the bars 1175 and 1180 to rock forward.

In order to cause a punch operation, a push link 1198 (Fig. 32) passes through the plate 1062 in position to be actuated by the bar 1175 and at its other end is pinned to a bell-crank 1200 pivoted on the post 913. Like the total bell-crank 986 (Fig. 30), the bell-crank 1200 has pivoted to its free arm a long link 1201 which extends over to the punch where (Fig. 35) it is connected to the forward arm of a three armed lever 1202 pivoted on the post 585 hereinbefore described. However, unlike the total bell-crank 986, the bell-crank 1200 has no latch like the latch 1021. The other arms of the lever 1202 act respectively on the universal bar 584 which, it will be remembered, is rocked to start the punch, and on the plunger of the lower Bowden 525S (see also Fig. 8) which leads up to the head of the punch where (Fig. 23) it actuates the plunger 522S. This plunger, through the associated levers 515 and 517, depresses the interponent 512 appropriate to the releasing bar 476 into the path of actuator 510.

When it is desired to punch information in a summary card from a card other than the first of a group, the type bar slides 362 (Fig. 17) appropriate to said information have their settable pieces set with their noses 474 beneath the releasing bar 476, so as to be released when said bar is depressed.

In some instances, one of the just described mechanisms may suffice, but for some operations of the machine it is desirable to have two. To this end, the 4 key 961 (Figs. 9 and 44) controls a second mechanism identically like that controlled by the 3 key, except for certain construction differences that will be pointed out. The mechanism controlled by the 4 key is illustrated in Figs. 33, 35 and 44, and each part thereof is designated by the same reference number as the corresponding part of the mechanism controlled by the 3 key, but with the letter "A" added.

The stem of the 4 key is pinned to a bell-crank 1183A (Fig. 44) pivoted on the stub shaft 1184, and is connected by a link 1186A with the upper of two arms 1187A fast on the stub shaft 1188 and offset from one another. The horizontal arm 1187A on the inner end of said shaft underlies a stud 1190A in the bar 1175A.

The remainder of the mechanism is identically like that controlled by the 3 key except for position, that is to say, the bar 1175A passes through the slot 933 second from the observer in Fig. 30, and the bell-crank 1200A (Fig. 33), link 1201A, and lever 1202A (Fig. 35) lie above the bell-crank 1200, link 1201, and lever 1202.

However, the lever 1202A actuates the upper Bowden 525S (Fig. 8) which extends up to the head of the punch where it causes the releasing bar 477 to be depressed, the same as described hereinbefore with reference to the bar 476.

The Bowden 1191A, by which lever 1193A is rocked (Fig. 44), is actuated the same as the Bowden 1191 but under control of a different control hole.

In some instances, as will be described hereinafter, it is desired that the bars 1180 and 1180A be raised to active position by the levers 1193 and 1193A under control of means other than a control hole in order to use this mechanism for other purposes than that just described.

Therefore, means are provided whereby in the present instance the Bowden 1191 and 1191A are held normally above the flange of levers 1193 and 1193A, but can be moved down into register with said flanges under key control.

To this end, the stem of the 8 key 961 (Fig. 9) is pinned to an arm of a bell-crank 1203 pivoted on the stub shaft 1164, which arm is hidden by the arm 1169 in Fig. 9. The other arm of said bell-crank is connected by a link 1204 with a lever 1205 (see also Fig. 43) pivoted on a stud 1157. At its rearward end said lever has a flange 1206, which in the present instance supports four Bowdens, the upper two of which are the Bowdens 1191 and 1191A.

The construction is such that the Bowdens 1191 and 1191A normally stand above the flanges of the levers 1193 and 1193A, but if the 8 key 961 be depressed the lever 1205 is rocked counterclockwise, bringing said Bowdens into register with said flanges and bringing the lower pair of Bowdens out of register with said flanges.

Therefore, in order to operate the punch from a control hole, the 8 key must be depressed along with the 3 or 4 key, or both.

*Preventing punching under special conditions*

It is sometimes desired not to punch a summary card under certain special conditions. For example, in some applications it is not desired to punch a summary card when the balance or total is zero, in which event no sensing bar 363 in the total field will advance beyond its zero position. This is done by preventing a card feed on such total operations. To this end a lock is provided for the card feed and a trip for said lock to free the card feed when one of said sensing bars advances beyond zero, all as described in the Mueller application. According to the present invention, however, novel means are provided to disable said lock on occasion.

Each sensing bar 363 has pivoted to its rear end a bar 1250 (Fig. 17), said bars near their rear ends being supported and guided by cross frame bars 1251, 1252, 1253 and 1254 connecting the side plates 440. When any sensing bar 363 advances, the rear end of its bar 1250 moves rearward beyond the said cross frame bars. It will be recalled that the sensing bars 363 are arranged in pairs and designated A and B. The bars 1250B lie above and the bars 1250A beneath the restoring bar 370 and springs 368 for lateral compactness. The disabling means for the lock is actuated by these bars. Pivoted in the side plates 440 behind the cross bar 1254 are two rock shafts 1255A and 1255B, each having a pair of bail arms 1256 fast thereon supporting a bail bar 1257, here shown as an angle bar of sheet metal. The shafts 1255A and 1255B are connected together by arms and a link 1258 (Fig. 26) to rock in unison, so that in effect they act as one shaft. Supported by the side plates 440 are two transverse bars 1260A and 1260B (Fig. 17), each having a series of hand settable pieces 1261 pivoted thereto by a comb plate 1262 adapted to be engaged by notches 1263 in the pieces 1261. There is one of these set pieces 1261 behind each of the bars or slides 1250 and each passes through a vertical slot in a suitably supported comb plate 1264 and is pressed downward by a leaf spring 1265. In Fig. 17, a set piece 1261B is shown with its middle notch engaging the pivot 1262, but by lifting the rear end of it by hand, it can be slid toward the rear of the machine until its forward notch 1263 engages the comb plate, as shown at 1261A. Each of the settable pieces 1261 has just forward of the guide plate 1264 an inclined lower edge 1266 followed by a notch 1267, and the end of said piece 1261 is formed off into an ear 1268 (Fig. 18). When a piece 1261 is set with its middle notch engaging the pivot plate 1262, this ear stands at a distance from the rear end of the slide 1260, such that when said bar advances to zero position the rear end of the slide 1250 just about abuts the flange 1268. This flange is made at an inclination so that if the slide 1250 proceeds further rearward than its zero position the front end of the piece 1261 will be cammed upward, as shown in the case of the piece 1261A in Fig. 18. When the piece 1261 is thus swung upward at its front end, a hump 1270 thereon lifts the bail bar 1257 and slightly rocks the shaft 1255 counterclockwise. In the instance where this is used to prevent punching on zero balance, all of the set pieces 1261 in the total field (and no others) will be set with their middle notch engaging the comb plate 1262, and will operate as above described, so that if on the total cycle any sensing slide in that field advances beyond its zero position, these two rock shafts will be rocked counterclockwise. In other fields, the pieces 1261 are set like the piece 1261A in Fig. 17 with their front notches engaging the pivot plate 1262. When the piece is set rearward to this position the incline 1266 cams the front end of the piece 1261 upward until the notch 1267 engages the comb plate 1264, raising the flange 1268 out of the path of the bar 1250. This setting of the piece 1261 also moves the hump 1270 out from under the bail bar 1257 so that the latter is not raised. In this position the mechanism in question is inactive and without effect.

The mechanism above described has for its function to prevent punching of a summary card except when some amount is set up in the field controlled by the active pieces 1261. This is done by locking the card feed and unlocking it under the control of the said mechanism so that, although the punch goes through all its regular movements, no card is fed and, therefore, none punched. The machine operates in this way because it is not until the punch has been set into operation and the data has come over from the tabulator and been set up in the punch that the machine knows that no card is wanted. It will be recalled that the card feed is normally locked by the latch 677 (Fig. 35) and is unlocked only when a card feed is desired. An additional lock for the card feed is provided, which when the present mechanism is in use, also normally locks the card feed which is released only when the shafts 1255 are rocked.

On the picker operating shaft 274 is an arm 1272 (Fig. 14) having a pin 1273 which according to the present invention plays in a slot in a long link 1274, extending toward the back of the machine and pivoted to a bell-crank 1275 to the horizontal arm of which is pivoted a link 1276, which (Fig. 7) extends upward and terminates a little below the rock shaft 1255A (see also Figs. 17 and 26). Pivoted at 1279 (Fig. 14) to the forward end of the link 1274 is a lever 1277 (Fig. 15) which extends rearward alongside of said link and has a shoulder 1278 normally drawn into engagement with the pin 1273 to lock it in the forward end of said slot by a spring 1280. Thus the arm 1272 and link 1274 are in effect pivoted together by the pin 1273, said pin being allowed to play in said slot only when the shoulder 1278 is moved out of engagement with said pin as will be described hereinafter. In Fig. 15, the arm 1272 and the link 1274 have been omitted to show the parts behind them.

The construction is such that when the shaft 274 is rocked clockwise to operate the picker knife the link 1274 moves toward the rear of the machine, and through bell-crank 1275 pulls down the link 1276. The means whereby the mechanism in question locks this link 1276 and prevents card feed is best shown in Fig. 26. The upper end of the link 1276 has a slot 1281 guided on a headed screw 1282 threaded into a block 1283 screwed to the outside face of the frame plate 440. Said link has an ear 1284 normally engaging a shoulder on a block 1285 slidable on the upper surface of the block 1283, and when said ear is so engaged the link 1276 is locked against downward movement, locking the card feed through the chain of linkage just described. The upper shaft 1255B has fast thereon an arm 1286 having an open ended slot which embraces two pins projecting from the block 1285, namely, a lower pin 1287 which moves the block when the shaft 1255 is rocked and a headed pin 1288 passing through the upper part of the slot in the arm, which upper part is widened so that its walls do not touch the pin 1288, the function of which is by its wide flat head to hold the block 1285 face to face with the arm 1286. It will be perceived that by the described means the card picker is normally locked but will be released as far as the link 1276 is concerned when one of the shafts 1255 is rocked.

An arm 1290 is fast on the lower rock shaft 1255A and projects upward therefrom. A disabling button 1291 is provided of familiar construction and including a hollow post riveted to the arm 1286 and within which is a plunger. These buttons are so arranged that the plunger may be withdrawn to inactive position and held there, and projected to active position by hand. This one is so disposed that if the rock shafts 1255 be rocked clockwise in Fig. 26, the arm 1286 carrying the plunger or button 1291 and the arm 1290 will be rocked toward the front of the machine, and if then the plunger be projected into the plane of said arm the two shafts will be locked in their operated positions with the block 1285 out of the path of the ear 1284 on the link 1276. Whenever the picker is then operated said link will move down and up without obstruction and without effect.

It may be remarked that when the machine is set for punching a series of total cards, followed by a grand total card, in the event that the last group of cards in a stack happened to yield a zero balance the operation would be as follows:

At the time, namely, in the first part of the total cycle when the total summary card is ordinarily fed from the stack, the picker would be locked and no card would be fed, but the grand total card is fed out by the picker in the first part of the grand total cycle at which time the grand total has itself been set up on the same sensing bars as are used for the group total and the picker would, therefore, be unlocked and feed the grand total card. In the event (perhaps a rare one) that the grand total was itself zero, then no grand total summary card would be fed. All of this is as described in the Mueller application.

The Mueller application describes a third setting of the settable pieces 1261, as shown at 126 B in Fig. 18. This locks the sensing slides against even their ordinary advance to zero position.

*Starting and stopping both machines*

Tabulators such as the one to which the present invention is herein shown applied are provided with a variety of automatic stop mechanisms, all as described in the aforementioned patent to Mueller, 2,381,361. The details of these mechanisms are not pertinent here and will not be described, it being sufficient for an understanding of the invention to know that each of said mechanisms, in order to stop the machine, imparts a clockwise rocking movement to the tabulator stop shaft 1295 (Fig. 9).

As described in the patent, an arm 1296 is fast on said shaft and has pivoted thereto an interponent 1297. The interponent 1297 is normally held in inactive position by a spring acting on shaft 1295, but when moved to active position by the rocking of shaft 1295, is interposed between a plunger 1301, which is reciprocated at the end of each cycle by the usual stop cam and a block 1304 on a heavy lever 1302 which, when it is rocked about its pivot by the plunger 1301, opens the clutch and stops the machine in known manner. The lever 1302 is partially hidden in Fig. 9, but as it is such a familiar part of these machines it is not thought to need further illustration. In order to make it unnecessary to hold the shaft 1295 rocked for any period of time, a latch 1298 is pivoted to the interponent 1297 and engages a block 1300 on the framing to hold said interponent in its active position when it has been moved thereby the rocking of shaft 1295. The latch 1298 is prolonged over the plunger 1301 by which it is released from the block 1300 to be restored to inactive position with the interponent 1297.

However, in the present instance, one of said automatic stop mechanisms might act to stop the tabulator at the end of a total or grand total cycle, at which times, the punch is in the first or second cycle of a punching operation.

It will be remembered that the latches 1021 and 1022 (Fig. 30) hold their signal transmitting links 987 and 976 in operated position until early in the first item cycle following a total or grand total cycle, as the case may be, in order that the punch will run for an additional cycle during which the designation is set up on the gag bars.

With the mechanism thus far described the latch 1021 or 1022 would not be tripped if the tabulator were stopped, but the punch would continue running for a succession of cycles until the tabulator was again started and the latches tripped. However, it would be almost impossible to start the tabulator by hand near enough to the correct point in the punch cycle for the two machines to cooperate properly and set up the designation on the gag bars.

Therefore, means are provided to stop the punch whenever the tabulator is stopped. This means may be of any suitable sort, that shown being simple and effective.

Loosely mounted on the tabulator stop shaft 1295 (Fig. 9) is an arm 1303 having an ear overlying the block 1304 on the heavy lever 1302, and having an upwardly extending link 1305 pivoted thereto. At its upper end the link 1305 has a slot which engages a pin 1306 (Fig. 30) in the horizontal arm of the lever 1031, which, it will be remembered, is fast on the shaft 1027. At its other end shaft 1027 carries the arm 1028, which, through stud 1030, trips the latches 1021 and 1022.

The construction is such that whenever the tabulator stop shaft 1295 is rocked to stop the tabulator, the latches 1021 and 1022 are tripped through the linkage just described, and the punch stops at the end of its cycle, which, it will be remembered, is some 22° later. It may be remarked that the slot in link 1305 permits the latches 1021 and 1024 to be tripped by other means without operating the linkage 1305, 1303.

The tabulator is started by depressing the usual palm key 1308 (Figs. 9 and 51). This key, as shown in Fig. 6 of the Mueller Patent 2,381,361, rocks a shaft 1311 (Fig. 51), an arm on which pushes downward a link 1600 (Fig. 9), rocking a bell-crank 1601 and operating a push link 1602 which is, in effect, the link 33 of the Alvine Patent 2,151,177, thus starting the tabulator as described in the latter patent. However, in the present instance, it is desired that when, as above described, the tabulator and punch are stopped during a punching operation, both machines be started in proper synchronism. This can be done in a variety of ways, but the one about to be described is the preferred one. Also fast on shaft 1311 is an arm 1312 which carries a bell-crank 1313 urged counter-clockwise by a spring 1314. One arm of said bell-crank limits on the shaft 1311 and the other arm constitutes a pawl 1309 which engages a shoulder 1315 of a latch lever 1316 pivoted on a stud 1319 in an ear of a bracket 1317 supported on the casting 902.

The latch lever 1316 has near its forward end a shoulder 1318 engaging a stud 1320 in a substantially vertical link 1321 drawn upward and rearward by springs 1322 and 1323, the former of which also draws said latch lever clockwise about its pivot. The link 1321 is guided at its upper end in a slot in the bracket 1317 and has a stud 1324 which limits against the under side of a bent off portion of the bracket 1317. Rearward motion of the link is normally prevented by the latch 1316. At its lowermost end the link 1321 is slotted to receive a headed pin 1326 in an arm 1327 fast on the shaft 582 which extends clear over to the left hand side of the punch where it carries the lever 581 (Fig. 35), a clockwise rocking of which starts the punch, as hereinbefore described.

In order that the link 1321 can rock the shaft 582 to start the punch, said link is provided with a piece 1330 (Fig. 51) having an ear standing a little below and forward of a shoulder 1332 in the horizontal arm of a bell-crank 1333 pivoted on a stud in the frame plate 901 and whose vertical arm is held against a small roller or nut 1334 on the follower lever 928 by a spring 1335. It will be remembered that the follower lever 928 is rocked by the actuator cam 931 and is used to start the punch automatically through the total and grand total interponents 940 and 950 (Fig. 30). This cam is, therefore, ideal for actuating the present mechanism to start the punch.

The operation is as follows:

Depressing the palm key 1308 rocks the shaft 1311 clockwise, starting the tabulator and causing the pawl 1309 to strike the shoulder 1315 a blow which rocks the latch lever 1316 counterclockwise and frees stud 1320 from the shoulder 1318. The link 1321 then snaps rearward under tension of the spring 1322, and when the pawl 1309 overthrows past the shoulder 1315 the latch lever 1316 snaps down on the stud 1320 which, however, has moved rearward and is not reengaged by the shoulder 1318. With the parts in this position the ear 1331 underlies the shoulder 1332 and as the cam 931 rotates, rocking the lever 928 and bell-crank 1333, said shoulder moves downward into engagement with the ear 1331, and rocks the shaft 582 through the link 1321 and arm 1327.

At about 22° of cycle the shaft 582 causes the clutch toggle in the punch (Fig. 35) to be broken and the punch clutch is closed to start the machine.

As the link 1321 is depressed the latch lever 1316 rocks about its pivot under tension of the spring 1322, until at last the shoulder 1318 again snaps into engagement with the stud 1320. When, therefore, at about mid cycle, the pressure on the link 1321, by the bell-crank 1333 is relieved, said link will move up to its normal position with the stud 1320 engaged by the shoulder 1318.

Due to the overthrow of the pawl 1309 past the shoulder 1315, the mechanism thus far described will rock the shaft 582 only once, no matter how long the manual pressure on the palm key 1308 is maintained. When the pressure on the palm key is relieved it will return to its normal upper position, the spring 1314 stretching to allow the pawl 1309 to pass the shoulder 1315.

When the machines are stopped by the automatic stop mechanism of the tabulator their cooperative operation is not affected with but one exception that will be described hereinafter.

If the punch had stopped at the end of a total or grand total cycle which was to be followed by a first card designation cycle, then on restarting, the card in the punch chamber would be punched, the designation set up on the gag bars and the punch would stop at the end of the cycle, all as described hereinbefore. It may be remarked that whereas the Bowden 525D (Figs. 36 and 38) had been restored to inactive position when the latch 1021 or 1024 (Fig. 30) was tripped, the escapement mechanism 534, 535 (Fig. 25) remained effective to cause the releasing bar 479 to be depressed to release the type bar slides 362 (Fig. 17) appropriate to the designation during the first cycle after restarting.

If the punch had stopped at the end of a total cycle which was to be followed by a grand total cycle and a first card designation cycle, whether or not a grand total summary card is wanted, then on restarting the tabulator the grand total interponent 950 (Fig. 29) would be rocked by the actuator 920, the same as if the machines had not stopped and the operation would be as hereinbefore described.

The one operation of the machines which is affected by stopping them under control of the automatic stop mechanism of the tabulator will now be described.

It has been described hereinbefore that in some instances the tabulator is provided with special paper feeding mechanism, which among other things, causes the tabulator to go through a blank cycle following each total or grand total cycle. Thus, the first card designation cycle is not the first cycle after the total or grand total cycle, but the second, which, if the machines should stop at the end of a total or grand total cycle, results in that, on restarting, the punch must run for two cycles or be started a cycle later than the tabulator. In the present instance, the punch is made to run for two cycles. It will be remembered that when the machines are restarted the type bar slides 362 (Fig. 17) appropriate to the designation are released under control of the escapement mechanism 534, 535 (Fig. 25). However, this mechanism is only effective for one cycle which, in the present instance, is an idle cycle (i. e., the tabulator type bars do not rise and, therefore, no information is transmitted to the punch) and means must be provided to release those type bar slides again during the second cycle in order to pick up the designation.

The means whereby the above operation is carried out may be of any suitable sort, that shown in the drawing and about to be described being the preferred one.

The shaft 1130 (Fig. 9) which, as hereinbefore described, is rocked by the paper feeding mechanism preparatory to the institution of a blank cycle by said mechanism, carries a depending arm 1336 having a stud 1337 which stands behind another arm 1338 pivoted on the shaft 1130. Connected to the free end of the arm 1338 is a long forwardly extending link 1339 pinned at its forward end (Fig. 51) to the lower arm of a lever 1340 of the first order pivoted coaxially with the latch lever 1316 on the fixed stud 1319. The lower arm of the lever 1340 carries a stud 1341 underlying the latch lever 1316 and acting when the lever 1340 is rocked to move upward in position to prevent the latch lever 1316 from rocking clockwise as will be explained hereinafter. The upper arm of the lever 1340 has its end formed into an inclined ear 1342 to cooperate with a latch 1343 fastened to an arm 1344 pivoted at 1339 to the ear of bracket 1317. A spring 1345 anchored at one end to a post 1346 in the ear of bracket 1317 and at the other end to a pin 1347 in the arm 1344 tensions arm 1344 and latch 1343 counterclockwise. The pin 1347, besides acting as an anchor for the spring 1345, passes through a slot in the upper end of a vertical link 1348 which at its lower end is pivoted to the horizontal arm of bell-crank 1333 hereinbefore described, and in the normal position of the parts (Fig. 51) the counter-clockwise movement of arm 1344 and link 1343 is limited by the pin 1347 engaging the bottom of the slot in link 1348. The post 1346 also acts as a limit pin in a certain operated position of the parts, as will appear hereinafter.

The construction is such that when the shaft 1130 is rocked by the paper feed mechanism at about 185° of the total or grand total cycle the lever 1340 is rocked and the stud 1341 moves upward under latch 1316. At this time the bell-crank 1333 has already been moved downward by cam 931 and the horizontal arm thereof has pulled down the link 1348, allowing the spring 1345 to rock arm 1344 and latch 1343 counterclockwise against the post 1346. Therefore, the rocking of lever 1340 causes the inclined ear 1342 to cam the latch 1343 clockwise about its pivot a short distance until the ear falls below the edge of said latch which is then snapped back against the limit stud 1346 in position to hold the lever 1342 rocked.

At about 195° of the same cycle the cam 931 allows the link 1348 to be pulled upward by the spring 1335, reaching its uppermost position at about 250°, at which time the latch 1343 has been moved to inactive position. The parts remain in this position until about 320° of that cycle when the cam 930 again starts to pull down on the link 1348. If now the machines stop, the operation is as follows: The tabulator is started by depressing the palm key 1308 and the pawl 1309 rocks the latch lever 1316 free of stud 1320, allowing the link 1321 to snap back to active position. Shortly after 0° the shoulder 1332 will engage ear 1331 on said link and depress it to start the punch at about 22°, as hereinbefore described.

With the link 1321 still in its depressed position, the paper feeding mechanism relieves the pull on shaft 1130 (Fig. 9) at about 115° and the arm 1336 returns to normal position. However, the latch 1343 (Fig. 51) prevents the lever 1340 and, therefore, link 1339 and arm 1338 from doing likewise, and the pin 1341 in lever 1340 retains the latch lever 1316 in inactive position, that is to say, it prevents the latch 1316 from rocking clockwise to engage a stud 1320. When about 250° of cycle the cam 931 allows the link 1321 to move to its uppermost position, the lever 1340 is released from latch 1343 and the spring 1322 draws the latch lever 1316 toward active position. However, by this time the link 1321 has moved to its uppermost position, preventing the shoulder 1318 in said latch from engaging stud 1320 in the link.

The link is, therefore, depressed a second time during the following cycle which is the first card designation cycle, and prevents the punch from stopping, that is to say, the shaft 582 is held rocked at the time when the punch mechanism tries to restore said shaft and open the clutch, as hereinbefore described. However, when the link rises during this cycle, shoulder 1318 in latch lever 1316 will engage stud 1320 in the link and latch said link in inactive position, and the punch will stop at the end of the cycle. Thus the punch runs for two cycles.

In order to release the type bar slides 362 appropriate to the designation on the first card designation cycle when said cycle is preceded by a blank cycle following a stoppage of the machines, the following means are provided:

A second link 1350 (Fig. 9) is pivoted to arm 1338 on shaft 1130, and extends frontward where it is provided with a long slot 1351 (Fig. 51) which engages a pin 1352 in the link 1321. Adjustably mounted on the link 1350 near its forward end is a plate 1353 having a flange 1354 which, in the normal position of the parts (Fig. 51), stands a short distance above and behind the plunger 1355 of a Bowden wire 1356D. This Bowden has its casing anchored in familiar fashion to a bracket fastened to the framing, and extends over to the summary punch where (Fig. 23) it is Y-wired to the regular designation release Bowden 525D.

The construction is such that when during the total cycle the shaft 1130 (Fig. 9) is rocked, the link 1350 moves forward, bringing the flange 1354 over the plunger 1355 (Fig. 51). Thus, when the link 1321 is depressed during a blank cycle following a stoppage of the machines, it will move the link 1350 down with it and the flange 1354 will depress the plunger 1355 to actuate Bowden 1356. Referring now to Fig. 25, it will be remembered that at the beginning of the blank cycle, which is the second cycle of operation of the punch, the escapement mechanism 534, 535 is effective to cause the release during that cycle of the type bar slides 362 appropriate to the designation, after which said mechanism becomes ineffective. However, the Bowden 1356D is actuated at the beginning of that cycle and remains actuated until about 195°, during which time said Bowden will hold its lever 515 rocked, preventing the lever 530 from being freed from the escapement 534, 535, so that at the end of that cycle, the mechanism is still effective to release the designation type bar slides once more during the following cycle, at which time the designation will be set up on the gag bars.

Referring now to Figs. 9 and 51, it will be remembered that at about 115° of the blank cycle the shaft 1130 rocks back to normal position but that the arm 1338 on said shaft does not return to its normal position until about 250° of that cycle. When said arm does restore, however, the link 1350 moves with it bringing the ear 1354 rearward of the plunger 1355. Thus, when, during the next cycle the link 1321 is depressed, the Bowden 1356 will not be actuated and the escapement mechanism 534, 535 in the punch (Fig. 25) will return to normal inactive position after the designation type bar slides 362 have been released to pick up the designation.

Stopping both machines from punch

In order to interrupt the operation of the tabulator and the punch in the event that certain conditions arise in the punch, the punch is provided with a plurality of automatic stop mechanisms. These mechanisms may be of various sorts and operate in a variety of ways, the ones about to be described being those required in the instant machine.

In the tabulator (Fig. 9) the stop shaft 1295 is provided with an upright arm 1357 having a pin playing in a slot in a link 1358 which is connected at its forward end to a depending arm 1359 fast on a shaft 1360. The shaft 1360 extends over to the punch, being journalled in brackets 1361 fastened to the casting 916 (Figs. 6, 9, and 27).

The construction is such that if this shaft 1360 be rocked counter-clockwise (Figs. 9 and 27) it will, through arm 1359, link 1358 and arm 1357, rock the tabulator stop shaft 1295 and cause both the tabulator and the punch to be stopped as described hereinbefore.

In the present instance, the punch is provided with three means, now to be described, to rock the shaft 1360.

Empty card hopper

In order that the machines will stop at the end of the cycle during which the last card is fed from the punch hopper 270 by the picker 271, the usual no card pin 1363 (Fig. 14) projects upward through a corner of the floor of the hopper in position to be depressed by a card if one is present but not by the weight which is placed on top of the cards in the hopper.

At its lower end the pin 1363 is connected to a lever 1364 of the first order pivoted to the framing on a stud 1365 and biased clockwise by a spring 1366 against a stud 1367 in the usual disabling lever 1368. At its rear end, the lever 1364 is pivoted to an upright link 1370 which, at its upper end, is connected to the free end of an arm 1371 fast on the upper shaft 1372 of two shafts which extend across the machine above two plates 1369 between which the cards are fed on their way to the punch chamber and which, at their ends, support brackets in which said shafts are journalled. At its right hand end the shaft 1372 has fixed thereon an upstanding arm 1373 (Fig. 27) which, at its upper end, has a pin 1374 playing in a slot in one end of a link 1375 whose other end is pivoted to a depending arm 1376 fast on the shaft 1360. Before describing the operation of the parts, it may be remarked that in Fig. 14 the no card pin 1363 and its associated mechanism is shown in operated position, due to the fact that no cards are in the hopper 270, but in Fig. 27 the shaft 1360 and its associated parts are shown in normal position.

The construction is such that when the last card is fed from the hopper the pin 1363 (Fig. 14) is elevated by the spring 1366 rocking the shaft 1360 counter-clockwise (Fig. 27) and stopping both the tabulator and the punch, as hereinbefore described.

It will be remembered that normally cards are fed into the punch chamber only during the total or grand total cycle which, in the normal operation of the machine, results in that the no card pin 1363 will be effective to stop the machines only during those cycles. All that is necessary to restore the machines to normal if they are stopped is to place a stack of cards in the punch hopper 270 and depress the tabulator palm key 1308 to start the machines.

The disabling lever 1368 has a slot engaging the stud 1365 (Fig. 14) on which the lever 1364 is pivoted so as to permit of a slight front to rear movement thereof, and at its front end is bent upward in front of the hopper 270 where it passes through a sheet metal plate 1378 and is formed into a finger piece. In its normal inactive position a pin 1380 in the lever 1368 engages the under side of the plate 1378 under tension of the spring 1366. However, if it be desired that the no card pin 1363 be disabled, the lever 1368 may be depressed until a shoulder therein comes below the plate 1378 and then drawn forward a little to engage said shoulder with the under edge of said plate. In this position the pin 1367 on the disabling lever holds the forward end of the lever 1364 in its lowermost position with the pin 1363 depressed and inoperative. This lever 1368 may be set in this position when the punch is not in use and no cards are placed in the hopper.

*Full card receptacle*

The receptacle 282 into which the cards are fed after being punched is in the form of a sheet metal box fastened to the rear of the punch (Figs. 14 and 27) and having a floor plate 1381 supported by a coil spring 1383 which is gradually compressed as the cards are fed onto the floor plate 1381. In order to prevent this receptacle from becoming too full and allowing cards to overflow onto the floor, the following means are provided to interrupt the operation of both machines when a certain number of cards have been passed into said receptacle.

A lever 1384 (Fig. 27), pivoted at 1385 to a fixed bracket in the lower part of the machine and urged clockwise by a spring 1386, has a stud 1387 projecting into the receptacle 282 in position to be depressed by the end of floor plate 1381 when said plate is sufficiently depressed by the weight of the cards resting on it. The forward end of the lever 1384 has a stud 1388 normally resting in a notch 1390 in the upper edge of a horizontal link 1391 supported at its rear end by an arm 1392 loosely mounted on the card stop shaft 688, hereinbefore described, and pivoted at its forward end to a bell-crank 1393. The other arm of this bell-crank is connected to an upright link 1394, slotted at its upper end to receive a pin in an arm 1395 fast on the shaft 1360. Thus, if the link 1394 be pulled down the shaft 1360 will be rocked to stop the machines, but the slot in said link permits said shaft to be rocked by other means without affecting the link. Adjacent the arm 1392, the shaft 688 has fast thereon an arm 1397 which, at its lower end, stands behind the pin by which arm 1392 is pivoted to link 1391. A spring 1396 tensions the link 1391 rearward, maintaining the pin 1388 in the forward end of notch 1390 and the pivot pin at the rear of the link in contact with arm 1397.

The construction is such that when enough cards have passed into the receptacle 282, plate 1381 will depress the stud 1387 rocking lever 1384 and lifting the pin 1388 out of the notch 1390 in link 1391. However, the spring 1396 does not immediately draw the link 1391 rearward, said link being held in its forward position by the arm 1397. When at about 194° of cycle the card stop shaft begins to rock, said arm 1397 moves rearward, allowing the spring 1396 to pull the link 1391 rearward and through the bell-crank 1393, link 1394, and arm 1395, to rock shaft 1360 to condition the machines to stop at the ends of their respective cycles, as hereinbefore described.

At about 300° of the same cycle the card stop shaft 688 rocks back to normal and through arm 1397 restores the link 1391 to its forward position. However, the lever 1384 remains rocked and, therefore, pin 1388 will not fall into the notch 1390 until the cards have been removed from the receptacle and the pressure on stud 1387 relieved. Therefore, before restarting the machines, the operator removes the cards from the receptacle to allow the floor plate 1381 to move upward and the pin 1388 to fall into its notch. The parts are then restored to normal position and the machines may be started, as described hereinbefore.

If the cycle on which this mechanism operates happens to be a total or a grand total cycle, then on restarting, the punch will operate to set up the designation on the type bars, as described hereinbefore. However, if that cycle is the designation cycle, then on restarting, the punch will operate idly for one cycle.

*Card feed failure*

It sometimes happens that a card fails to feed from the hopper, is jammed in the frontmost rollers, or for some other reason does not pass into the punch chamber in order to be perforated in accordance with the data received from the tabulator. In such event, the data to be punched in the card would be lost even if the machine were stopped, due to the fact that whereas another card cannot be fed into the chamber until about 340° of the following cycle, said data is cleared from the gag bars at the end of the cycle in which the card failed to feed, and from the set pins 300 by 210° of said following cycle.

Therefore, in order to prevent data from being lost in this manner the following means are provided not only to stop both machines at the end of the card feeding cycle in the event of card feed failure, but also to disable the set pin retract mechanism and allow a card to be fed into the chamber to be punched in accordance with said data.

To this end the second shaft 1398 of the pair that extends across the space above the plates 1369 (Figs. 14 and 27), through which the cards pass before entering the punch chamber, has at about its center an arm 1400 which carries a sensing roller 1401 situated normally just above aligned slots in the plates 1369. Near its right hand end (see also Fig. 28) said shaft carries a bell-crank 1402 biased clockwise by a spring 1409 and whose vertical arm stands behind a pin 1403 in the upper end of a lever 1404 of the first order pivoted to the framing at 1405. The horizontal arm of said bell-crank supports an upstanding link 1406, a pin 1407 in the upper end of which engages in a slot in a link 1408. This link has a slot near its other end which is engaged by a pin in an arm 1410 fast on the shaft 1360 and said link is tensioned frontward by a spring 1411 anchored to a pin on the link and the pin in said arm 1410. At about its mid point the link 1408 is provided with an ear 1412 for cooperation with the upper end of lever 1404.

The construction thus far described is such that if the lever 1404 be rocked clockwise the vertical arm of bell-crank 1402 will follow the stud 1403 in said lever under tension of the spring 1409, allowing the roller 1401 to move downward into the slots in the plates 1369. At the same time the rocking of bell-crank 1399 will draw link 1406 and, therefore, the link 1408 downward, bringing the ear 1412 of the latter link into the path of movement of the upper end of the lever 1404, further movement of the lever 1404 bringing the top end thereof into engagement with said ear and rocking the shaft 1369 to stop the machines, as hereinbefore described.

The function of the roller 1401 is to descend into the space between the plates 1369 at that time during each card feed cycle at which a card should be passing between said plates and beneath said roller on its way to the punch chamber. If the roller fails to sense a card and moves downward into the slot in the lower plate 1369, the operation is as just above described. However, if a card is passing beneath the roller, its downward motion is checked and the ear 1412 does not move down into the path of lever 1404 and the machines are not stopped.

The means whereby the roller 1401 is allowed to operate only on those cycles in which a card is to be fed and on these cycles only at the time at which a card should be passing therebeneath will now be described.

Below its pivot the lever 1404 (Fig. 27) carries a follower roller 1413 pressed by a spring 1414 against a cam 1415 on the front drive shaft 256 of the machine. The cam 1415 is concentric for the greater portion of its periphery but has a cut-out in which the roller 1413 can ride for that portion of the cycle during which a card is passing beneath the roller 1401, which, in the present instance, is from about 152° to 227°. To prevent the roller 1413 from following the periphery of cam 1415 on those cycles during which a card is not fed, the lever 1404 is continued past the roller 1413 and carries a stud 1416 engaged by an arm 1417 on the card picker shaft 274.

Thus, on a card feeding cycle the picker shaft 274 rocks at about 70° to feed a card into the punch chamber, at the same time freeing the roller 1413 to follow the periphery of cam 1415. When at about 152° the roller 1413 enters the notch of said cam, the lever 1404 will move clockwise about its pivot and the bell-crank 1402 will follow it under tension of the spring 1409, allowing the roller 1401 to move downward. The operation from this point onward would then be as described above.

When a machine is stopped by the just described mechanism it would not be sufficient merely to clear up whatever trouble caused said stoppage and then restart the machines but it is necessary to

*First.*—Free the card feed mechanism from the restraint of latch 677 (Fig. 35) and also the zero balance latch 1277 (Fig. 15) to permit of the feeding of a card during the first cycle of the punch after restarting.

*Second.*—Disable the set pin retract mechanism which otherwise would clear the data to be punched in the card at about 210° of said first punch cycle, said data having already been cleared from the gag bars. This is required, due to the fact that the card into which said data is to be punched does not fully enter the punch chamber until about 340° of said first punch cycle and the set pin unit does not move down to push the punches through said card until about 85° of the following cycle.

*Third.*—Start the punch alone for one cycle in order to feed the card into the chamber and permit the operator at its completion to enable the retract mechanism and the card feed latches.

*Fourth.*—Reset the escapement mechanism 534, 535 (Fig. 25) to free the designation type bar slides again on the second punch cycle after it has been stopped, and

*Fifth.*—Start both the punch and the tabulator as in the other operations hereinbefore described.

The means to these ends will now be described.

A lever 1418 of the first order, pivoted to the framing at 1420 and biased clockwise in Figs. 27 and 28 by a spring 1421, has at its upper end a flattened surface 1422 engaged by the pin 1407 in the link 1406, and at its lower end a similar surface 1423 contacting a pin 1424 in an arm 1425 fast on a transverse rock shaft 1426. The pin 1424 serves also as a pivot for a link 1427 which extends rearward where it is supported by the downwardly extending arm of the hook 788 hereinbefore described.

The construction is such that when the link 1408 is moved forward as hereinbefore described, the pin 1407 rocks the lever 1418, pushing rearward on the link 1427. This rocks the hook 788 clockwise disengaging it from the lever 780 and disabling the retract mechanism, as hereinbefore described.

The link 1427 is duplicated on the left hand side of the machine where it is designated as 1428 (Fig. 14) and has its forward end pivoted to the upright arm of a bell-crank 1430 fast on the shaft 1426 and biased counter-clockwise in Fig. 14 by a spring 1431. The horizontal arm of said bell-crank has at its forward end a shoulder 1432 to engage an ear 1433 on the depending arm of a bell-crank 1434 pivoted to the framing at 1435 and biased counter-clockwise by a spring 1436.

The construction is such that when the shaft 1426 is rocked, the hooks 788 at both sides of the machine are rocked out of engagement with the levers 789 and are latched in that position by the ear 1433.

The horizontal arm of bell-crank 1434 carries a pin 1437 playing in a slot in the lower end of a link 1438, supported at its upper end on a hand settable lever 1440 pivoted to the framing at 1441 and urged clockwise by a spring 1442 against a limit stud 1443. Forward of its pivot this lever extends through a slot in a sheet metal plate 1444 fastened to the framing a little below and to the left of the card hopper 270 (Fig. 6). The slot in the plate 1444 is made of double width for the middle third of its length so that the lever 1440 may be moved downward and sideways from its normal position in the top of the slot into said widened portion where said lever is held against the tension of spring 1442. The slot is continued downward beyond said widened portion to provide a third position to which said lever may be moved, as presently will be described.

When the punch is stopped because of a card feed failure, the operator moves the lever 1440 into its middle position which, as presently to be explained, frees the card feed from its latches. The operator then turns the machine over by hand or pushes the finger button 575 (Figs. 7 and 35), causing the punch to run for one cycle during which a card is fed into the punch chamber. At the completion of this cycle the operator moves the lever 1440 into its lowermost position which (Fig. 14) raises the link 1438, and as the lost motion between the bottom of the slot in said link and the pin 1437 had been taken up when the lever 1440 was moved to its middle position, the bell-crank 1434 is rocked, freeing shoulder 1432 and enabling the retract mechanism. At the same time, moving the lever 1440 to its lowermost position conditions the escapement mechanism (Fig. 25) to release the designation type bar slides on the next cycle, as presently will be described.

As soon as the manual pressure holding the lever 1440 in its lowermost position is relieved, said lever snaps up to its uppermost position and the machine is normalized, ready to be started with the tabulator.

The means whereby the card feed latches are tripped by the lever 1440 will now be described.

The latch lever 1277 which, by its shoulder 1278 (Fig. 15), prevents pin 1273 in the arm 1272 (Fig. 14) on the picker knife shaft 274 from playing in the slot in the zero balance link 1274, has at its rear end a nose 1446 tensioned downward by the spring 1280 against a stud 1447 in the rearmost end of the lever 1440.

The construction is such that when the lever 1440 is moved to its middle position the shoulder 1278 is moved out of the path of the pin 1273, allowing the picker shaft 274 to rock and feed a card during the next cycle of the machine.

Pivoted on the same stud 1441 as the lever 1440 is a bell-crank 1448 (Fig. 14) tensioned counter-clockwise by a spring 1450 but prevented from moving in that direction by a hook 1451 (Fig. 15) on the upper edge of lever 1440 which engages a stud 1452 in the upper arm of said bell-crank. The stud 1452 underlies the arm 680 (see also Fig. 35) which by shaft 678 is rigidly connected with the card feed latch 677, as hereinbefore described.

The construction is such that when the lever 1440 (Fig. 14) is moved to its middle position the hook 1451 moves upward, allowing the spring 1450 to rock the bell-crank 1448 which through pin 1452 (Fig. 15) rocks the arm 680 to trip the latch 677 and allows a card to be fed.

It is evident that when the lever 1440 is allowed to snap back to its uppermost position these unlatching mechanisms are normalized and no card will be fed into the punch chamber during the next cycle of the punch, which is the first card designation cycle.

Below the lever 1440, a short distance forward of its pivot, stands the plunger 1453 of a Bowden 1454, having its casing anchored in familiar fashion to a bracket 1455 fastened to the framing of the machine. This Bowden extends up to the head of the punch and, where it is anchored in a bracket 1456 (Fig. 25), fastened to the side plate 385 with its plunger standing beneath the lever 515 associated with the arm 530.

The construction is such that when the lever 1440 (Fig. 14) is moved down to its lowermost position following the card feeding cycle of the punch it actuates the Bowden 1454, which rocks the lever 515 (Fig. 25) and depresses the arm 530 which is latched down by arm 535 of the escapement 534, 535. Thus, the punch is conditioned to pick up the designation during the next cycle, as hereinbefore described.

The operator then depresses the palm key 1308 and starts both machines, as hereinbefore described.

It is to be remarked that whereas in the present construction the just described automatic stop mechanisms of the punch operate through the shaft 1360 to stop the tabulator and thereby to stop the punch, in other constructions the shaft 1360 would operate the stopping mechanisms of both machines, or in the case of a single machine, the stop mechanism of that machine.

*Accumulator control of punching*

In some classes of work it is desirable to modify the action of the punch in accordance with the state of the accumulator or of one of the accumulators at the time when a total is to be taken. In the present instance what is desired from the punch depends on whether the accumulator registers a positive or a negative total. The mechanism directly controlled by the accumulator is illustrated in Figs. 53 and 54. At 1460 is shown the stationary side plate of the total accumulator 143 to which plate is pivoted the usual lever 1461 which, in the tabulator in question, is automatically set at one or the other of two positions, said lever being illustrated in its negative position signifying that the total is negative. If a number be added which changes the sign of the total, this lever will be automatically rocked clockwise to its positive position where an arm of it will be caught in the lower notch of a detent lever 1462, as shown in Fig. 3, which also shows a link 1463 connected to a lever 1464 and a link 1465 connecting the lever 1464 with another lever 1466 to move its upper end out of the path of a stud 1467 in an arm 1469 of the credit balance rock shaft 1470 of the machine. When the lever 1461 stands in its negative position the lever 1466 will be under the stud 1467 and will cause the accumulator to be set for subtraction at the beginning of a total operation. All of this mechanism is fully described in the Mueller Patent 2,381,361.

In Fig. 53 the link 1465 and its connected parts are not shown, but there is shown an additional link 1471 pivoted to the lever 1464 and extending frontward in an offset direction beneath the credit balance shaft 1470.

In the patented machine there is below said shaft 1470 a fixed rod 1472 which serves as a support for certain stationary parts of the machine. For present purposes, there is clamped on the rod 1472 a block 1473 and a clamping block 1474 connected by two screws in a fashion familiar in these machines so as to secure the block 1473 rigidly in place. To the latter there is screwed or riveted a fixed frame plate 1475 from which a stud 1476 projects into a slot in the front end of the link 1471 to support the latter and guide it in its front and back sliding motion. On said link there is mounted a bracket 1477 having ears through which a plunger 1478 may be reciprocated down and up, said plunger being normally held up by a spring. Both in its positive and in its negative positions the plunger stands beneath an ear bent off from a vertical slide 1480 mounted on the frame plate 1475 for down and up reciprocation by two guide studs projecting from said frame plate through slots in said slide which is normally held in its upper position by a spring 1481. At its upper end the slide 1480 lies just below a stud 1482 projecting from a block 1483 clamped to the credit balance shaft 1470, as shown in the drawing.

The construction is such that when in the first part of a blank cycle the credit balance shaft is rocked counter-clockwise (Fig. 53) the stud 1482 will push down the slide 1480 which will push down the plunger 1478 whether said plunger stands at the time in its positive or negative position. Preferably, the stud 1482 (Fig. 54) is the plunger of an ordinary disabling button 1479 which, if it be pulled to the left in Fig. 54, will withdraw the stud 1482 and thus render the slide 1480 and plunger 1478 inactive.

It may be remarked that the fixed rod 1472 and the credit balance shaft 1470 already have mounted on them in front of the right hand side of the accumulator the parts shown in Fig. 3 and including the arm 1469. Therefore, the present devices are mounted on said rod and shaft but a sufficient distance to the left of those already on the machine and the link 1471 has an offset bend 1484, as shown in Fig. 54.

At its lower part the frame plate 1475 is formed off to the left to form a branch 1485 to which at 1486 are pivoted two levers 1487 and 1488. Each of these has at its forward end a small roller 1490 in position to be depressed by the plunger 1478 and thus to rock the lever. These levers and their rollers are so located (Fig. 53) that when the link 1471 is in its front or negative position said plunger stands over the roller of lever 1487, and when it is in its rear or positive position it stands over the roller of the lever 1488 so that one or the other of these levers will be rocked by said plunger depending upon the condition of the accumulator. On the flange formed off from the branch 1485 of the frame plate 1475 are anchored the casings of two Bowdens 1491C and 1491D, which Bowdens are operated, respectively, by the levers 1487 and 1488, the letters C and D indicating credit for negative and debit for positive. The whole construction is such that when this mechanism is set active then one or the other of these Bowdens will be operated in the first part of the blank cycle and will remain operated until the credit balance shaft returns to its normal position in the latter part of the total cycle. These two wires may be used to control or to select between two functions of the machine in any manner desired. Two users of them will be described herein.

Elimination of the punching of positive or negative totals

To secure this function, the Bowdens 1491C and 1491D are led to and through the left hand side of the machine and at their other ends their casings are secured to the bracket 1062 (Fig. 30), the plungers of the Bowdens being in position to operate and release the hooks 1045 (Fig. 29) and 1047 (Fig. 30) the same as the Bowden 1051 hereinbefore described. In setting up the machine for this mode of operation the disabling button 1479 (Fig. 54) is set active and the 5 and 6 control keys 961 in the control unit are set in their up position so as to disable the latches 1070 and 1075 which, when active, hold said hooks disengaged. The construction is such that when in any total taking operation one of the Bowdens 1491C or 1491D is operated, it releases the hooks 1045 and 1047 so that no card will be fed during the total taking operation. If the character of the work in a particular machine is such that it is desired to eliminate the punching of positive totals then the casing of the wire 1491C (Fig. 53) will be disconnected from the bracket 1485 so that this negative wire is out of use entirely. In the operation of punch totals only (not punching grand totals), if at any total taking operation the total is positive the Bowden 1491D will be operated and disable the punch card feed and no summary card will be punched; but if the total be negative, the plunger 1478 will extend over the lever 1487 whose Bowden has been disconnected and this eliminating mechanism will not work and the total will be punched. If, on the other hand, the work requires the elimination of negative summary cards, the Bowden 1491C will be connected up and the Bowden 1491D will be disconnected from the bracket.

The character of the work for which the particular machine is used may require the selective elimination of positive or of negative grand total summary punching instead of group total. In that event instead of the link 1471 (Fig. 53) connected to the group total accumulator, a similar link 1471G is similarly connected up with the grand total accumulator 144 and its front end is mounted on the stud 1476 and has the plunger 1478 mounted on it. With this exception, the connection to the grand total accumulator is substantially as for the group total accumulator as represented in dot-dash lines in Fig. 53. When taking grand totals the credit balance shaft 1470 is rocked at the beginning of the blank cycle and is held rocked until near the end of the grand total cycle so that the Bowden 1491D or 1491C, as the case may be, will be held in operated position during that whole time. As the machine is not set for punching group totals, this will do no harm.

Punching the greater (or the lesser) of two totals

There are classes of work where the same amount is computed in two different ways, and the total for which it is desired to punch a summary card is the greater of the two, or, in some instances, it is desired to punch a summary card for the lesser of the two. In the tabulator, the set-up for this may be understood from the diagram (Fig. 56). The amounts computed according to method #1 are added into the accumulator 143 numbered "1," and those computed in the other manner into the accumulator #2. A third accumulator, here called the control accumulator, is added. Every amount punched in one field of a card is added in accumulator #1 and by Y-wiring also in the control accumulator. Amounts punched in another field of a card are Y-wired to accumulator #2 and also to the control accumulator. These latter amounts are accompanied by control holes 1495 which, in a manner well known in the tabulating machine, sets the control accumulator for subtraction. This accumulator, therefore, accumulates the difference between the amounts in accumulator #1 and the amounts in accumulator #2, and the result will be positive if the amount entered in accumulator #1 is greater, and negative if the amount entered in accumulator #2 is greater. The control accumulator has mounted in front of it the control mechanism shown in Figs. 53 and 54, and above described. In this set-up, the two Bowdens 1491, which are selectively operated under control of the accumulator, are led not to the bracket 1062 where they would control the card feeding hooks, but to the lever 1205 (Figs. 43 and 44), one Bowden acting on the lever 1193 for the interponent 1175 and the other on the lever 1193 for the interponent 1175A. This lever 1205 also has anchored in it a pair of Bowdens 1191 and 1191A which are used to control the interponents 1175 and 1175A when it is desired to set up designations from some item card other than the first, all of which has been fully described hereinbefore. It has also been described that the lever 1205 is under control of the #8 key, occupying the position shown in Figs. 43 and 44 when said key is up, thus rendering the wires 1491 operative on the levers 1193 and the wires 1191 and 1191A inoperative. These two functions, therefore, are alternative, the interponents 1175 and 1175A being under control of the accumulator mechanism when the #8 key is up, and under control of the control hole designation mechanism when said key is down.

It will be remembered that the interponents 1175 and 1175A actuate the linkages shown in Figs. 32 and 33, which, in the punch (Fig. 35), results in the operation of the levers 1202 and 1202A which start the punch and, through the Bowdens 525S, cause the releasing bars 476 and 477, respectively, to be operated.

Which of the interponents 1175 or 1175A is actuated will, of course, depend on whether the control accumulator is positive or negative at the time. If the accumulator contains a positive amount the interponent 1175A will be actuated, and if a negative amount, the interponent 1175 will be actuated. Thus, in the punch, the releasing bar 477 will be depressed to release the associated slides to pick up the total from accumulator #1 when the control accumulator is positive, and releasing bar 476 will be depressed to release its associated slides to pick up the total from accumulator #2 when the control accumulator is negative.

In setting up the machine for this class of work, the 3 and 4 keys 961 (Figs. 43 and 44) are depressed to render the interponents 1175 and 1175A active and the 2 key is depressed to render the total interponent 940 active. In the punch, those type bar slides 362 (Fig. 17) whose function it is to pick up the total from accumulator #1 have their settable pieces 474 set beneath the releasing bar 477 and the type bar slides whose function is to pick up the total from accumulator #2 have their settable pieces 484 set beneath the bar 476. Both sets of slides have their pieces 412 (Fig. 16) set to be operated by the total clearing bar 415.

The operation is as follows:

At the beginning of the blank cycle of a total operation the credit balance shaft 1470 is rocked and actuates one or the other of the Bowdens 1491 depending on the state of the accumulator as positive or negative. Assuming for the moment that the accumulator is positive, the lever 1193A (Fig. 44) is rocked, raising slide 1180A into the path of actuator 920 which rocks slide 1160A and interponent 1175A to start the punch at about 22° of said blank cycle through the linkage shown in Figs. 22 and 35 and including the lever 1202A. Rocking lever 1202A (Fig. 35) actuates the upper Bowden 525S and causes the releasing bar 477 to be depressed to release the associated slides 362. However, as this is a blank cycle of the tabulator and the type bars do not rise, said slides merely operate idly.

The Bowden 1491 remains actuated until near the end of the total cycle of the tabulator and, therefore, when the actuator 920 advances again at the beginning of the total cycle the interponent 1175A is again operated along with the total interponent 940 which, it will be remembered, was also set active by its key. Thus, the punch does not stop at the end of its idle cycle but continues into a second cycle during which the upper Bowden 525S (Figs. 33 and 35) is again actuated to cause the releasing bar 477 to be depressed along with the total bar 475 which is controlled by the Bowden 525T under the influence of the total interponent 940.

During this cycle the type bar slides 362 released by the bar 477 pick up the total from accumulator #1. The operation of the releasing bar 475 is an idle one as no type bar slides are affected by it in this function of the machine. Near the end of the total cycle, the pressure on Bowden 1491 (Figs. 44 and 53) is relieved and the slide 1185 moves back to inactive position. However, the punch continues to run for another cycle due to the action of the total latch 1021 (Fig. 30) the same as described hereinbefore, with reference to an ordinary total operation, and the summary card is punched in the first half of that cycle.

The gag bars 364 (Fig. 16) which are used in the above operation are cleared by the total clearing bar 415 at the end of the total cycle of the punch in the same manner as described hereinbefore with reference to an ordinary total punching operation.

If the control accumulator is negative, the operation is the same as above described except that the bar 1175 is made active by its Bowden 1491 and the releasing bar 476 is depressed to release the type bar slides appropriate to accumulator #2.

If it be desired to punch only the lesser of two amounts the set-up of the settable pieces 484 (Fig. 17) is reversed, that is to say, those for accumulator #1 are set to be actuated by releasing bar 476 and those for accumulator #2 by the releasing bar 477.

The class of work may be such that it is desired to punch a summary card not for the greater (or lesser) of two totals, but for the greater (or lesser) of two grand totals.

To this end, three grand total accumulators 144 would be arranged like the accumulators 143 in Fig. 56 and the machine would be equipped with a link 1471G instead of the link 1471 to operate the mechanism of Figs. 53 and 54 to actuate the Bowdens 1491 the same as when punching totals.

The set-up of the machines is the same as for punching the greater or lesser of two totals with some additions that will be noted.

The grand total interponent 950 is set active by the 2 key 961 and functions to control the operation of the punch as described hereinbefore.

The 9 key is depressed to prevent its associated mechanism (Fig. 39) from disabling the punch card feed signal on grand total cycles, as described hereinbefore.

The latch 1075 for the total hook 1047 (Fig. 30) is set active by the 5 key 961 and the first card of each total group except those which are also the first card of a grand total group is provided with a control hole to cause actuation of the Bowden 1051 which disables said total hook. Thus, even though the punch operates during each total operation of the tabulator, no card is fed into the punch chamber and total summary cards are not punched.

The operation is as follows:

The Bowden 1051 holds the hook 1047 disabled for the duration of each total operation due to the fact that the first card of a new total group is held in the sensing chamber during that time. At the beginning of a blank cycle of such an operation the credit balance shaft 1470 rocks and through one of the Bowdens 1491 (Figs. 43, 44 and 53), depending on whether the grand total control accumulator stands negative or positive at the time, causes the slide 1180 or 1180A to be raised. When the actuator 920 rocks said slide a little later the punch is started for an idle cycle, as hereinbefore described. At the beginning of the total cycle this slide is again rocked by the actuator 920 which at the same time also rocks the total interponent 940 and the punch is set for a total operation. The type bar slides 362 (Fig. 17) controlled by the slide 1180 or 1180A are released as above described to set up the total, but no card is fed into the punch chamber to be punched, and the gag bars 364 set by said type bar slides are cleared at the end of the total cycle of the punch. It is the need to clear these gag bars that necessitates the actuation of the total interponent 940.

When, during the first cycle after total the pressure on Bowden 1051 is relieved, the hook 1047 (Fig. 30) does not return to active position but is held disabled by the latch 1075.

Thus, when the first card of a new grand total group, which it will be remembered contains no control hole for Bowden 1051, is passed into the sensing chamber to cause a grand total operation, the hook 1047 is held disabled by latch 1075 notwithstanding the Bowden 1051 is not actuated. During the blank and total cycles of this operation the machines would function exactly as described above except that when, during the total cycle, the total bell-crank 984 (Fig. 30) is rocked, it frees the hook 1047 through stud 1077 but too late to cause a card feed on that cycle. However, the grand total hook 1045 (Fig. 29) which was held disabled by the total hook 1047 would also become active at that time and a card would be fed into the punch chamber during the punch grand total cycle. The remainder of the operation of the machines during that grand total cycle is the same as described above in connection with the total cycle, that is to say, one or the other of the releasing bars 476 or 477 is actuated to allow the type bar slides 362 so set to be released thereby to pick up one or the other of the grand totals, which grand total is punched in a summary card.

The gag bars 364 (Fig. 16) utilized in this operation would not, with the mechanism thus far described, be cleared at the end of the grand total cycle, but would be cleared when the total clearing bar 415 next operated, which would be at the end of the total cycle of the next total operation. This would be satisfactory, but for certain other reasons, means to be described hereinafter are provided to operate the total clearing bar 415 at the end of every grand total cycle. Thus, the gag bars are cleared at the end of the grand total cycle even though their settable pieces 412 are connected to the total clearing bar 415.

*Zero punching*

In the 90 column card, the numerical code includes a position for a zero hole, and such holes are sometimes needed, but in the majority of instances, zero is indicated merely by a blank column. Accordingly, the summary punch is equipped with means presettable in association with any desired one or any desired succession of gag bars to cause that particular bar or succession of bars, when not set for a number, either to punch zeros or not, as desired.

In Figs. 16 and 17, the gag bar 364A is resting against its stop 372, etc., and its finger 376A stands a certain distance to the right or rearward of the zero plunger 320 so that nothing at all will be punched in the column occupied by this bar. In order to punch a zero, this bar must be drawn leftward to the position shown at 376B.

In Fig. 16 the gag bar 364B (the one of a pair nearest the observer) has near its front end its upper part cut away as shown at 1500 and into the space thus provided a stud 1501 projects from the slide 364A. Similarly, said slide 364A has its lower part cut away as shown in dotted lines at 1502 and a stud 1503 projects from the slide 364B into the space thus provided. Two cross bars 1504 and 1505 are secured at their ends to brackets 1506 which in turn are supported by the side frame castings 253 and 254. Levers 1507A are pivoted to the upper bar 1504 on a rod 1508 supported by a comb plate secured to said bar 1504, and said levers are guided by a second comb plate secured also to said bar. There is one of these levers for each of the "A" gag bars and each such lever, at its lower end, stands just behind a stud 1501 so that, if said lever be rocked clockwise, it will draw the gag bar forward to its zero position. A series of levers 1507B are mounted on the lower frame bar 1505 and are in all aspects identical with those just described except that they are inverted and the upper end of each one stands just behind one of the studs 1503 on a "B" gag bar.

The levers 1507 are rocked to their operated positions where they have drawn their gag bars to zero position, and to their unoperated positions where they have not so set the gag bars by means of upper links 1510A and lower links 1510B. The means for operating these links will now be described.

Two cross bars 1511A and 1511B are, at appropriate times, reciprocated the proper distance rearward and frontward of the machine. These bars may be mounted and operated in a variety of ways. As here shown, they are both fast at their ends to two T-shaped plates 1512, the cross of the T being vertical. Near its front end each of said plates has a horizontal cut-out in which is an anti-friction guide roller 1513 mounted on a bracket 1514 secured to the inner face of the side frame casting 253 or 254. As shown, each of said brackets 1514 has mounted on it a fibre block 1515 which serves to arrest the frontward movement of the plate 1512.

Each of the operating bars 1511A and 1511B has a longitudinal groove and has mounted on its forward face a comb plate 1516 (Fig. 16) having slots in which the links 1510 are guided. The links 1510A and 1510B are all alike. Each is shaped at its front end for manipulation by the fingers and each has a lug 1517 on its under edge. The link may be lifted by hand and set in its inactive position shown at 1510A (Fig. 16) where the lug 1517 is in front of the comb plate 1516, or it may be pushed back to its active position, shown at 1510B where the lug 1517 is shown seated in the groove in bar 1511B, and held in place by a spring 1518. The construction is such that when the bar 1511 moved rearward, it rocked the lever 1507B counter-clockwise and pulled the gag bar 364B to zero position as shown in Fig. 16, where it will be observed that the finger 376B stands over the zero plunger 320. However, the upper lever 1507A whose link 1510 was set inactive has been rocked just enough to bring it about up to the stud 1501 without setting the gag bar 364A, which remains in its normal inactive position. Fig. 16 shows this mechanism in operated position, which according to the present invention is not its normal position.

When in any column a number has been set up other than zero, the pawl 374 on the sensing bar 363 pulls the gag bar frontward and moves said stud 1501 clear out of range of lever 1507 so that the rocking of said lever is without any effect. The rear end of each of the plates 1512 is pivoted to an arm 1518 fast on the inner end of a stub shaft 1520 (Fig. 46) which passes through and is journalled in the frame casting 253 or 254.

As thus far described, this zero mechanism is identical with that described in the Mueller application hereinbefore referred to. In that application each of the stub shafts 1520 had fixed to its outer end an approximately upright arm which was struck by a stud on the restoring bar operating link 460 at about the time when the restoring bar was just making contact with those sensing bars 363 which had advanced to their zero position, which, of course, was near the end of the restoring bars' motion. From there on, as the sensing bars with their pawls 374 (Fig. 16) were moving to normal position, the shafts 1520 were pulling the frame 1512 including the bars 1511 (Fig. 46) rearward and, therefore, moving forward to zero position just behind said pawls any gag bars that remained in their normal positions. If a gag bar had been advanced ahead of the return motion of its sensing bar, the pawl 374 would have caught the first ratchet tooth on the gag bar and set the latter to punch a "1." This simple construction had certain disadvantages which have been cured by the present improvements.

Each of the stub shafts 1520 has fast on its outer end an arm 1521 (Figs. 7 and 46) carrying a roller 1522 which is engaged by another roller 1523 mounted on an arm 1524 pivoted at 1525 to the restoring bar operating link 460 and drawn downward by a light spring 1526. In Fig. 46, this arm or lever 1524 is shown with its roller in engagement with the roller 1522 which, however, has merely rocked the arm 1524 upward about its pivot without operating the zero mechanism. When the link 460 moves rearward (rightward in Fig. 46) the roller 1523 moves free of the roller 1522 and the arm 1524 drops down against a limit pin and it remains in that position until its return stroke when it is again cammed upward by the roller 1522. A latch lever 1527 is provided which, when rocked by a spring 1528, will latch the arm 1524 in its lower horizontal position so that when the link 460 returns the roller 1523 will rock the arm 1521 and the stub shaft 1520 and operate the zero mechanism. The latch 1527 is itself normally locked in inactive position by another latch 1530 in the form of a bell-crank pivoted to the link 460 and influenced by the spring 1528, and this latch normally holds the latch 1527 out of action and prevents the operation of the zero mechanism. The latch 1530 is tripped at suitable times, and when it is, the zero mechanism is operated as will be understood. After causing an operation of the zero mechanism, the latch 1527 is restored to normal position by a stud 1531 striking an upright arm thereof. Said stud is on a link 1532 pivoted to an arm 1533 fast on the shaft 712 hereinbefore described and which, by other arms mounted thereon, causes the clearing of the gag bars at the end of a total cycle. For the present purposes it is sufficient to say that the shaft 712 is rocked clockwise at the end of every such cycle and will release the latch 1527 if the latter has been in active position.

Thus, at the end of every total cycle the latch 1527 is in inactive position and is held in that position by the latch 1530 to render the lever 1524 incapable of operating the zero mechanism. The parts remain in this position until on another cycle the latch 1530 is released, as will presently be described. As has been described hereinbefore, the punch executes cycles other than total cycles, that is to say, it makes a second cycle after the total cycle, it may also execute a blank cycle due to the action of the paper feed mechanism, and it may also execute a cycle due to a control hole in an item card in order to pick up a designation. In all of these cycles, the zero mechanism does not operate because the lever 1524 is not locked down. This is one advantage of the present construction. As described in the Mueller application this zero mechanism was reciprocated at every cycle of the punch. According to the present invention it is reciprocated only when it is needed, which is on those cycles when a card is fed in the punch. It is on that cycle that the amounts to be punched in the next succeeding cycle are set up on the gag bars and in the set pins and it is, therefore, during that cycle that any required zeroes are set up on the gag bars and, thereby, in the set pins. Accordingly, the operation of the zero mechanim is made dependent on the card feed. It will be recalled that in the control unit in the tabulator (Figs. 29 and 30) the card feed lever 1043 and its link 1042 are operated by the total lever 984 to enable the punch card feed, and in the punch (Fig. 35) this link 1042 operates a bell-crank 679 (the middle one of three shown in Fig. 35), an arm of which actuates the link 656 to release the card feed. This bell-crank 679 is made to operate a Bowden 1534 (Fig. 46) which when operated rocks upward an arm 1535 mounted on a cross shaft 1536 which at each end has fast thereon an arm 1537, a stud 1538 in which is in position to depress the horizontal arm of the bell-crank latch 1530 and release the latch 1527. There is a little lost motion between the latch 1527 and the end of the lever 1524 so that when the latch 1530 is tripped the latch 1527 makes a slight movement before it is arrested by the end of the lever, and this movement is sufficient to prevent the latch 1530 from reengaging it. It results that the latch 1530 is tripped at the beginning of a total cycle and when the lever 1524 moves free of the roller 1522 and drops down to its horizontal position it will be latched there, and on its return stroke will operate the zero mechanism so that those gag bars under control of said mechanism will be moved to zero position to cause the punching of zeroes on the following cycle. The Bowden 1534 is held operated until about 173° of punch cycle by which time the link 469 has about completed its forward stroke. The frontward part of the bell-crank 1530 is, therefore, made with an incline 1540 (Fig. 46) so that the stud 1538 which is in its down position at the time will cam the lever 1530 to its fully released position. When the Bowden 1534 returns to its unoperated position around 220° of punch cycle the latch 1530 is pressed by its spring against the end of the arm of the latch 1527, which latch is moved to releasing position by the stud 1531 at the very end of the cycle and is caught and retained in that position by the latch 1530. The mechanism remains in this normal disabled condition through any succeeding cycles of the punch and until the Bowden 1534 is again actuated.

The most important benefit of the connections just above described, that is to say, the lever 1524 and the latches 1527 and 1530, is realized when the punch and tabulator are stopped at the end of a total cycle by a card jam, as hereinbefore described.

It will be remembered that in such event the punch is caused to operate free of the tabulator for one cycle in order to feed a card into the punch chamber, and that the retract mechanism is held disabled during that cycle in order to preserve in the set pins the information to be punched in that card and which had, just prior to the stopping of the punch, been cleared from the gag bars.

If the automatic zero mechanism was active on this cycle, zeroes would be set up on those gag bars which were cleared at the end of the total cycle, and when in the latter part of the cycle the set pin unit moved up to sense the gag bars the information already set up in the set pins would be erased by the zeroes which would be punched in the card during the following cycle.

Accordingly, the zero mechanism is disabled during this special card feeding cycle.

If the class of work is such that not total but grand total summary cards are being punched, the operation of the zero mechanism is the same as above described except that it takes place on the grand total cycle rather than on the total cycle. That is to say, the Bowden 1534 (Fig. 46) is actuated by the card feed signal from the tabulator preparatory to a grand total cycle of the punch and releases latch 1527 from latch 1530 at that time.

However, in order to cause the total clearing shaft 712 to be rocked at the end of the grand total cycle to trip the latch 1527 (Fig. 46) to restore the mechanism to the normal inactive position shown in Fig. 46, the following means are provided:

Referring to Figs. 36 and 38, the ear 1005 of the grand total link 1003 by which the bell-crank 1001 is rocked to actuate the grand total clearing Bowden 751 stands in front of a shoulder 1590 in the total link 1006, the ear 1007 of which rocks bell-crank 1002 to actuate the total clearing Bowden 750.

When on a grand total cycle the grand total link 1003 is pulled rearward, as hereinbefore described, its ear 1005 engages the shoulder 1590 in the total link 1006 and moves the latter link rearward. This results in that the clearing wires 750 and 751 are actuated to throw in the hooks 720 and 721 (Fig. 52) which cause the clearing shafts 712 and 713, respectively, both to be rocked at the end of the grand total cycle.

Thus, the latch 1527 which is tripped by a rocking of the total clearing shaft 712 is tripped at the end of every grand total cycle and the zero mechanism is restored to the inactive position shown in Fig. 46.

If the class of work is such that it is desired to punch both total and grand total summary cards, then on a grand total operation the zero mechanism operates twice, first during the total cycle and then again during the grand total cycle. That is to say, the Bowden 1534 is actuated to trip latch 1530 preparatory to each of said cycles of the punch by the card feed signal from the tabulator.

In this operation, however, the shaft 712 is not rocked under control of the grand total link 1003 (Figs. 36 and 38) as just above described, but is rocked under control of the total link 1006 which, it will be remembered, is held in operated position for the duration of the total and grand total cycles by the latch 1021 (Fig. 30).

*Anti-rebound device*

Referring to Figs. 16 and 17, when the gag bars 364 are released from the pawls 374 they are snapped back by their springs against the stop bar 372, and it was found that in practice there was an objectionable rebound of said gag bars from their stop bar. In order to prevent this rebound, the following device has been provided:

Each of the gag bars is made on its under edge with a notch 1565 and at the time in question these notches are engaged by detents 1566, each consisting of a sheet metal slide guided for vertical motion in a comb plate 1567 and another comb plate 1568, the former attached to the frame bar 400 and the latter to another frame bar 1570. The frame bars 397, 398 and 400 are mounted on blocks 1571, which blocks have been extended downward and at their lower parts support the bar 1570. The detents 1566 are drawn upward by springs 1572 but are normally held down out of contact with bars 364 by a bail shaped latch plate 1573 extending across the machine and having its ends formed off to constitute bail arms 1574 which are mounted on a shaft 1575 supported by the blocks 1571. This bail arm engages a lug 1576 on each of the detents 1566 and is drawn to latching position by springs 1577. The arms 1574 are connected by long links 1578 with arms 1580 fast on and depending from the rock shaft 712 which by its arm 711 operates the clearing bar 415. It results that by the same motion that operates said clearing bars to release pawls 375, the latching plate 1573 is pulled out of engagement and allows the detents to snap up against the gag bars. When each of the gag bars reaches the stop bar 372, its notch 1565 is just over the detent which snaps into it and prevents rebound. These detents are restored to their inactive positions shown in Fig. 16 by the following means: The shaft 456, the rocking of which moves the restoring bar 370 for the sensing bars 363, has two collars 1581 secured to it by set screws, and these collars are connected by a resetting bar 1582. When the shaft 456 is rocked clockwise in Fig. 16 to move the restoring bar to the rearward, this resetting bar 1582 engages a nose 1583 on each of the detents 1566 and depresses said detents to a position to be caught by the universal latch bar 1573. The shaft 712 is rocked to clear the gag bars at the very last part of the punch cycle and it is held in its rocked position until from 75° to 110° of the following cycle. It is at about this same time that the resetting bar 1582 resets the detents which, when reset, are then caught by the universal retaining bar 1573. When the gag bars 364 are being set by the means hereinbefore described, these detents are out of contact with them.

In the course of the foregoing description it has been pointed out that the invention is not limited to the specific construction illustrated and described in detail, but that many changes may be made in both detail and arrangement. It will be apparent from the foregoing description that many such changes other than those actually referred to may be made without departing from the invention. It will also be apparent that some of the features of the invention may be used without others, and that some of them are applicable or adaptable to machines differing quite considerably from that described.

What I claim as new, and desire to secure by Letters Patent, is:

1. In a combined summary punch and tabulator, the combination of an interponent, an actuator for said interponent, a member moved to operated position by said interponent to start the punch, a latch to hold said member in operated position, a second member moved to operated position by said interponent, and a normally disabled punch card feed mechanism enabled by said second member.

2. In a combined summary punch and tabulator, the combination of an interponent settable active and inactive, an actuator for said interponent, a member moved to operated position by said interponent to start the punch, a latch to hold said member in operated position, a second member moved to operated position by said interponent, and a normally disabled punch card feed mechanism enabled by said second member.

3. In a combined summary punch and tabulator, the combination of an interponent settable active and inactive, an actuator for said interponent, a member moved to operated position by said interponent to start the punch, a latch to hold said member in operated position, a second member moved to operated position by said interponent, a normally disabled punch card feed mechanism enabled by said second member, and a trip for said latch operated by said power driven actuator.

4. In a combined summary punch and tabulator, the combination of an interponent, an actuator for said interponent, a member moved to operated position by said interponent to start the punch, a latch to hold said member in operated position, a second member moved to operated position by said interponent, a normally disabled punch card feed mechanism enabled by said second member, means to disable said second member, a second latch to hold said second member disabled, and a trip for said second latch actuated by said interponent.

5. In a combined summary punch and tabulator, the combination of a plurality of interponents, a power driven actuator for said interponents, a member moved to operated position by each of said interponents to start the punch, a latch to hold each said member in operated position, a second member moved to operated position by one or more of said interponents, and a normally disabled punch card feed mechanism enabled by said second member.

6. In a combined summary punch and tabulator, the combination of a first interponent and a second interponent each settable active and inactive, an actuator for said interponents, a plurality of members each moved to operated position by one of said interponents to start the punch, a latch to hold each of said members in operated position, a member moved to operated position by either of said interponens, and a normally disabled punch card feed mechanism enabled by the last said member.

7. In a combined summary punch and tabulator, the combination of a total linkage in the tabulator, an interponent settable active or inactive to be moved to an effective position by said total linkage, an actuator for said interponent, a member moved to operated position by said interponent to start the punch, a latch to hold said member in operated position, a second member moved to operated position by said interponent, and a normally disabled punch card feed mechanism enabled by said second member.

8. In a combined summary punch and tabulator, the combination of a total linkage in the tabulator, an interponent moved to an effective position by said total linkage, an actuator for said interponent, a member moved to operated position by said interponent to start the punch, a latch to hold said member in operated position, a second member moved to operated position by said interponent, and a normally disabled punch card feed mechanism enabled by said second member.

9. In a combined summary punch and tabulator, the combination of a total linkage and a grand total linkage in the tabulator, total and grand total interponents selectively settable active or inactive to be moved to an effective position by their respective total and grand total linkages, an actuator for said interponents, a member associated with each of said interponents and moved thereby to an operated position to start the punch, a latch to hold each said member in actuated position, a third member moved to operated position by either of said interponents, and a normally disabled punch card feed mechanism enabled by said third member.

10. In a combined summary punch and tabulator, the combination of a total linkage in the tabulator, an interponent moved to an effective position by said total linkage, an actuator for said interponent, a member moved to operated position by said interponent to start the punch, a latch to hold said member in operated position, a second member moved to operated position by said interponent, a normally disabled punch card feed mechanism enabled by said second member, means to disable said second member, a second latch to hold said second member disabled, and a trip for said second latch actuated by said interponent.

11. In a combined summary punch and tabulator, the combination of a total linkage in the tabulator, an interponent moved to an effective position by said total linkage, an actuator for said interponent, a member moved to operated position by said interponent to start the punch, a latch to hold said member in operated position, a second member moved to operated position by said interponent, a normally disabled punch card feed mechanism enabled by said second member, and a trip for said latch operated by said power driven actuator.

12. In a combined summary punch and tabulator, the combination of a total linkage in the tabulator, an interponent moved to an effective position by said total linkage, an actuator for said interponent, a member moved to operated position by said interponent to start the punch, a latch to hold said member in operated position, a second member moved to operated position by said interponent, a normally disabled punch card feed mechanism enabled by said second member, a trip for said latch operated by said power driven actuator, and means associated with said interponent to disable said trip while said interponent is in effective position.

13. In a combined summary punch and tabulator, the combination of a plurality of interponents, an actuator for said interponents, a member associated with each of said interponents and moved thereby to an operated position to start the punch, a latch to hold each said member in operated position, a trip for the latches operated by said actuator, another member moved to operated position by said actuator, a normally disabled punch card feed mechanism enabled by said other member, means to disable said other member, a latch to hold said other member disabled and a trip for the latter said latch operated by said actuator.

14. In a combined summary punch and tabulator, the combination of an interponent, an actuator for said interponent, a linkage moved to operated position by said interponent to start the punch, and including a latchable member, a latch to hold said member in operated position, a second member moved to operated position by the non-latchable portion of said linkage, and a normally disabled punch card feed mechanism enabled by said second member.

15. In a combined summary punch and tabulator, the combination of a total linkage in the tabulator, an interponent moved to an effective position by said total linkage, an actuator for said interponent, a linkage moved to operated position by said interponent to start the punch, and including a latchable member, a latch to hold said member in operated position, a trip for said latch operated by said actuator, and means to disable said trip while said interponent is in effective position.

16. In a combined summary punch and tabulator, the combination of an interponent, an actuator for said interponent, a linkage moved to operated position by said interponent to start the punch, and including a latchable member, a latch to hold said member in operated position, a second member moved to operated position by the non-latchable portion of said linkage, a normally disabled punch card feed mechanism enabled by said second member, means to disable said second member, a second latch to hold said second member disabled, and a trip for said second latch operated by the non-latchable portion of said linkage.

17. In a combined summary punch and tabulator, the combination of a plurality of interponents, an actuator for said interponents, a linkage moved to operated position by each of said interponents to start the punch, each such linkage including a latchable member, a latch to hold each said member in operated position, a trip for the latches operated by said actuator, a third member moved to operated position by the non-latchable portion of either of said linkages, and a normally disabled punch card feed mechanism enabled by said third member.

18. In a combined summary punch and tabulator, the combination of total and grand total linkages in the tabulator, total and grand total interponents moved to an effective position by their respective linkages, an actuator for said interponents, a linkage moved to operated position by each of said interponents to start the punch, each such linkage including a latchable member, a latch to hold each of said members in operated position, a trip for the latches operated by said actuator, means to disable said trip while either of said interponents is in effective position, a third member moved to operated position by the non-latchable portion of either of the last mentioned linkages, and a normally disabled punch card feed mechanism enabled by said third member.

19. In a combined summary punch and tabulator, the combination of an interponent, an actuator for said interponent, a linkage operated by said interponent and including a latchable member, a latch to hold said member in operated position, and a normally open one revolution punch clutch closed by said linkage and held closed by said latch for an indefinite number of revolutions.

20. In a combined summary punch and tabulator, the combination of a total linkage in the tabulator, an interponent moved to an effective position by said linkage, an actuator for said interponent, a linkage operated by said interponent and including a latchable member, a latch to hold said member in operated position, a trip for said latch operated by said actuator, means associated with said interponent to disable said trip while said interponent is in effective position, and a normally open one revolution punch clutch closed by the last mentioned linkage and held closed by said latch until said trip operates.

21. In a combined summary punch and tabulator, the combination of an interponent, an actuator for said interponent, a linkage operated by said interponent and including a latchable member, a latch to hold said member in operated position, a normally open one revolution punch clutch closed by the said linkage and held closed by said latch for an indefinite number of revolutions, a second member operated by the non-latchable portion of said linkage, and a normally disabled punch card feed mechanism momentarily enabled by said second member.

22. In a combined summary punch and tabulator, the combination of an interponent, an actuator for said interponent, a linkage operated by said interponent and including a latchable member, a latch to hold said member in operated position, a normally open one revolution punch clutch closed by said linkage and held closed by said latch for an indefinite number of revolutions, a second member operated by the non-latchable portion of said linkage, a normally disabled punch card feed mechanism momentarily enabled by said second member, and means to disable said second member.

23. In a combined summary punch and tabulator, the combination of a plurality of interponents, an actuator for said interponents, a linkage operated by each of said interponents and each including a latchable member, a latch to hold each said member in operated position, and a normally open one revolution punch clutch closed by any said member and held closed by its associated latch for an indefinite number of revolutions.

24. In a combined summary punch and tabulator, the combination of total and grand total linkages in the tabulator, total and grand total interponents moved to an effective position by said linkages, an actuator for said interponents, a linkage operated by each of said interponents and each including a latchable member, a latch to hold each said member in operated position, a trip for the latches operated by said actuator, means associated with said interponents to disable said trip while either of said interponents is in effective position, and a normally open one revolution punch clutch closed by either member and held closed by its associated latch until said trip operates.

25. In a combined summary punch and tabulator, the combination of a plurality of interponents, an actuator for said interponents, a linkage operated by each of said interponents and each including a latchable member, a latch to hold each said member in operated position, a normally open one revolution clutch closed by either member and held closed by its associated latch for an indefinite number of revolutions, a third member operated by the non-latchable portion of either of said linkages, and a normally disabled punch card feed mechanism momentarily enabled by said third member.

26. In a combined summary punch and tabulator, the combination of a plurality of interponents, an actuator for said interponents, a linkage operated by each of said interponents and each including a latchable member, a latch to hold each said member in operated position, a normally open one revolution clutch closed by any said member and held closed by its associated latch for an indefinite number of revolutions, another member operated by the non-latchable portion of any of said linkages, a normally disabled punch card feed mechanism momentarily enabled by said other member, and means to disable said other member.

27. In a combined summary punch and tabulator, the combination of an interponent, an actuator for said interponent, a first member moved to operated position by said interponent, a second member moved to operated position by said first member to start the punch, a latch to hold said second member in operated position, a third member connectable with said first member and moved thereby to an operated position, a normally disabled punch card feed mechanism enabled by said third member, a trip to disconnect said third member from said first member, a latch to hold said members disconnected, and a trip for the last said latch operated by said first member.

28. In a combined summary punch and tabulator, the combination of an interponent, an actuator for said interponent, a first member moved to operated position by said interponent, a second member moved to operated position by said first member to start the punch, a latch to hold said second member in operated position, a third member moved to an operated position by said first member, a normally disabled punch card feed mechanism enabled by said third member, a hook connecting said first and said third members, a trip to disable said hook, a latch to hold said hook disabled, and a trip for the last said latch operated by said first member.

29. In a combined summary punch and tabulator, the combination of a plurality of interponents, an actuator for said interponents, a pair of members moved to operated position by said interponents, a pair of second members moved to operated position by the first said members to start the punch, a pair of latches to hold said second members in operated position, a third member connectable with each of the first said members and moved thereby to an operated position, a normally disabled punch card feed mechanism enabled by said third member, a trip to disconnect said third member from the first said members, a pair of latches to hold said third member disconnected from the first said members, and a trip for each of the last said latches operated by the associated first member.

30. In a combined summary punch and tabulator, the combination of a plurality of interponents, an actuator for said interponents, a pair of members moved to operated position by said interponents, a pair of second members moved to operated position by the first said members to start the punch, a pair of latches to hold said second members in operated position, a third member moved to an operated position by either of the first said members, a normally disabled punch card feed mechanism enabled by said third member, a pair of hooks connecting the first said members with said third member, a trip to disable said hooks, a pair of latches to hold said hooks disabled, and trips for the last said latches operated by the associated first said member.

31. In a combined summary punch and tabulator, the combination of a plurality of interponents, an actuator for said interponents, a pair of members moved to operated position by said interponents, a pair of second members moved to operated position by the first said members to start the punch, a pair of latches to hold said second members in operated position, a third member moved to an operated position by either of the first said members, a normally disabled punch card feed mechanism enabled by said third member, a pair of hooks connecting the first said members with said third member, a trip to disable said hooks, a pair of latches selectively settable active or inactive to hold said hooks disabled, and a trip for each of the last said latches operated by the associated first said member.

32. In a combined summary punch and tabulator, the combination of total and grand total linkages in the tabulator, total and grand total interponents moved to an effective position by their respective linkages, an actuator for said interponents, a pair of members moved to operated position by said interponents, a pair of second members moved to operated position by the first said members to start the punch, a pair of latches to hold said second members in operated position, a third member moved to operated position by either of the first said members, a normally disabled punch card feed mechanism enabled by said third member, a pair of hooks connecting the first said members with said third member, and a trip settable active or inactive to be operated by said grand total interponent to disable said hooks while said interponent is in effective position.

33. In a combined summary punch and tabulator, the combination of total and grand total linkages in the tabulator, total and grand total interponents moved to an effective position by their respective linkages, an actuator for said interponents, a pair of members moved to operated position by said interponents, a pair of second members moved to operated position by the first said members to start the punch, a pair of latches to hold said second members in operated position, a third member moved to an operated position by either of the first said members, a normally disabled punch card feed mechanism enabled by said third member, a pair of hooks connecting the first said members with said third member, a trip operated by said grand total interponent to disable said hooks while said interponent is in effective position, a pair of latches to hold said hooks disabled, and a trip for each of the last said latches operated by the associated first said member.

34. In a combined summary punch and tabulator, the combination of a plurality of interponents, an actuator for said interponents, a pair of members moved to operated position by said interponents, a pair of second members moved to operated position by the first said members to start the punch, a pair of latches to hold said second members in operated position, a third member moved to operated position by either of the first said members, a normally disabled punch card feed mechanism enabled by said third member, a pair of hooks connecting the first said members with said third member, and a trip operated by one of said interponents to disable said hooks.

35. In a combined summary punch and tabulator, the combination of a plurality of interponents, an actuator for said interponents, a pair of members moved to operated position by said interponents, a pair of second members moved to operated position by the first said members to start the punch, a pair of latches to hold said second members in operated position, a third member moved to an operated position by either of the first said members, a normally disabled punch card feed mechanism enabled by said third member, a pair of hooks connecting the first said members with said third member, a pawl and ratchet mechanism operated by said actuator, and a cam member advanced one step during each of three successive tabulator cycles by said pawl and ratchet mechanism, said cam member disabling said hooks on the first two of said cycles and allowing said hooks to be reenabled on the third cycle.

36. In a combined summary punch and tabulator, the combination of a plurality of interponents, an actuator for said interponents, a pair of members moved to operated position by said interponents, a pair of second members moved to operated position by the first said members to start the punch, a pair of latches to hold said second members in operated position, a third member moved to an operated position by either of the first said members, a normally disabled punch card feed mechanism enabled by said third member, a pair of hooks connecting the first said members with said third member, a pawl and ratchet mechanism operated by said actuator, a cam member advanced one step during each of three successive tabulator cycles by the last said mechanism, said cam member disabling said hooks on the first two of said cycles and allowing said hooks to be reenabled on the third cycle, a mechanism to cause a blank cycle of the tabulator, and a slide actuated by said mechanism to disable said pawl and ratchet mechanism during said blank cycle.

37. In a combined summary punch and tabulator, the combination of an interponent, an actuator for said interponent, a linkage moved to operated position by said interponent to start the punch and including a latchable member, a latch to hold said member in operated position, a trip for said latch operated by said actuator, a mechanism to cause a blank cycle of the tabulator, and a slide actuated by said mechanism to disable said trip for said blank cycle.

38. In a combined summary punch and tabulator, the combination of an interponent, an actuator for said interponent, a linkage moved to operated position by said interponent to start the punch and including a latchable member, a latch to hold said member in operated position, a trip for said latch operated by said actuator, means controlled by said interponent to disable said trip, a mechanism to cause a blank cycle of the tabulator, and a slide actuated by said mechanism to disable said trip during said blank cycle.

39. In a combined summary punch and tabulator, the combination of a plurality of interponents, an actuator for said interponents, a linkage moved to operated position by each of said interponents to start the punch, each such linkage including a latchable member, a latch to hold each said member in operated position, a trip for the latches operated by said actuator, a mechanism to cause a blank cycle of the tabulator, and a slide actuated by said mechanism to disable said trip during said blank cycle.

40. In a combined summary punch and tabulator, the combination of an interponent, an actuator for said interponent, a member moved to operated position by said interponent, a latch to hold said member in operated position, a second member operated by the first said member, normally locked set-up slides in the punch, and a normally disabled releasing bar for said slides enabled by said second member.

41. In a combined summary punch and tabulator, the combination of an interponent, an actuator for said interponent, a member moved to operated position by said interponent, a latch to hold said member in operated position, a second member operated by the first said member, normally locked set-up slides in the punch, a normally disabled releasing bar for said slides enabled by said second member, and normally disabled means to clear said slides enabled by said second member.

42. In a combined summary punch and tabulator, the combination of an interponent, an actuator for said interponent, a member moved to operated position by said interponent, a latch to hold said member in operated position, a second member operated by the first said member, a third member settable active or inactive to be operated by said second member, normally locked set-up slides in the punch, a first normally disabled releasing bar enabled by said second member to free certain of said slides, and a second normally disabled releasing bar enabled by said third member to free others of said slides.

43. In a combined summary punch and tabulator, the combination of a plurality of interponents, an actuator for said interponents, a first member moved to operated position by each of said interponents, a latch to hold each said member in operated position, a second member operated by each said first member, normally locked set-up slides in the punch, and a normally disabled releasing bar for said slides enabled by any second member.

44. In a combined summary punch and tabulator, the combination of a plurality of interponents, an actuator for said interponents, a first member moved to operated position by each of said interponents, a latch to hold each said member in operated position, a second member operated by each said first member, normally locked set-up slides in the punch, a normally disabled releasing bar enabled by either said second member to free said slides, and normally disabled means enabled by either said second member to clear said slides.

45. In a combined summary punch and tabulator, the combination of a plurality of interponents, an actuator for said interponents, a first member moved to operated position by each of said interponents, a latch to hold each said member in operated position, a second member moved to operated position by each said first member, normally locked set-up slides in the punch, a first normally disabled releasing bar for certain of said slides enabled by any said second member, a third member settable active or inactive to be operated by each said second member, and a second normally disabled releasing bar for others of said slides enabled by any said third member.

46. In a combined summary punch and tabulator, the combination of a pair of interponents, an actuator for said interponents, a pair of members moved to operated position by said interponents, a pair of latches to hold said members in operated position, a pair of second members moved to operated position by said first members, one of said second members when operated operating the other, but said other when operated operating alone, and a pair of normally disabled clearing bars enabled by said second members.

47. In a combined summary punch and tabulator, the combination of a pair of interponents, an actuator for said interponents, a pair of first members operated by said interponents, a pair of second members moved to operated position by said first members, a pair of latches to hold said second members in operated position, a third member operated by either of said first members, a normally disabled punch card feed mechanism enabled by said third member, a normally open punch clutch closed by said second members, a plurality of normally disabled releasing bars in the punch enabled by said second members, and a plurality of normally disabled clearing bars in the punch enabled by said second members.

48. Two combined accounting machines having in combination, a normally open clutch in one machine, a normally closed clutch in the second machine, means in the second machine to close the clutch of the first machine, a latch for said means to hold the first mentioned clutch closed for an indefinite number of cycles, means to open the clutch of said second machine, and a trip actuated by the last said means to trip said latch and allow the first said clutch to open.

49. Two combined accounting machines having in combination, a normally open clutch in one machine, a normally closed clutch in the second machine, means controlled by the second machine to close the clutch of the first machine, means to reopen the clutch of the first machine, a latch to hold the clutch closing means effective and thereby the reopening means disabled, means to open the clutch of said second machine, and a trip actuated by the last said means to trip said latch and enable the reopening means for the clutch of the first machine.

50. Two combined accounting machines having in combination, a normally open clutch in one machine, a normally straight toggle holding said clutch open, a normally straight second toggle, means acting through said second toggle to straighten the first said toggle when the latter has been broken, a normally closed clutch in the second machine, means controlled by the second machine to break both of said toggles, a latch for the last said means to hold said second toggle broken, means to open the clutch of the second machine, and a trip actuated by the last said means to trip said latch and allow said second toggle to straighten.

51. Two combined card controlled accounting machines having in combination, a normally open clutch in one machine, a normally closed clutch in the second machine, means controlled by the second machine to close the first said clutch, a latch for said means to hold the first said clutch closed, normally disabled means to open the clutch of the second machine, a trip actuated by the last said means to trip said latch, and means controlled by the first said machine to enable the last said means.

52. Two combined card controlled accounting machines having in combination, a normally open clutch in one machine, a normally closed clutch in the second machine, means controlled by the second machine to close the first said clutch, a latch for said means to hold the first said clutch closed, normally disabled means to open the clutch of the second machine, a trip actuated by the last said means to trip said latch, a member common to both machines and operable to enable the last said means, a card hopper in the punch, and a no-card pin acting when said hopper is empty to operate said member.

53. Two combined card controlled accounting machines having in combination, a normally open clutch in one machine, a normally closed clutch in the second machine, means controlled by the second machine to close the first said clutch, a latch for said means to hold the first said clutch closed, normally disabled means to open the clutch of the second machine, a trip actuated by the last said means to trip said latch, a member common to both machines and operable to enable the last said means, a card receiver in the punch, a floor plate in said receiver depressed by the cards, and normally disabled means to operate said member enabled by said floor plate when it has been sufficiently depressed.

54. Two combined card controlled accounting machines having in combination, a normally open clutch in one machine, a normally closed clutch in the second machine, means controlled by the second machine to close the first said clutch, a latch for said means to hold the first said clutch closed, normally disabled means to open the clutch of the second machine, a trip actuated by the last said means to trip said latch, a member common to both machines, an actuator in the punch to operate said member, a latch normally holding said actuator inactive, and a card receptacle floor plate in the punch depressed by the cards and acting when sufficiently depressed to trip the last said latch and free said actuator.

55. Two combined card controlled accounting machines having in combination, a normally open clutch in one machine, a normally closed clutch in the second machine, means controlled by the second machine to close the first said clutch, a latch for said means to hold the first said clutch closed, normally disabled means to open the clutch of the second machine, a trip actuated by the last said means to trip said latch, a member common to both machines and operable to enable the last said means, an actuator in the punch to operate said member, a latch normally holding said actuator inactive, a card receptacle floor plate in the punch depressed by the cards and acting when sufficiently depressed to trip the last said latch, and a reciprocating member to hold said actuator in inactive position except for a definite period during each cycle of the machine and to restore said actuator to inactive position at the end of that period.

56. In a card controlled machine, the combination of means to stop the machine, an actuator to operate said means, a latch normally holding said actuator inactive, a card receptacle floor plate depressed by the cards and acting when sufficiently depressed to trip the last said latch, and a reciprocating member to hold said actuator in inactive position except for a definite period during each cycle of the machine and to restore said actuator to inactive position at the end of that period.

57. In a card controlled machine, the combination of a card feed mechanism operated on certain cycles of the machine and not on others, a member stationed along the path of travel of a card to sense for a card passing thereby, means normally holding said member inactive but timed to free said member to sense for a card at that point in a card feed cycle when one should be passing thereby, a member to restrain said means from freeing the first said member on non-card feed cycles but operated with the card feed mechanism to free said means, and means to stop the machine including a piece moved into the path of movement of said timed means by the sensing member when the latter does not detect a card, the stopping means then being actuated by said timed means.

58. In a card controlled machine, the combination of a card feed mechanism operated on certain cycles of the machine and not on others, a normally inactive sensing member stationed along the path of travel of a card, a restraining member to hold said sensing member inactive but moved to free said sensing member to sense for the passage of a card thereby, a second restraining member to prevent the first said restraining member from freeing said sensing member but operated with the card feed mechanism to free the first said restraining member, and means to stop the machine including a part moved into the path of movement of the first said restraining member by said sensing member when it fails to sense a card.

59. In a card controlled machine, the combination of a card feed mechanism operated on certain cycles of the machine and not on others, a normally inactive sensing member stationed along the path of travel of a card and having a range of movement from an inactive position to an active position which latter position it is prevented from reaching if it senses a card, means to stop the machine including a part normally in inactive position but moved to active position by the movement of said sensing member to active position, a restraining member to hold said sensing member in inactive position but moved to free said sensing member at the proper point in the cycle, the movement of said restraining member also actuating said means to stop the machine through said part when the latter is moved to active position, and a second restraining member to prevent the first said restraining member from freeing said sensing member on non-card feed cycle but operated with said card feed mechanism to free the first said restraining member.

60. In a card controlled machine, the combination of a card feed mechanism, a sensing member stationed along the path of travel of a card to detect the failure of a card to feed thereby, a restraining member to hold said sensing member in inactive position but operated to free said sensing member at the proper point in the machine cycle, and means to stop the machine including a part moved by said sensing member into position to be actuated by the movement of said retaining member when the sensing member detects the failure of a card to feed thereby.

61. In a card controlled machine, the combination of a card feed mechanism, a sensing member stationed along the path of travel of a card to detect the failure of a card to feed thereby, a restraining member to hold said sensing member in inactive position but operated to free said sensing member at the proper point in the machine cycle, means to stop the machine including a part moved by said sensing member into position to be actuated by the movement of said restraining member when the sensing member detects the failure of a card to feed thereby, a set pin mechanism, a retract mechanism to clear said set pin mechanism, and a disabling member actuated by the said part of the stopping means to disable said retract mechanism.

62. In a card controlled machine, the combination of a card feed mechanism, a sensing member stationed along the path of travel of a card to detect the failure of a card to feed thereby, a restraining member to hold said sensing member in inactive position but operated to free said sensing member at the proper point in the machine cycle, means to stop the machine including a part moved by said sensing member into position to be actuated by the movement of said retaining member when the sensing member detects the failure of a card to feed thereby, a set pin mechanism, a retract mechanism to clear said set pin mechanism, a disabling member actuated by the said part of the stopping means to disable said retract mechanism, a latch to hold said retract mechanism disabled, and a manually operable trip for said latch.

63. In a card controlled machine, the combination of a card feed mechanism, means to detect the failure of said card feed mechanism to feed a card past a predetermined point in the machine, means to stop the machine actuated by the last said means, a set pin mechanism, a retract mechanism to clear said set pin mechanism, a disabling member actuated by the first said means to disable said retract mechanism, a latch to hold said retract mechanism disabled, a manually operable trip for said latch, normally locked set-up slides, a normally disabled releasing bar for said slides, and a connector actuated by said manually operable trip to enable said bar.

64. Two combined card controlled machines having in combination, a member common to both machines and operable to cause both machines to stop, a card feed mechanism in one machine, a normally inactive sensing member stationed along the path of travel of a card fed by said mechanism to detect the failure of a card to feed thereby, a restraining member to hold said sensing member in inactive position but operated to free said sensing member at the proper point in the cycle of the machine, and a trip for the first said member moved by said sensing member into position to be actuated by the movement of said retaining member when the sensing member detects the failure of a card to feed thereby.

65. Two combined card controlled machines having in combination, a member common to both machines and operable to cause both machines to stop, a card feed mechanism in the first machine, a normally inactive sensing member stationed along the path of travel of a card fed by said mechanism to detect the failure of a card to feed thereby, a restraining member to hold said sensing member in inactive position but operated to free said sensing member at the proper point in the cycle of the machine, a trip for the first said member moved by said sensing member into position to be actuated by the movement of said retaining member when the sensing member detects the failure of a card to feed thereby, a set pin mechanism in said first machine, a retract mechanism to clear said set pin mechanism, and a disabling member actuated by said trip to disable said retract mechanism.

66. Two combined card controlled machines having in combination, a member common to both machines and operable to cause both machines to stop, a card feed mechanism in the first machine, a normally inactive sensing member stationed along the path of travel of a card fed by said mechanism to detect the failure of a card to feed thereby, a restraining member to hold said sensing member in inactive position but operated to free said sensing member at the proper point in the cycle of the machine, a trip for the first said member moved by said sensing member into position to be actuated by the movement of said retaining member when the sensing member detects the failure of a card to feed thereby, a set pin mechanism in said first machine, a retract mechanism to clear said set pin mechanism, a disabling member actuated by said trip to disable said retract mechanism, a latch to hold said retract mechanism disabled, and a manually operable trip for said latch.

67. In a card controlled machine, the combination of a set pin mechanism including set pins and locking slides to hold said set pins in operated position, a universal bar connectable with said locking slides to move them to inactive position, means to reciprocate said bar including a first member, a second member and a hook connecting the two, a trip for said hook to disconnect said members and prevent reciprocation of said bar, a card feed mechanism, and automatic means acting to actuate said trip on the failure of said card feed mechanism to feed a card past a predetermined point in the machine.

68. In a card controlled machine, the combination of a normally disabled card feed mechanism, a first latch to hold said mechanism disabled, a second latch to hold said mechanism disabled, set-up slides advanced differentially to numeric positions, one or more universal bars actuated to trip said second latch by the advance of one or more of said slides beyond zero position, and a manually operable trip to trip said first latch and to disable said second latch.

69. Two combined accounting machines having in combination, a push button to start the first machine, a member common to both machines and operable to start the second machine, a normally inactive plunger to operate said member, a latch holding said plunger inactive, a trip for said latch operated by said push button, and an actuator for said plunger.

70. Two combined accounting machines having in combination, a push button to start the first machine, a clutch in the second machine, a member common to both machines and operable to close said clutch, a normally inactive plunger to operate said member, a latch holding said member inactive, a trip for said latch operated by said push button, and an actuator for said plunger.

71. Two combined accounting machines having in combination, a push button to start the first machine, a normally open clutch in the second machine, a member common to both machines and operable to close said clutch, a normally inactive plunger to operate said member, a latch to hold said plunger inactive, a trip for said latch operated by said push button, an actuator for said plunger, an automatic paper feeding mechanism, a member operated by the last said mechanism to hold said latch tripped, a second latch to hold the last said member operated after said paper feeding mechanism ceases to operate it allowing said plunger to be actuated a second time, and a trip for said second latch operated by said actuator.

72. Two combined accounting machines having in combination, a push button to start the first machine, a normally open clutch in the second machine, a member common to both machines and operable to close said clutch, a normally inactive plunger to operate said member, a latch to hold said plunger inactive, a trip for said latch operated by said push button, an actuator for said plunger, an automatic paper feeding mechanism, a member operated by the last said mechanism to hold said latch tripped, a second latch to hold the last said member operated after said paper feeding mechanism ceases to operate it allowing said plunger to be actuated a second time, a trip for said second latch operated by said actuator, differential slides in the second machine, a universal releasing bar for certain of said slides, an escapement mechanism to cause an operation of said releasing bar, an interponent moved into the path of said plunger by said paper feeding mechanism, and a connector actuated by said interponent to set said escapement mechanism.

73. In two combined accounting machines, the combination of one or more interponents in one machine settable active or inactive, each including a part moved from one inactive position to another inactive position when the interponent is set active, a member to move each said part to an active position from the second said inactive position, card controlled means to actuate each said member, an actuator for said one or more interponents, a second member operated by each such interponent, and a normally open clutch in the second machine closed by either second member.

74. In two combined accounting machines, the combination of one or more interponents in one machine settable active or inactive, each including a part moved from one inactive position to another inactive position when the interponent is set active, a member to move each said part to an active position from the second said inactive position, card controlled means settable active or inactive to operate each said member, an actuator for said one or more interponents, a second member operated by each such interponent, and a normally open clutch in the second machine closed by either second member.

75. In two combined accounting machines, the combination of one or more interponents in one machine settable active or inactive, each including a part moved from one inactive position to another inactive position when the interponent is set active, a member to move each said part to an active position from the second inactive position, card controlled means to actuate each said member, an actuator for said one or more interponents, a second member operated by each such interponents, normally locked set-up slides in the second machine, and a universal releasing bar for said slides controlled by each said second member.

76. In two combined accounting machines, the combination of two interponents each including a part in inactive position, a member to move each said part to active position, an actuator for said interponents, a second member operated by each of said interponents, normally locked set-up slides in the first machine, a first releasing bar controlled by one of said interponents for certain of said slides, a second releasing bar controlled by the other of said interponents for others of said slides, an accumulator in the second machine, an interponent located in one or the other of two positions by said accumulator, an actuator for the last said interponent, and connectors actuated selectively by said interponent to operate the first mentioned members.

77. In two combined accounting machines, the combination of two normally disabled interponents, a member to enable each of said interponents, an actuator for said interponents, a second member operated by each of said interponents, normally locked set-up slides in the first machine, a first releasing bar controlled by one of said interponents for certain of said slides, a second releasing bar controlled by the other of said interponents for others of said slides, an accumulator in the second machine, an interponent located in one or the other of two positions by said accumulator, an actuator for the last said interponent, and connectors actuated selectively by said interponent to operate the first mentioned members.

78. In two combined accounting machines, the combination of a normally disabled card feed mechanism in the first machine, a member operable to enable said mechanism, one or more second members to operate the first said member, a hook connecting the first said member with each of said second members, an accumulator in the second machine, an interponent settable active or inactive by said accumulator, an actuator for said interponent and a connector actuated by said interponent to disable said hooks.

79. In a combined summary punch and tabulator, the combination of a normally disabled punch card feed mechanism, a member operable to enable said mechanism, one or more second members to operate the first said member, a hook connecting the first said member with each of said second members, an actuator for said second members, an accumulator in the tabulator, an interponent settable active or inactive by said accumulator, an actuator for said interponent, and a connector actuated by said interponent to disable said hooks.

80. In a machine of the class described, the combination of gag bars advanced differentially, means to advance said gag bars to zero position, a normally disabled actuator for said means, a latch to hold said actuator in active position, a second latch to hold the first said latch disabled, a trip for said second latch, and a trip for the first said latch.

81. In a machine of the class described, the combination of gag bars advanced differentially, means to advance said gag bars to zero position, a normally disabled actuator for said means, a latch to hold said actuator in active position, a second latch to hold the first said latch disabled, a trip for said second latch operated on some cycles of the machine and not on others, and a trip for said first latch operated on the same cycles as the trip for the second latch.

FRANK A. LOPEZ.

No references cited.